US011168195B2

(12) United States Patent
Mehrabi et al.

(10) Patent No.: US 11,168,195 B2
(45) Date of Patent: *Nov. 9, 2021

(54) POROUS MATERIAL AND METHOD FOR PRODUCING THE SAME

(71) Applicant: Avery Dennison Corporation, Glendale, CA (US)

(72) Inventors: Ali R. Mehrabi, Glendale, CA (US); Reza Mehrabi, Tujunga, CA (US); Frank Chica, El Monte, CA (US); Janet Hsiao, San Gabriel, CA (US); Juan M. De Santos Avila, San Gabriel, CA (US)

(73) Assignee: Avery Dennison Corporation, Glendale, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/689,126

(22) Filed: Aug. 29, 2017

(65) Prior Publication Data

US 2017/0355828 A1 Dec. 14, 2017

Related U.S. Application Data

(63) Continuation of application No. 13/558,634, filed on Jul. 26, 2012, now Pat. No. 9,790,343, which is a
(Continued)

(51) Int. Cl.
*C08J 9/26* (2006.01)

(52) U.S. Cl.
CPC ....... *C08J 9/26* (2013.01); *Y10T 428/249955* (2015.04)

(58) Field of Classification Search
None
See application file for complete search history.

(56) References Cited

U.S. PATENT DOCUMENTS

| 699,026 A | 4/1902 | Shaler |
| 1,977,321 A | 10/1934 | Merritt et al. |

(Continued)

FOREIGN PATENT DOCUMENTS

| CN | 1617669 | 5/2005 |
| CN | 101107127 | 1/2008 |

(Continued)

OTHER PUBLICATIONS

International Preliminary Report on Patentability dated Mar. 5, 2015 issued in corresponding International Application No. PCT/US2013/055656 filed Aug. 20, 2013.
(Continued)

*Primary Examiner* — James M Mellott

(57) ABSTRACT

A method for making a composite and/or structured material includes: forming a lattice construction from a plurality of solid particles, the construction being formed so as to have one or more gaps between the particles; invading the lattice construction with a fluid material such that the fluid material at least partially penetrates the gaps; and, solidifying the material which invaded the lattice construction to form a composite material. In one suitable embodiment, the method further includes removing at least a portion of the lattice construction from the composite material thereby forming at the location of the removed portion one or more pores in the solidified material that invaded the construction.

46 Claims, 48 Drawing Sheets

Related U.S. Application Data continuation-in-part of application No. 12/997,343, filed as application No. PCT/US2009/047286 on Jun. 12, 2009, now Pat. No. 9,062,173.

(60) Provisional application No. 61/061,066, filed on Jun. 12, 2008.

(56) References Cited

U.S. PATENT DOCUMENTS

| | | | |
|---|---|---|---|
| 1,999,903 | A | 4/1935 | Harshberger |
| 2,984,869 | A | 5/1961 | O'Conor Honey et al. |
| 3,170,604 | A | 2/1965 | Chapman |
| 3,426,730 | A | 2/1969 | Lawson et al. |
| 3,485,207 | A | 12/1969 | Gerlovich |
| 3,524,753 | A | 8/1970 | Sharp |
| 3,612,128 | A | 10/1971 | Beck et al. |
| 3,679,538 | A | 7/1972 | Druin et al. |
| 4,008,114 | A | 2/1977 | Lindsey |
| 4,080,928 | A | 3/1978 | Savard, Jr. |
| 4,258,455 | A | 3/1981 | Werner |
| 4,487,731 | A | 12/1984 | Kobayashi |
| 4,644,942 | A | 2/1987 | Sump |
| 4,705,702 | A | 11/1987 | Shimada et al. |
| 4,728,698 | A | 3/1988 | Isayev et al. |
| 4,863,604 | A | 9/1989 | Lo et al. |
| 4,892,544 | A | 1/1990 | Frisch |
| 5,277,973 | A | 1/1994 | Yamamura et al. |
| 5,320,907 | A | 6/1994 | Sato |
| 6,060,530 | A | 5/2000 | Chaouk et al. |
| 6,183,873 | B1 | 2/2001 | Clarke |
| 6,261,469 | B1 | 7/2001 | Zakhidov et al. |
| 6,436,506 | B1 | 8/2002 | Pinter et al. |
| 6,517,763 | B1 | 2/2003 | Zakhidov et al. |
| 6,969,897 | B2 | 11/2005 | Kim |
| 7,018,918 | B2 | 3/2006 | Kloster et al. |
| 7,018,920 | B2 | 3/2006 | Meagley et al. |
| 7,153,360 | B2 | 12/2006 | Herman et al. |
| 7,158,709 | B2 | 1/2007 | Hino |
| 7,172,142 | B2 | 2/2007 | Taylor et al. |
| 7,182,019 | B2 | 2/2007 | Cutcher et al. |
| 7,412,767 | B2 | 8/2008 | Kim et al. |
| 7,455,759 | B2 | 11/2008 | Saito et al. |
| 7,575,759 | B2 | 8/2009 | Murphy et al. |
| 8,337,947 | B2 | 12/2012 | Camorani |
| 8,496,116 | B2 | 7/2013 | Carr et al. |
| 2004/0026811 | A1* | 2/2004 | Murphy ............... A61L 27/18 264/41 |
| 2004/0040416 | A1 | 3/2004 | Erlebacher et al. |
| 2004/0138058 | A1 | 7/2004 | Sambasivan |
| 2004/0157436 | A1 | 8/2004 | Wong |
| 2005/0042874 | A1 | 2/2005 | Meagley et al. |
| 2005/0058474 | A1 | 3/2005 | Watanabe et al. |
| 2005/0065260 | A9 | 3/2005 | Kolarik |
| 2005/0160964 | A1 | 7/2005 | Champion et al. |
| 2006/0000373 | A1 | 1/2006 | Stefani |
| 2006/0137601 | A1 | 6/2006 | Miguez et al. |
| 2007/0009572 | A1 | 1/2007 | Mary Chan et al. |
| 2007/0074540 | A1 | 4/2007 | Chen et al. |
| 2007/0273055 | A1 | 11/2007 | Sazio et al. |
| 2007/0275863 | A1 | 11/2007 | Whitmarsh |
| 2007/0282439 | A1 | 12/2007 | Zehbe et al. |
| 2008/0029625 | A1 | 2/2008 | Talton |
| 2008/0038934 | A1 | 2/2008 | Vrtis et al. |
| 2008/0050415 | A1* | 2/2008 | Atanasoska ......... A61L 31/022 424/423 |
| 2008/0299845 | A1 | 12/2008 | Lewis |
| 2008/0299875 | A1 | 12/2008 | Duescher |
| 2009/0046967 | A1 | 2/2009 | Pope et al. |
| 2010/0048393 | A1 | 2/2010 | Juarez-Zamacona |
| 2010/0063470 | A1* | 3/2010 | Suzuki ................ A61F 13/53 604/367 |
| 2010/0256804 | A1 | 10/2010 | Freeman |
| 2011/0177320 | A1 | 7/2011 | Mehrabi et al. |

FOREIGN PATENT DOCUMENTS

| | | |
|---|---|---|
| CN | 101384405 | 2/2011 |
| CN | 201862563 | 6/2011 |
| CN | 101547743 | 7/2012 |
| CN | 101523013 | 9/2013 |
| DE | 138390 | 2/1903 |
| DE | 139622 | 3/1903 |
| DE | 10054089 | 7/2002 |
| DE | 102006014174 | 9/2007 |
| EP | 0512401 | 11/1992 |
| EP | 0634516 | 1/1995 |
| EP | 0700673 | 3/1996 |
| EP | 0714869 | 6/1996 |
| EP | 1162047 | 12/2001 |
| EP | 1136050 | 6/2005 |
| EP | 1714697 | 10/2006 |
| EP | 1471126 | 6/2007 |
| FR | 1171658 | 1/1959 |
| GB | 829811 | 3/1960 |
| GB | 884232 | 12/1961 |
| GB | 1201704 | 8/1970 |
| GB | 1236995 | 6/1971 |
| GB | 1353391 | 5/1974 |
| JP | 50-92972 | 4/1975 |
| JP | 59-129186 | 7/1984 |
| JP | 2003-073497 | 3/2003 |
| WO | 1999/64361 | 12/1999 |
| WO | 00/21905 | 4/2000 |
| WO | 2002/068373 | 9/2002 |
| WO | 03/024626 | 3/2003 |
| WO | 03/057844 | 7/2003 |
| WO | 2003/074227 | 9/2003 |
| WO | 2003/080119 | 10/2003 |
| WO | 2004/020362 | 3/2004 |
| WO | 2004/082333 | 9/2004 |
| WO | 2007/003513 | 1/2007 |
| WO | 2007/090131 | 8/2007 |
| WO | 2007/111997 | 10/2007 |
| WO | 2010/101927 | 9/2010 |

OTHER PUBLICATIONS

International Search Report and Written Opinion for International Application No. PCT/US2009/047286 filed Jun. 12, 2009.

International Preliminary Report on Patentability for International Application No. PCT/US2006/047286 filed Jun. 12, 2009.

International Search Report dated Apr. 15, 2014 issued in corresponding International Application No. PCT/US2013/055655 filed Aug. 20, 2013.

Written Opinion dated Apr. 15, 2014 issued in corresponding International Application No. PCT/US2013/055655 filed Aug. 20, 2013.

International Preliminary Report on Patentability dated Mar. 5, 2015 issued in corresponding International Application No. PCT/US2013/055655 filed Aug. 20, 2013.

International Search Report and Written Opinion dated Mar. 5, 2014 issued in corresponding International Application No. PCT/US2013/055656 filed Aug. 20, 2013.

Invitation to Pay Additional Fees dated Feb. 10, 2014 issued in corresponding International Application No. PCT/US2013/055655 filed Aug. 20, 2013.

* cited by examiner

| ESP. NO. | MATERIAL (14) | THICKNESS (IN) | AREA (IN2) | LATTICE CONSTRUCTION (10) | MATERIAL (12) |
|---|---|---|---|---|---|
| 1 | LLDPE1 | 0.0025 | 3.75 | SALT (MILLED) | AIR |
| 2 | LLDPE1 | 0.0025 | 3.75 | SALT (MILLED) | AIR |
| 3 | LLDPE1 | 0.0025 | 3.75 | SALT (MILLED) + NYLON MESH | AIR |
| 4 | LLDPE1 | 0.0025 | 3.75 | SALT (MILLED) + COPPER MESH | AIR |
| 5 | LLDPE1 | 0.0025 | 8.75 | Ag@Cu | AIR |
| 6 | LLDPE1 | 0.0025 | 8.75 | Fe | AIR |
| 7 | LLDPE1 | 0.0025 | 8.75 | CEMENT | AIR |
| 8 | LLDPE1 | 0.0025 | 8.75 | SiC(g) | AIR |
| 9 | TPX | 0.003 | 3.75 | SALT (MILLED) | AIR |
| 10 | TPX | 0.003 | 3.75 | SALT (MILLED) / SALT (MORTON) | AIR |
| 11 | TPX | 0.003 | 3.75 | SALT (MILLED) + RYAN FIBER | AIR |
| 12 | TPX | 0.003 | 3.75 | SALT (MILLED) + Ag @ GLASS | AIR |
| 13 | NYLON | 0.001 | 3.75 | SALT (MILLED) | AIR |
| 14 | FEP | 0.002 | 3.75 | SALT (MILLED) | AIR |
| 15 | PSF | 0.003 | 3.75 | SALT (MILLED) | AIR |
| 16 | LLDPE1 | 0.0025 | 3.75 | SALT (MILLED) < 25 um | AIR |
| 17 | LLDPE1 | 0.0025 | 3.75 | SALT (MILLED) 25-45 um | AIR |
| 18 | LLDPE1 | 0.0025 | 3.75 | SALT (MILLED) 45-80 um | AIR |
| 19 | LLDPE1 | 0.0025 | 3.75 | SALT (MILLED) 80-100 um | AIR |
| 20 | LLDPE1 | 0.0025 | 3.75 | SALT (MILLED) > 100um | AIR |
| 21 | LLDPE1 | 0.0025 | 3.75 | SALT (MILLED) | AIR + PG |
| 22 | PPI | 0.002 | ~9 | SALT (MILLED) | AIR |
| 23 | PPI | 0.002 | ~9 | SALT (MILLED) | AIR |
| 24 | SURLYN | 0.0025 | NP | SALT (MILLED) | AIR |
| 25 | LLDPE1 | 0.0025 | 3.75 | CALCIUM CARBOATE | AIR |
| 26 | LLDPE1 | 0.0025 | 3.75 | DRY SALT | AIR |
| 27 | EPOXY | 0.004 | 10 | SALT (MILLED) | AIR |
| 28 | LLDPE1 | 0.0025 | 8.75 | SALT (MILLED) + 15% PG (PASTE) | AIR + PG |
| 29 | PETG | 0.002 | 4 | SALT (MILLED) | AIR |

| PROCESS STEP 1 | | | PROCESS STEP 1 | | |
|---|---|---|---|---|---|
| FORCE (LB) | PRESSURE (PSI) | DWELL TIME (MIN) | FORCE (LB) | PRESSURE (PSI) | DWELL TIME (MIN) |
| 700-2000 | 187-533 | 0.1 | 2000-3000 | 533-800 | 0.9 |
| 700-2000 | 187-533 | 0.1 | 2000-3000 | 533-800 | 0.9 |
| 2000 | 533 | 0.1 | 5000 | 1333 | 0.9 |
| 2000 | 533 | 0.1 | 3000 | 800 | 0.9 |
| 1500 | 171 | 0.1 | 6000 | 686 | 0.9 |
| 1500 | 171 | 0.1 | 6000 | 686 | 0.9 |
| 1500 | 171 | 0.1 | 6000 | 686 | 0.9 |
| 1500 | 171 | 0.1 | 6000 | 686 | 0.9 |
| 2000 | 533 | 0.1 | 3000 | 800 | 0.9 |
| 2000 | 533 | 0.1 | 3000 | 800 | 0.9 |
| 2000 | 533 | 0.1 | 3000 | 800 | 0.9 |
| 4000 | 1067 | 1 | 0 | 0 | 0 |
| 2000 | 533 | 0.1 | 3000 | 800 | 0.9 |
| 2000 | 533 | 0.1 | 3000 | 800 | 0.9 |
| 3000 | 800 | 0.1 | 4000 | 1067 | 0.9 |
| 2000 | 533 | 0.1 | 3000 | 800 | 0.9 |
| 2000 | 533 | 0.1 | 3000 | 800 | 0.9 |
| 2000 | 533 | 0.1 | 3000 | 800 | 0.9 |
| 2000 | 533 | 0.1 | 3000 | 800 | 0.9 |
| 2000 | 533 | 0.1 | 3000 | 800 | 0.9 |
| 700 | 187 | 0.1 | 2000 | 533 | 0.9 |
| N/A | 50 | 1 | 0 | 0 | 0 |
| N/A | 50 | 1 | 0 | 0 | 0 |
| N/A | N/A | 30 fpm | N/A | N/A | N/A |
| 2000 | 533 | 0.1 | 3000 | 800 | 0.9 |
| 2000 | 533 | 0.1 | 3000 | 800 | 0.9 |
| 10 | 1 | 1440 | 0 | 0 | 0 |
| 1500 | 171 | 0.1 | 0 | 0 | 0 |
| 240 | 60 | 0 | 0 | 0 | 0 |

FIG. 9B continued from
FIG 9B

①

| TEMPERATURE (°F) | SIDES | WASHING |
|---|---|---|
| 380-440 | BOTH | YES/POOR |
| 380-440 | BOTH | YES |
| 440 | BOTH | YES |
| 460 | BOTH | YES |
| 480 | ONE | NO |
| 480 | ONE | NO |
| 480 | ONE | NO |
| 480 | ONE | NO |
| 480-500 | BOTH | YES |
| 480 | TOP (MILLED /BOTTOM (MORTON) | YES |
| 500 | BOTH | YES |
| 500 | BOTH | YES |
| 480 | BOTH | YES |
| 575-590 | BOTH | YES |
| 540 | BOTH | YES |
| 480 | BOTH | YES |
| 480 | BOTH | YES |
| 480 | BOTH | YES |
| 480 | BOTH | YES |
| 480 | BOTH | YES |
| 420 | BOTH | YES |
| 300-400 | BOTH | YES |
| 300-400 | ONE | YES |
| 450 | BOTH | YES |
| 480 | BOTH | YES |
| 430 | BOTH | YES |
| 77 | ONE | YES |
| 480 | BOTH | YES |
| 400 | BOTH | YES |

①

FIG. 9C continued from
FIG 9B

POROUS MATERIAL AND METHOD FOR PRODUCING THE SAME

CROSS-REFERENCE TO RELATED APPLICATIONS

The present application is a continuation of U.S. application Ser. No. 13/558,634 filed Jul. 26, 2012. The '634 application is a continuation-in-part and claims the benefit of U.S. application Ser. No. 12/997,343 filed Jan. 19, 2011, now U.S. Pat. No. 9,062,173 issued Jun. 23, 2015, which is a 371 of International Application No. PCT/US2009/047286 filed Jun. 12, 2009, which claims priority to U.S. Provisional Application No. 61/061,066 filed Jun. 12, 2008, all of which are incorporated by reference herein in their entireties.

BACKGROUND

The present inventive subject matter relates generally to the material and/or material production arts. Particular relevance is found in connection with composite and/or micro-structured polymeric materials, and accordingly the present specification makes specific reference thereto. However, it is to be appreciated that aspects of the present inventive subject matter are also equally amenable to other like applications.

Polymeric materials and films are widely used for various products and/or applications and have a broad range of properties that they can deliver at relatively low costs. In particular, polymeric surfaces can be functionalized in order to exhibit desired properties for a specific application. For example, a polymeric surface can be altered physically and/or chemically in order to improve its printability, filtration performance, adhesion, wettability, weatherability, permeability, optical properties or incorporate specific functional groups.

Several techniques have been previously developed to create micro-structures on and/or in polymeric materials. In particular, techniques have been previously developed to create porous or structured polymeric material by the formation of pores or other like structures therein. See, e.g., U.S. Pat. No. 3,679,538 to Druin et al., U.S. Pat. No. 4,863,604 to Lo et al., U.S. Pat. No. 4,487,731 to Kobayashi, and U.S. Patent Application Pub. No. 2004/0026811 to Murphy et al., all incorporated in their entirety herein.

However, many prior developed techniques are generally limited in one way or another. For example, some may only work for making porous structures throughout the entire polymer. That is to say, there is a lack control with regard to the extent of the micro-structure and/or pore formation and/or the connectivity there between. Additionally, prior developed techniques may be time consuming, complicated and/or not well suited to conventional commercial production processes (e.g., such as roll-to-roll polymer film production) which one may desire to use.

Micro-embossing, photolithography, etching, and laser drilling are among other methods previously developed to generate texture and micro-structures at or on the surface of polymers. While some of these methods are advantageous due to economical and technological issues, they generally lack the ability to efficiently and/or effectively produce certain branched and/or closed loop structures. Additionally, in general, they may not be well suited to the production of internal networks of interconnected pores.

Accordingly, new and/or improved micro-structured and/or composite material(s) and/or method(s) for producing the same are disclosed which address the above-referenced problem(s) and/or others.

SUMMARY OF THE DISCLOSURE

According to one exemplary embodiment disclosed herein, a method is provided for creating composite materials.

According to another exemplary embodiment disclosed herein, a method is provided to create micro-structured polymeric materials. Suitably, the microstructures include branched or closed loop microstructures at polymeric surfaces, or throughout a polymer film.

According to another exemplary embodiment disclosed herein, a method is provided that allows for substantial flexibility in the design of the microstructures and which simplifies the elimination of a lattice structure used to form those microstructures.

According to another exemplary embodiment disclosed herein, a method is provided that allows suitable control of pore creation in a material, including control of the pore size, pore-size distribution and/or pore connectivity. Suitably, the pore-size distribution can be narrow or broad, uni- or multi-modal. Optionally, the pores can be uniform or graded in distribution in the cross-section and/or face of the film. Moreover, each layer defined by the pore size can be uniform or graded.

One embodiment disclosed herein relates to a novel method to create composite materials using the concept of fluid flow and fluid displacing in a lattice construction. The lattice construction can be consolidated (i.e., the matrix particles are connected) or unconsolidated (i.e., made of individual particles that can freely move but held in place by compaction or by other means, such as liquid surface tension). Suitably, an invading fluid, for example a polymeric material, is used to displace the fluids (e.g., air) in the lattice construction. Depending on the network geometry of lattice construction, the physical properties of the fluid existing in the lattice construction and the displacing fluid, various flow patterns with different topology can be achieved (see FIG. 43). For example, in imbibition, in which a wetting fluid displaces a non-wetting fluid, a three dimensional flow pattern with closed loops are generated (called imbibition cluster). While drainage, where a non-wetting fluid displaces a wetting fluid, generates a totally different three-dimensional branching structure (called drainage cluster) without closed loops (FIG. 43). The invading solution can be an emulsion, suspension, or foam.

Suitably, the invading fluid can be optionally solidified inside of the lattice construction by any means to form a composite material. For example, the invading fluid can be solidified by cooling or curing. The original lattice construction may remain part of the finished composite material in order to provide specific functions. Alternately, the lattice construction may be a sacrificial component which can be removed after the polymer microstructure is formed. Suitably, the optionally displaced and/or original fluid in the lattice construction can be any fluid, for example it can be any gas including air, or any liquid that can optionally be solidified, an emulsion, a suspension, or a mixture of gas and liquid (i.e., foam). In one suitable embodiment, the fluid that originally exists in the lattice construction is displaced at least partially with the invading fluid. Any remaining part of the original fluid can be either optionally removed or left in the final composite material. In the later case, the remaining original fluid can be optionally solidified by any means.

According to another exemplary embodiment disclosed herein, a process for producing a composite and/or structured material includes the steps of: forming a lattice construction, fluidization of a polymeric material, invasion of the polymeric material into the lattice construction and solidification of the resulting polymer composite. Additionally, there can be an optional step of removing at least a portion of the lattice construction. Suitably, these steps can be separate steps, but alternately, they can be performed simultaneously as well.

According to yet another exemplary embodiment disclosed herein, the lattice construction is formed by packing granular solids that are at least partially soluble in certain solvents. Optionally, the solids can be a mixture of solid particles of different chemical nature, size and/or shape. Suitably, the solids can be milled (ground) in a first non-solvent liquid. AN optional filtering process can be used following the milling to narrow the particle size of the solids. Optionally, the milling liquid can be evaporated and/or dried off at this point. Suitably, a second liquid can be introduced to re-disperse the solid particles to form a homogenous solid suspension. This second suspending liquid may or may not be the same as the first milling liquid. Suitably, the solid suspension is then coated onto a substrate or surface, e.g., via die or pattern coating, spraying, screen, gravure or ink-jet printing or other like application or deposition methods. Optionally, the suspension liquid can then be dried off to leave a cake of granular solids on the substrate. The cake of granular solids functions as the lattice construction in later steps. In another method, the solids can be dry-milled in a controlled environment (e.g., temperature and humidity controlled) and subsequently compacted to form the cake. The lattice construction can be formed by spraying, printing, or phase separation.

In one disclosed embodiment, the invading fluid, for example a polymer, is put in contact with the lattice construction so that the fluid invades into the gaps, voids and/or spaces between particles of the lattice construction. Suitably, the invading fluid is a polymeric solution, which can be dried later on or precipitated by another liquid, or in liquid forms which can be cured later on, or be vapor deposited, or solidified by cooling. The invading fluid is then solidified and optionally separated from the lattice construction. The residual solids from the lattice construction remaining on the solidified invading material can then be either washed off or left behind, leaving a material with a porous structure or a structured composite.

In alternate embodiments, the process disclosed herein can be used to create composite and/or porous structures on one side or both sides of a material, or throughout the whole thickness of the material. Moreover, the extent of the composite layer on the film surface can be partial or full, and the size and extent of coverage can be regular or random.

In accordance with alternate embodiments disclosed herein, the invading polymer material can be a preformed film or liquid. Optionally, the film can be stretched uniaxially, bi-axially or unstretched; the polymer film can be extruded; the polymer film can be single layer or multilayer; a multilayer film can be created by lamination or coextrusion; and/or, the polymer film can have one or more fillers in it. The invading fluid material can be provided by coating, printing, extrusion, melting a film, or spraying.

In any event, numerous advantages and benefits of the inventive subject matter disclosed herein will become apparent to those of ordinary skill in the art upon reading and understanding the present specification. The process may be a batch process, a continuous process, or a step and repeat process.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

FIGS. 9A, 9B and 9C are a table showing processing parameters used for several experiments in which sample materials were prepared in accordance with aspects of the present inventive subject matter.

DETAILED DESCRIPTION

Figure 1:
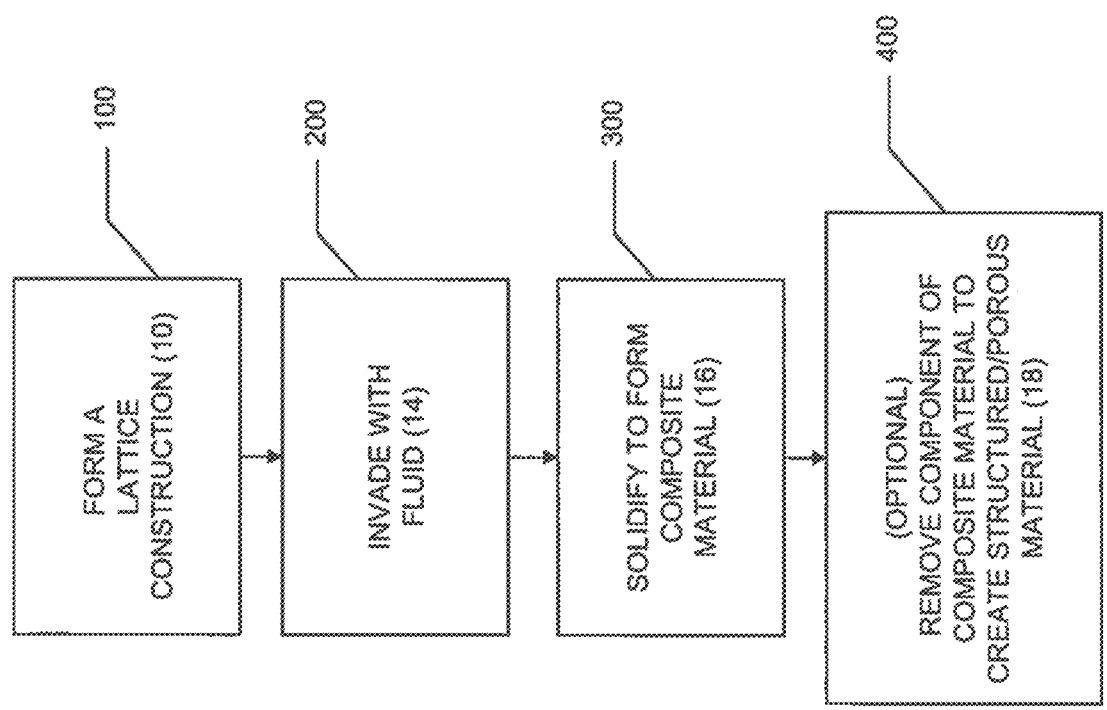
FIG. 1 is a flow chart illustrating an exemplary process for producing composite and/or structured/porous material in accordance with aspects of the present inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein. Additionally, unless otherwise specified, as used herein: the terms micro, micro-sized and the like refer to elements or features having dimensions on the order of micrometers; the term fluid or the like refers to a flowable liquid or gas or other flowable material; the term composite or the like refers to a material that is made of two or more component materials which differ in chemical and/or physical properties (e.g., a composite may be made of a polymeric material and a solid or a fluid (including air)); the term superhydrophobic when used in reference to materials and/or surfaces means materials and/or surfaces that are extremely difficult to wet, i.e., having water contact angles in excess of 150°; the term superoleophobic when used in reference to materials and/or surfaces means materials and/or surfaces that display contact angles greater than 150° with respect to organic liquids; the Cassie Baxter state refers to the case when a droplet or liquid is resting partly on the raised feature(s) or asperities of a solid material and bridging the gap(s) there between; and, the term fouling or the like refers to the accumulation and/or deposition of living organisms and certain non-living material on hard surfaces (e.g., filters and membranes). Additionally, numeric or other values, quantities, ranges, dimensions, temperatures, time periods, weights, percentages, ratios and the like referred to herein are meant to be approximate, unless otherwise indicated.

In general, the present specification discloses various embodiments of a material, e.g., an at least partially polymeric material. In one exemplary embodiment, the disclosed material is optionally a composite material including a plurality of different component materials, e.g., including at least one polymeric component. In another exemplary embodiment, the disclosed material selectively has one or more micro-sized structures formed therein and/or thereon. Suitably, the micro-sized structures are pores or other like spaces, gaps or voids formed within the material. In selected exemplary embodiments, the pores are optionally in fluid communication with one another so as to form an interconnected network of pores within the material. The present specification also discloses an inventive method(s) for fabrication of the aforementioned materials. In one suitable process, a composite material is first formed as an intermediate material. Subsequently, at least a portion of at least one of the component materials making up the composite is removed to form the final structured material, e.g., with pores remaining where the removed material previously resided.

Figure 2:
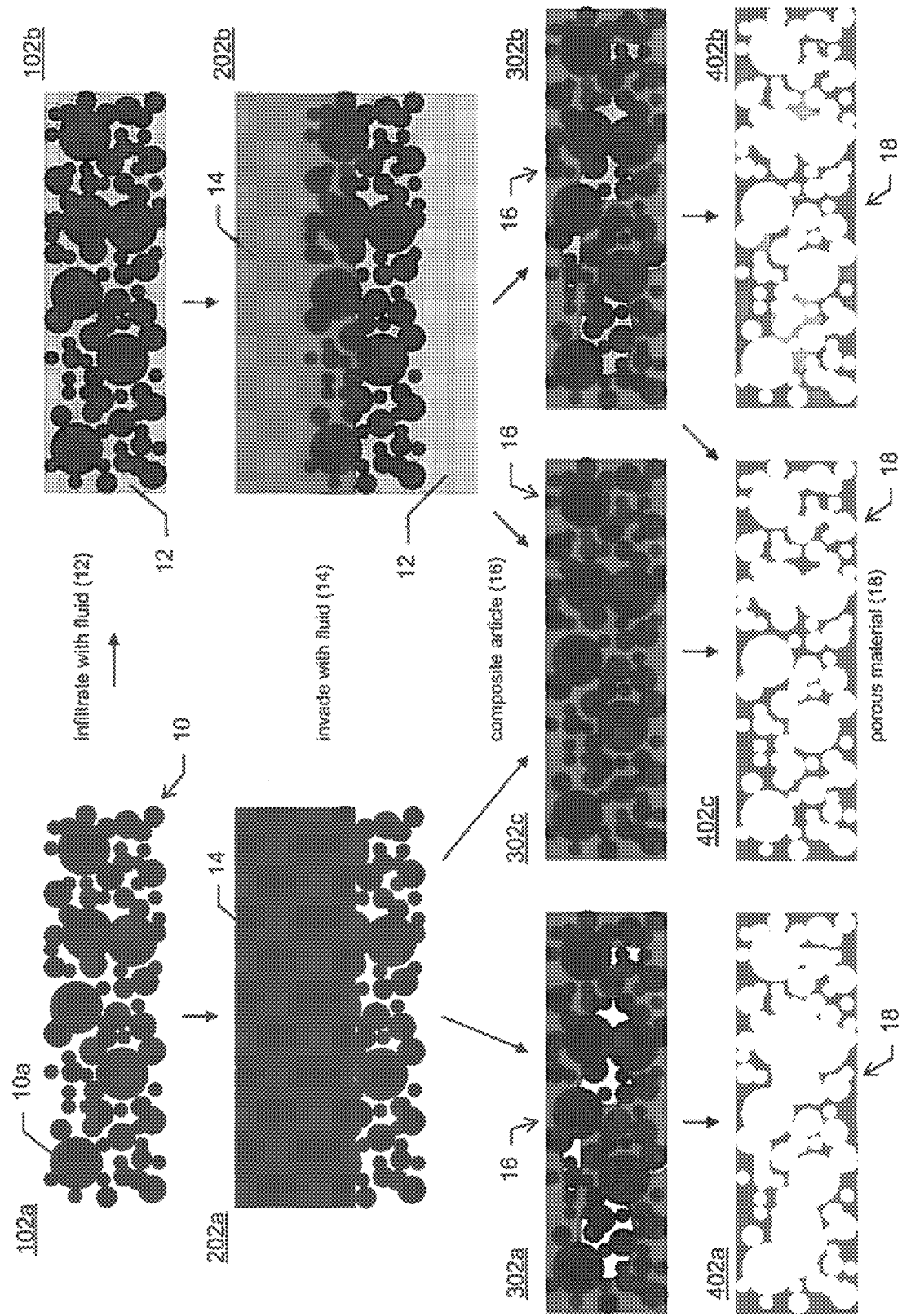
FIG. 2 is a schematic diagram showing different materials, constructions and the like formed at various steps in the process disclosed herein.

With reference now to FIGS. 1 and 2, there is now described an exemplary process for making a composite and/or micro-structure containing material according to aspects of the present inventive subject matter. In particular, FIG. 1 depicts a flow chart illustrating an exemplary process for making the aforementioned material(s), and FIG. 2 illustrates the materials and/or intermediate constructions formed at various points or stages within the process.

In a first step 100 (see FIG. 1), a lattice construction 10 (e.g., as seen in FIG. 2) is prepared. In particular, the construction 10 is suitably a one, two or three dimensional lattice or framework of solid particles 10a (i.e., grains of material). As shown in FIG. 2, the lattice includes an irregular geometric arrangement of the particles 10a, however alternately, the particles 10a may have a regular geometric arrangement within the lattice. Suitably, as shown in FIG. 2, certain particles 10a abut, contact or otherwise touch one or more of their neighboring particles 10a while forming one or more voids, gaps or spaces between the respective particles 10a (i.e., regions where the particles 10a do not exist or reside).

In one exemplary embodiment, each particle 10a is optionally made of the same material. However, in alternate embodiments, the respective particles 10a may be made from a plurality of different materials. Suitably, the granular solids used to produce the lattice construction 10 can be one or more of any inorganic or organic solid material, e.g., including salts, sugars, polymers, metals, etc. Optionally, where a portion of the lattice construction 10 is to be ultimately removed as described below, the material to be removed is suitably chosen to be a selectively soluble material with respect to a given solvent. Conversely, where a portion of the lattice construction 10 is to remain, the material to remain is suitably chosen to be insoluble with respect to the given solvent.

As seen in FIG. 2, in one optional embodiment, during, upon or after its formation, the lattice construction 10 is optionally infiltrated partially or completely by a first fluid material 12 (e.g., which may be air or another fluid). That is to say, the first fluid material 12 at least partially fills the spaces, voids and/or gaps between the particles 10a.

In a second step 200 (see FIG. 1), the lattice construction 10 is completely or partially invaded by a second fluid material 14. That is to say, the invading fluid 14 at least partially fills the spaces, voids and/or gaps between the particles 10a. Suitably, where the lattice construction 10 had been previously infiltrated by the fluid 12, optionally, the fluid 14 displaces some or all of the fluid 12. In addition to and/or in lieu of the aforementioned partial or complete displacement, the fluid 14 may optionally mix or otherwise combine with some or all of the fluid 12. Optionally, the invading fluid material 14 is, e.g., a molten polymer, a monomer, a polymeric solution or the like.

In a third step 300 (see FIG. 1), the material 14 is suitably solidified thereby forming an intermediate composite material 16 including, e.g., the solidified material 14, the lattice construction 10 and any remaining amount of the material 12. Optionally, the aforementioned solidification is achieved, e.g., via cooling of the material 14, curing of the material 14 using heat, light or otherwise, reaction of the material 14 with the material 12 and/or the material used to create the lattice construction 10, etc. Optionally, in forming the composite, any remain fluid material 12 may also be solidified.

In an optional fourth step 400 (see FIG. 1), some or all of the material making up the lattice construction 10 and/or any remaining first fluid 12 is removed from the intermediate composite material 16 to create the final structured material 18. In particular, the removed portions of the lattice construction 10 and/or any remaining first fluid 12 in effect form or leave behind one or more micro-structures (e.g., a network of interconnected pores) in the final structured material 18. Optionally, the aforementioned removal process may be performed, e.g., by dissolving, washing, etching, vaporizing or volatilizing away the removed portions or by other like techniques.

With further reference now to FIG. 2, there is shown various materials, constructions and/or intermediate composites at a plurality of stages in the aforementioned fabrication process. Note, various optional embodiments and/or scenarios are depicted in FIG. 2. In particular, stages labeled with reference characters having like numeric values represent like stages in the production process, while those like numerically referenced stages having different alphabetic values represent different alternate options, scenarios and/or embodiments.

At the stages labeled 102a and 102b, a suitable lattice construction 10 made of solid particles 10a is present. As shown in stage 102a, the white or un-shaded region(s) represent the spaces, voids or gaps between the particles 10a. In general, as shown in FIG. 2, the white or un-shaded region(s) represents the absence of particles 10a, material 12 and/or material 14. As depicted in stage 102b as compared to stage 102a, the lattice construction 10 is shown being optionally infiltrated with the fluid material 12, indicated generally in FIG. 2 by the light grey shaded region(s). At the stages labeled 202a and 202b, there is shown the invasion of the fluid material 14, indicated generally in FIG. 2 by the dark grey shaded region(s).

The stages labeled 302a, 302b and 302c, show embodiments of the intermediate composite material 16. Suitably, as shown in the stage labeled 302a, the material 14 only partially invades the lattice construction 10 (see, e.g., the remaining white or un-shaded regions in the composite material 16). As shown in the stage labeled 302b, the material 14 again only partially invades the lattice construction 10 thereby leaving a portion of the material 12 undisplaced (see, e.g., the remaining light grey shaded regions in the composite material 16). Alternately, as shown in the stage labeled 302c, the material 14 has substantially completely invaded the lattice construction 10, thereby filling essentially all the voids, spaces and/or gaps between the particles 10a and/or displacing essentially all the fluid material 12. In all three cases, however, the intermediate composite material 16 is now formed, e.g., upon solidification of the material 14.

Finally, the stages labeled 402a, 402b and 402c show the final structured (i.e., porous) material 18 resulting from removal of the lattice construction 10 from the intermediate composite materials 16 depicted in each of the stages 302a, 302b and 302c, respectively.

Figure 3:
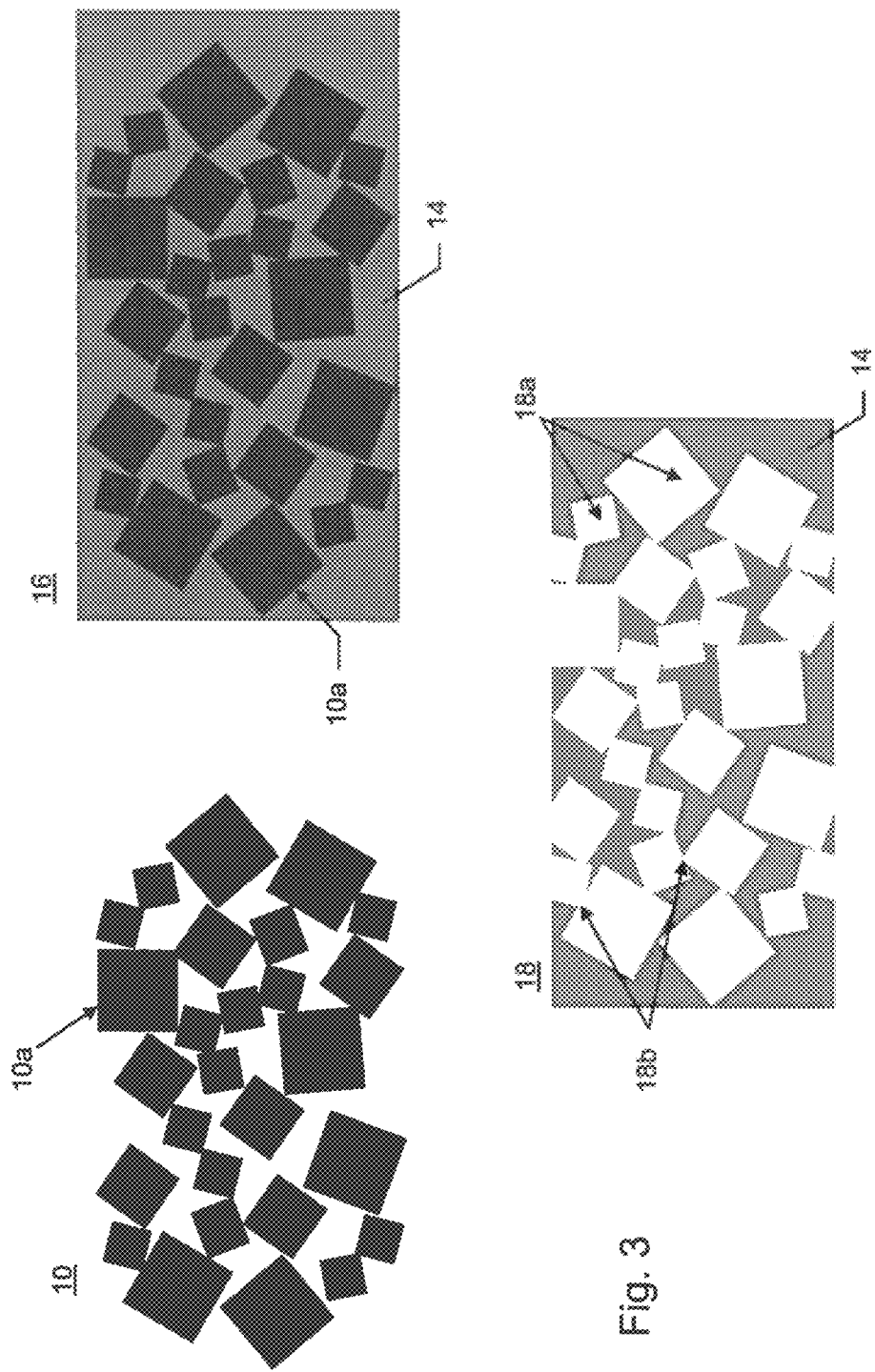
FIG. 3 is a schematic diagram showing a corresponding lattice construction, composite material and final structured/porous material formed in conjunction with the presently disclosed process.

With reference now to FIG. 3, there is shown corresponding examples of a lattice construction 10 formed of particles 10a, a composite intermediate material 16 formed by the invasion of material 14 into the lattice construction 10, and the resulting final structured/porous material 18 obtained by the removal of the lattice construction 10. From FIG. 3, it can be appreciated that the pore size distribution and pore connectivity in the final structured material 18 can be selective controlled largely by the size distribution of the granular solids or particles 10a, their shapes, and the way they are packed and/or arranged in the lattice construction 10. As shown in FIG. 3, the pore space of the material 18 is generally dividable into pore bodies 18a and pore throats 18b. The bodies 18a are represented by the relatively large voids or spaces or volumes that are generally created or formed, e.g., by removing the granular solids or particles 10a, while the relatively narrow channels or throats 18b providing fluid communication and/or connectivity between pore bodies 18a are generally created or formed where the particles 10a contacted one another and/or by any void space around the contact areas that was not penetrated by the fluid material 14. For the most part, the porosity in general of the final material 18 is dependent on the size distribution and/or quantity of the pore bodies 18a, whereas fluid flow properties of the final material 18 are controlled by the throats 18b.

As already pointed out, the size distribution and/or quantity of the pore bodies 18a is related to the size distribution and/or quantity of the granular solids and/or particles 10a in the original lattice construction 10, while the size distribution of the pore throats 18b is similarly related to the contact areas between the particles 10a. Since the size distribution of the particles 10a can be readily controlled and/or measured before the lattice construction 10 is fabricated, this a priori information is known data. Accordingly, from this a priori data, the size distribution of the pore bodies 18a (and thus the effective porosity of the material 18) can also be known, calculated or closely estimated a priori, i.e., prior to the actual formation of the final material 18. Likewise, the size distribution of the contact areas between the granular solids or particles 10a depends on the degree of compaction of the particles 10a and the roundness around their corners, as well as their shapes. Given the size distribution of the particles 10a, the degree of compaction, their shapes, etc., one can determine the size distribution of the contact areas between the particles 10a (e.g., by computer simulation or otherwise) and, hence, the size distribution of the resulting pore throats 18b. Thus, the relevant information on the morphology of the resulting pore space in the final material 18 can be known a priori, i.e., before the material 18 is even fabricated.

Figure 4:
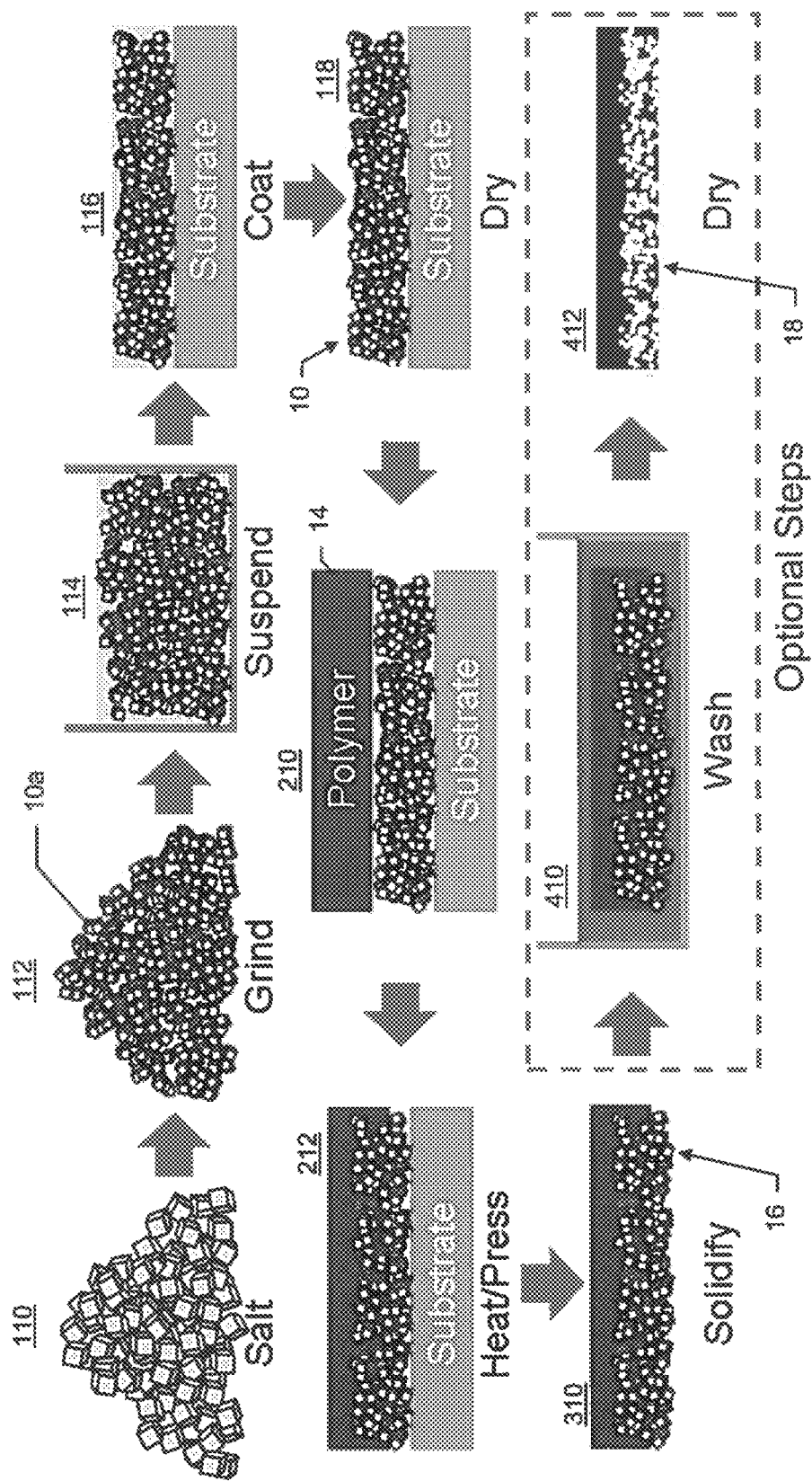
FIG. 4 a schematic diagram showing a more specific exemplary process for producing composite and/or structured/porous material in accordance with aspects of the present inventive subject matter.

With reference now to FIG. 4, one exemplary embodiment for fabricating a material in accordance with aspects of the present inventive subject matter will now be described. In relation to the higher level process described with reference to FIG. 1, it is to be noted that: steps 110-118 illustrated in FIG. 4 are sub-steps correspond to the over-all step 100 illustrated in FIG. 1; steps 210 and 212 illustrated in FIG. 4 are sub-steps correspond to the over-all step 200 illustrated in FIG. 1; step 310 illustrated in FIG. 4 is a sub-step correspond to the over-all step 300 illustrated in FIG. 1; and, optional steps 410 and 412 illustrated in FIG. 4 are sub-steps correspond to the over-all step 400 illustrated in FIG. 1.

As illustrated in FIG. 4, the process begins at step 110 with a salt or other granular solid material. At step 112, the granular material from step 110 is milled or otherwise ground to achieve particles 10a of a desired size and/or shape. Optionally, the solids can be dry-milled or milled in a non-solvent liquid. For example, if granular NaCl is used to form the lattice construction 10, then isopropyl alcohol (IPA) is a suitable milling liquid. If wet-milling is performed, optionally once the wet-milling is complete, a drying or other like step can be preformed to evaporate or otherwise remove the milling liquid from the produced particles 10a. Alternately, other methods can be used to produce the desired particles 10a. For example, they can be formed by precipitation from a solution or recrystallization. In this case, the size and/or shape of the particles 10a is optionally controlled by the processing conditions (e.g., temperature, mixing conditions, etc.) at which the precipitation and/or recrystallization is conducted. Additionally, in either case, particle-size distribution can further be controlled, e.g., by filtering or sieving. The particle-size distribution may also be controlled by agglomeration or palletizing.

Optionally, one or more granular solid materials may be used to create the lattice construction 10. Likewise, one or more shapes and/or sizes of particles 10a may optionally be employed to achieve a desired particle-size distribution. The selected size(s), shape(s) and/or material(s) depend on the intermediate composite material and/or final structured/porous material which is ultimately desired. Examples of granular solids than may be used include but are not limited to, e.g., CaCO3, NaCl, KCl, Na2SO4, Na2S2O5, etc. In general, the granular solid can be a mixture of solid particles of different chemical nature, size and shape. The granular solid can be a soluble material in a given solvent or solvent mixture. Optionally, the granular solid may contain materials that are not soluble in a particular solvent. For example, a granular solid can be a mixture of sodium chloride (i.e., water soluble) and titanium dioxide (i.e., water insoluble) powders.

At step 114, the granular medium from step 112 is mixed in a suspending liquid, which may or may not be the same as the milling liquid. For example, suitable milling and/or suspension fluids include but are not limited to, e.g., air, alcohols (IPA, propylene glycol, ethylene glycol, glycerin, etc.), esters, ketones, aromatics, aliphatics, liquid polymers, etc. Suitably, in the suspending liquid, the solid particles 10a are dispersed to form a substantially homogenous solid suspension.

Figure 44:
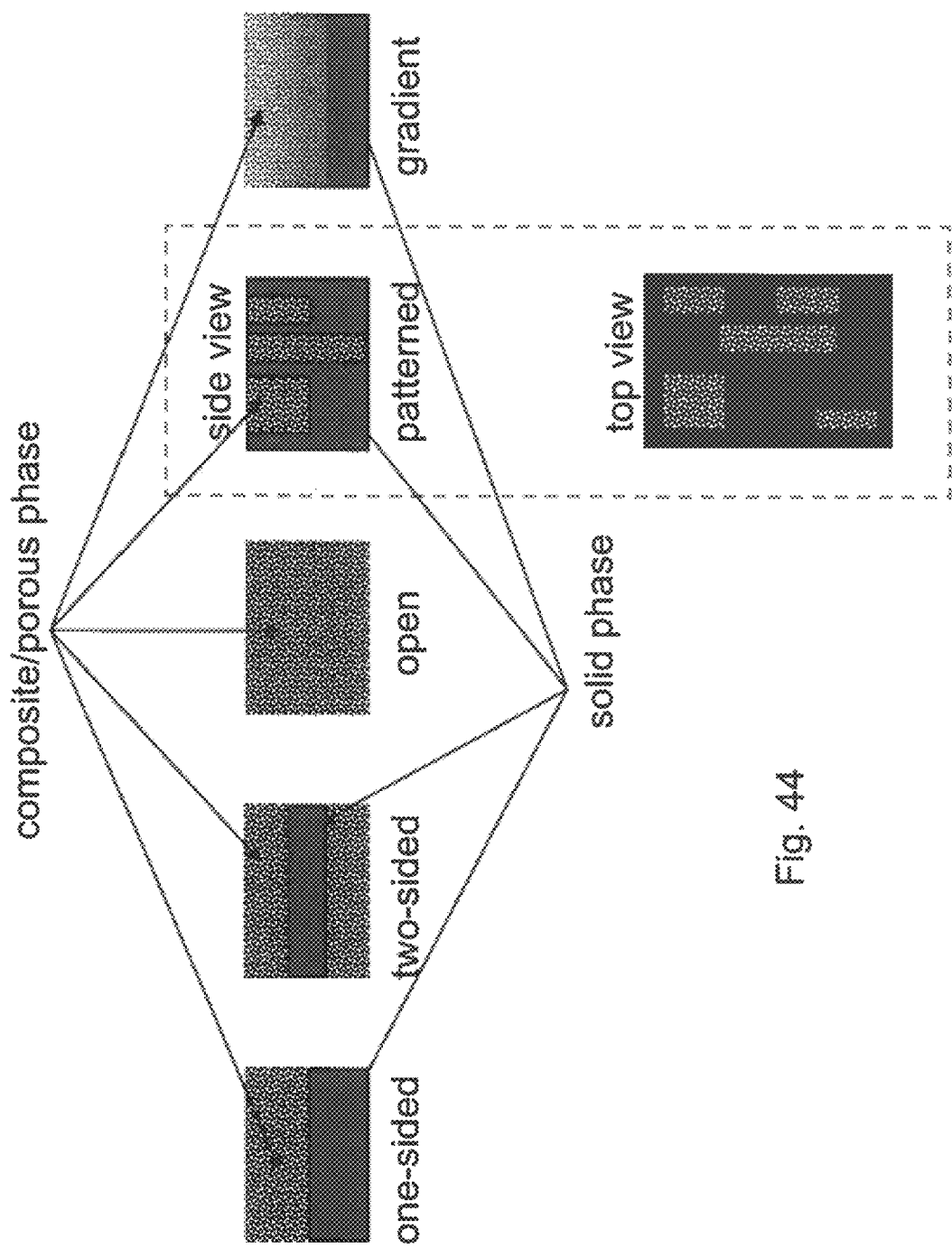
FIG. 44 shows the variations of the process to make layered, patterned, and gradient structures.

At step 116, the liquid carrying the granular medium is then optionally printed, coated, deposited or otherwise applied to a surface or substrate. For example, such methods as die or pattern coating, spraying, screen, gravure or ink-jet printing, etc. may optionally be used. In particular, using a printing or pattern coating process has the advantage that the liquid carrying the granular medium may be selectively deposited or applied in a desired pattern on the substrate, and accordingly, the lattice construction 10 is therefore formed only in those places corresponding the deposition or application pattern. Consequently, the intermediate composite material 16 and/or the final structured/porous material 18 will likewise reflect the pattern. That is to say, the intermediate composite material 16 will have the lattice construction 10 formed therein in accordance with the pattern in which liquid carrying the granular medium was deposited. Likewise, the final structured material 18 will have a patterned porosity corresponding to the pattern in which liquid carrying the granular medium was deposited. In particular, the final structured material 18 will be made porous in those areas corresponding to where the liquid carrying the granular medium was deposited on the surface or substrate, while remaining non-porous in those areas corresponding to where the liquid carrying the granular medium was not deposited on the surface or substrate (FIG. 44).

At step 118, the coating is optionally dried, e.g., to evaporate or otherwise remove the suspending liquid, thereby leaving behind a lattice of the granular medium in the form of a cake or other like construction 10 with spaces, voids and/or gaps defined between the respective grains or particles 10a. Optionally, in an alternate example, the lattice construction 10 can be formed by any other techniques known to people skilled in the art. One such example is to deposit the solids granules or particles 10a layer-by-layer or otherwise into a desired arrangement without the use of any liquid. In any event, the lattice construction 10 formed from the granular solid can suitably have any desired shape or form. For example, the lattice construction 10 can be applied to the surface or substrate uniformly or partially. In the latter case, the partial coverage can be random or patterned. In short, any of various spatial combinations of granular solids are contemplated.

At step 210, the invading fluid material 14 is applied or otherwise brought into contact with the lattice construction 10. Optionally, the invading fluid 14, i.e., the fluid that enters into the voids, spaces and/or gaps between the particles 10a, can be made of any material. In an exemplary embodiment, the invading fluid 14 is made of materials that can be at least partially solidified by suitable physical and/or chemical methods. For example, the invading fluid 14 can be a molten polymer, a monomer, a polymeric solution, etc. Optionally, the polymer can be deposited from the vapor phase. The polymer can be melted with conductive heating, microwave heating, infrared heating, or any other suitable heating methods. Suitably, the polymer is introduced as a preformed film or extruded onto the lattice construction 10. The polymers used for the invading material 14 include any one or more types of material that are suitable for the process. For example, any thermoplastics, thermosets, monolayer films, laminated or coextruded multilayer films can be used. The polymers may also optionally contain fillers. Examples of suitable polymers include acrylic polymers, glycol-modified polyethylene terephthalate (PETG), polypropelene (PP), PMMA, Nylon, Kraton rubbers, TiO2-filled KRATON-G 2832 (from Kraton Polymers, Houston, Tex.), polyurethane thermoplastic elastomer, SURLYN ionomer from DuPont (DuPont, Wilmington, Del.), polyethylene (PE), low-density polyethylene (LDPE), linear low-density polyethylene (LLDPE), polystyrene (PS), TPX (polymethylpentene, from Mitsui, Japan), polycarbonate, and polyolefins, high-performance films such as polysulfone, polyethersulfone, fluoropolymers such as polyvinylidene fluoride (PVDF), perfluoroalkoxy fluopolyer (PFA), fluorinated ethylene propylene (FEP) Teflon (DuPont, Wilmington, Del.), hydrophilic polymer such as ethylene vinyl alcohol copolymer (EVOH), polyvinyl alcohol (PVA); biodegradable polymers such as polylactic acid (PLA), poly(dl-lactic acid) (P dl-LA), poly(l-lactic acid) (P I-LA), polycaprolactone (PCL), poly (glycolic acid) (PGA), poly(lactide-co-glycolide) (PLG), poly ((−)3-hydroxybutyric acid) (PHB); and the mixtures thereof.

At step 212, FIG. 4 shows the invasion of the fluid material 14 into the lattice construction. That is to say, the invading fluid 14 at least partially fills the spaces, voids and/or gaps between the particles 10a. Optionally, the lattice construction 10 may already contain another fluid 12, for example it may contain any gas including air or other liquids, or it may be held under vacuum. Of course, if the lattice construction 10 already contains another fluid 12, the invading fluid 14 enters into the spaces or gaps in the lattice construction 10 and optionally displaces the fluid 12. Several parameters control the invasion process and the final microstructure of different components (10, 12, and 14) including the differential pressure, capillary pressure, temperature, gravitational forces, wettability, surface tension of various components, miscibility of fluids (12 and 14), reactivity, phase change, etc. Suitably, heated rollers, laminators, hot presses and/or the like are used to provide the appropriate pressure and/or temperature that is desired to facilitate the invasion of the material 14 into the lattice construction 10. Optionally, the invading fluid 14 can also be coated onto the lattice construction 10 through slot die coating.

As shown in step 310 of FIG. 4, during the invasion process or upon its completion, various components including invading fluid 14 and/or any remaining fluid 12 are at least partially solidified. Depending on the composition of the invading fluid 14 and/or the fluid 12, the solidification process optionally includes the application of heat, light or cooling. For example, the cooling process is optionally conducted by applying cold water or steam. Suitably, the cooling water or steam is recycled using reverse osmosis, followed by evaporation. For example, the solidification of a polymer material 14 is optionally achieved: through cooling by applying water at temperatures below the melting point (e.g., in the range of approximately 32-100° F.); through curing by ultraviolet (UV) radiation; through heating by other radiation sources (e.g., such as infrared (IR) or near-IR); through curing by application of steam; through curing by e-beam; etc.

In one exemplary embodiment, the fluid 14 and fluid 12 optionally react with each other to form another material, e.g., which is at least partially solid. For example, fluid 14 can contain monomers such as acrylates and epoxies which can react and solidify upon contact with fluid 12, which contains curing agents such as peroxides or amines. In another example, fluid 14 and fluid 12 can contain positively- and negatively-charged polyelectrolytes, which react upon contact to form an insoluble complex.

In another exemplary embodiment, either the fluid 14, fluid 12 or both can react with the lattice construction 10. As an example, the lattice construction 10 is optionally made of a dry or solidified curing agent and the fluid 14, fluid 12 or both contain monomers that react with the curing agent. In yet another example, the lattice construction can be made of bivalent ionic salts such as magnesium or zinc oxides and fluid 14, fluid 12 or both contain negatively-charged polyelectrolytes (e.g., polyacrylic acid), such that the reaction there between results in a solid insoluble polyacrylic acid-zinc salt.

In still another embodiment, the fluid 14 and the fluid 12 can be partially miscible fluids which phase separate upon contact. For example, fluid 14 can be an alcoholic solution of polyvinylbutyral which phase separates upon mixing with water (i.e., fluid 12). Furthermore, the phase separation can be such that, the final precipitated phase have a micellar, lamellar, hexagonal, or bicontinuous structure. As a further example, the fluid 14 can also contain oils or silanes which form a micellar, lamellar, or bicontinuous phase upon mixing with water-nonionic (amphiphilic block copolymer, Pluronic F127, BASF) surfactant mixtures.

In any event, upon the completion of step 310, the intermediate composite material 16 has been achieved. Suitably, the process may end here if the intermediate composite material 16 is the desire production output. Alternately, however, additional steps 410 and 412 may optionally be carried out to remove at least a portion of at least one of the composite material components as desired, e.g., to obtain a microstructured and/or porous final material 18.

Optionally, the lattice construction 10 is at least partially removed from the composite material 16 produced in step 310. Of course, in one suitable embodiment, the lattice construction 10 is substantially removed in its entirety. Suitably, the removal process (e.g., steps 410 and 412) involves dissolving, washing, etching, vaporizing and/or volatilizing away the unwanted portion of the lattice construction 10. Alternately, other known method can be used remove or eliminate the unwanted portion of the lattice construction 10.

Figure 5:
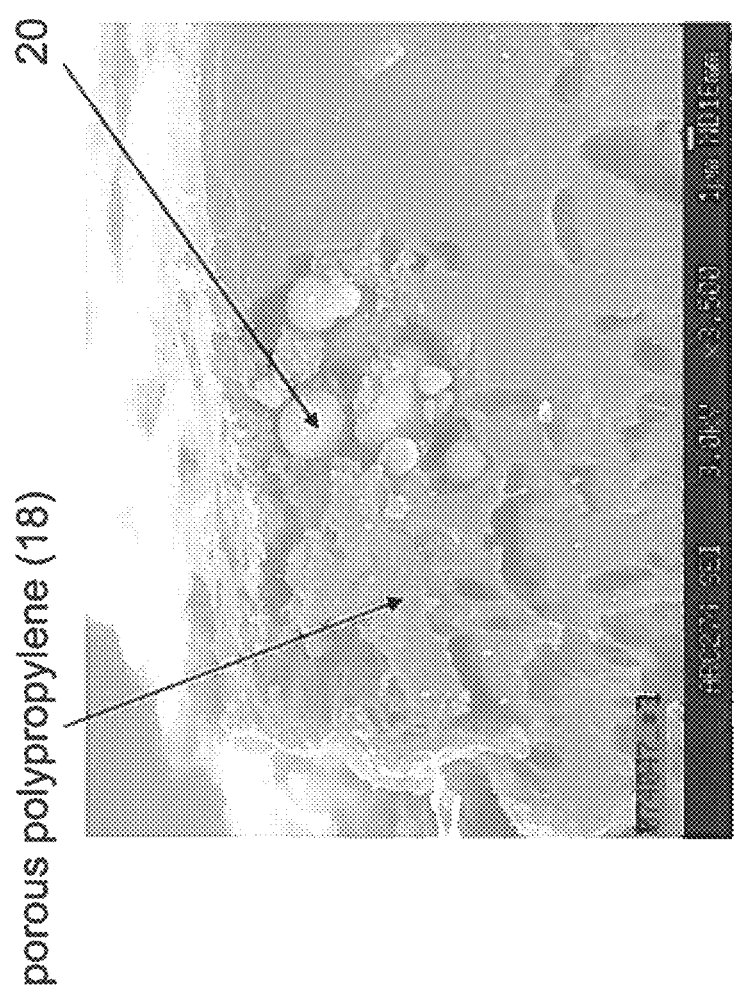
FIG. 5 is an SEM (Scanning Electron Microscope) image showing in cross-section a material produced in accordance with aspects of the present inventive subject matter, said material being a porous composite material encapsulating a functional particle, namely, a silver coated glass bead.

If the lattice construction 10 is only removed partially, the remaining part may optionally have a specific function in the final composite. For example, the original lattice construction 10 may optionally contain some active material such as catalyst particles (e.g., platinum particles) or antimicrobial agents (e.g., silver particles). Suitably, the catalyst particles or antimicrobial agents may be left behind in the final composite 18 after partial removal of the lattice construction 10. For example, FIG. 5 shows a composite material 18 made of polypropylene and silver coated glass beads 20. In production, the silver coated glass beads were originally mixed with salt particles to make the lattice construction 10. The polypropylene was then invaded into the salt and silver coated glass bead lattice construction 10. After solidification, the salt particles were washed away, leaving the silver coated glass beads in the final composite 18. In part due to its large size compare to the salt particles (which in general determined the size of the pores created in the polypropylene) and also its insolubility in the washing liquid, the silver coated beads remained in the final composite 18.

In any event, as shown in FIG. 4, at step 410 the composite material 16 is washed in a solvent or other like liquid or fluid material to remove the unwanted portion of the lattice construction 10 therefrom. Finally, a dry step (i.e., step 412) is optionally executed to evaporate or otherwise remove or eliminate any remaining washing fluid, thereby leaving the final structured/porous material 18.

Figure 6:
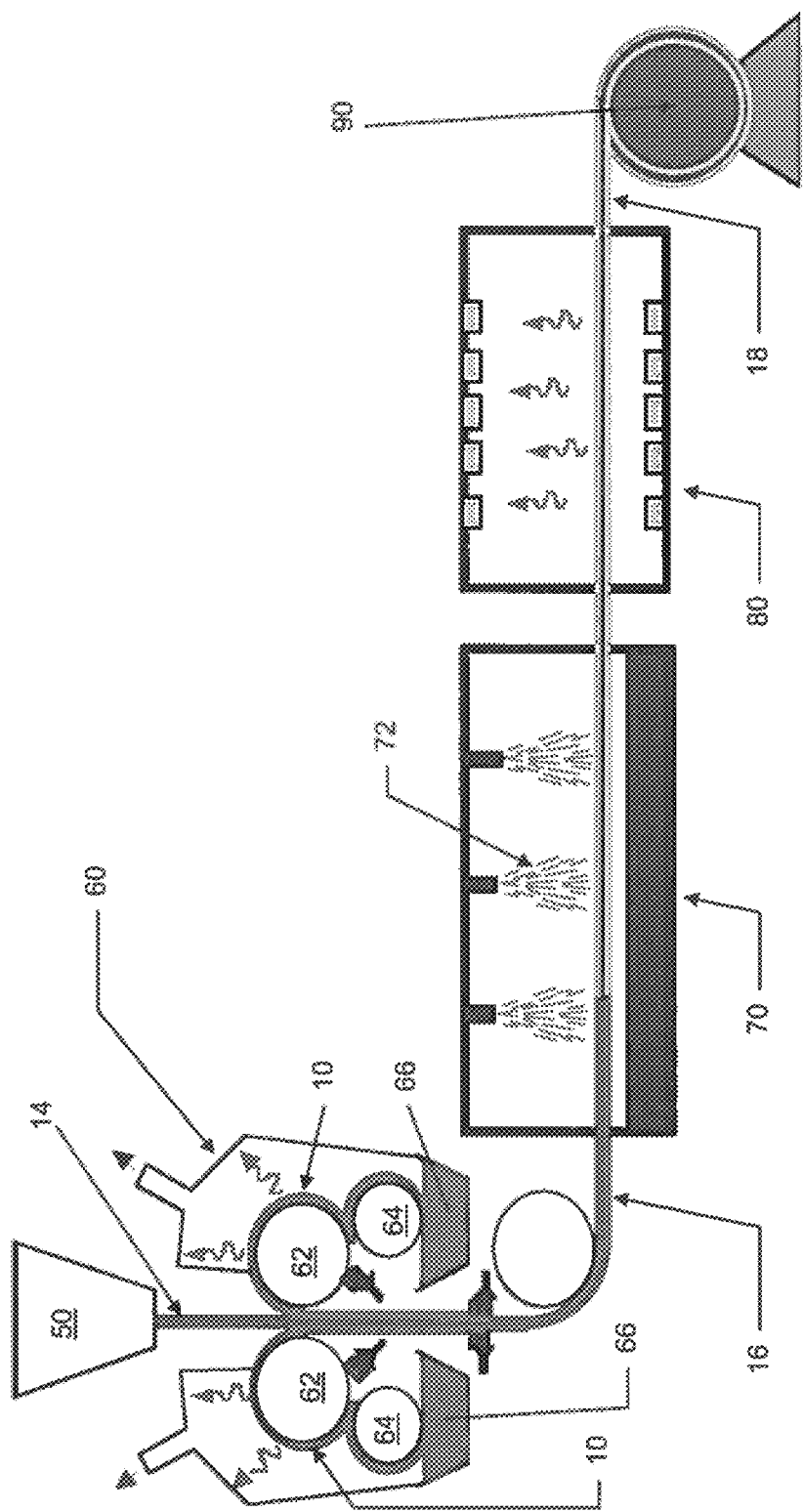
FIG. 6 is a schematic diagram showing an exemplary apparatus for carry out an exemplary material production process as disclosed herein.

With reference now to FIG. 6, there is illustrated a schematic diagram of an exemplary apparatus for carrying out the production process described herein. As illustrated, an extruder 50 outputs a film of molten polymer (i.e., the fluid material 14) which is routed between two pressure rollers 62 of a press 60. Suitably, each pressure roller 62 has formed on an outer surface thereof a lattice construction 10. As shown, to form the lattice construction 10 on each pressure roller 62, a coating roller 64 coats the pressure roll 62 with a liquid or fluid 66 containing a solid suspension of the granular material which is to form the lattice construction 10. After the liquid or fluid 66 containing the solid suspension is coated on the pressure roller, the liquid or fluid is evaporate, dried off or otherwise removed to leave behind the lattice construction 10 on the outer surface of the pressure roller 62.

Upon passing between the pressure rollers 62, the molten polymer (i.e., fluid material 14) is pressed and/or flowed into the lattice constructions 10 on the surface of either pressure roller 62. That is to say, the material 14 invades the lattice constructions 10, e.g., as previously described. As the film advances out from between the pressure rollers 62, the lattice constructions 10 are carried therewith having been invaded by and/or embedded in the molten polymer. Accordingly, upon exiting the press 60, a web of composite material 16 is formed including the polymer material 14, e.g., which is suitably solidified and which now contains the lattice constructions 10 picked-up from the pressure rollers 62.

As shown in FIG. 6, the web of composite material 16 is then routed through a washing station 70, where it is sprayed, washed and/or otherwise treated to remove some portion or substantially all of the lattice construction 10. In particular, the washing liquid or fluid 72 applied in the washing station 70 is optionally a solvent that dissolves the unwanted portion of the lattice construction 10. Suitably, after passing through the washing station 70, the web is then routed through a drying station or oven 80 which dries the web and/or evaporates off any remaining washing fluid, thereby leaving a web of structured/porous material 18. Finally, the web of structured/porous material 18 is then wound on a roll 90. Of course, where the composite material 16 is the desired production output, the washing station 70 and/or oven 80 may optionally be omitted or bypassed.

As can be appreciated from the above example, the extruded film was processed on both sides thereof resulting in an intermediate composite material 16 with lattice constructions on both sides thereof and a final structured film material 18 with pores formed on both sides thereof. Alternately, only one side of the film may be so processed consequently resulting in composite material 16 with only one side containing the lattice construction 10 and/or a final structured material 18 have only one porous side. Additionally, as previously mentioned, the suspension liquid or fluid 66 (i.e., containing the solid suspension of granular material that is to make-up the lattice construction 10) is optionally pattern coated, printed or otherwise selectively applied to the surface of the pressure rollers 62 so that the lattice construction 10 is formed in accordance with the pattern and the resulting composite material 16 and/or structured material 18 reflect that same pattern. Additionally, it is to be appreciated that the lattice construction 10 can remain and/or pores can be created a various depths within the film, e.g., they can range anywhere from essentially mere surface features or may penetrate the entire thickness of the film. For example, by controlling the pressure between the rollers 62 and/or the weight and/or thickness of the coating on the rollers 62 (and hence the height of the formed lattice construction 10), one can likewise control the depth to which the lattice construction 10 penetrates the film and/or the depth at which pores are formed.

In one exemplary embodiment, the lattice construction 10 is optionally formed or otherwise arranged so that the granule or particle size or size-distribution or the like progressively varies with respect to the depth or height of the lattice construction 10. For example, such a gradient may be achieve by applying a number of successive coatings to the pressure roller 62 to build up the lattice construction 10, where each successive coating contains a solid suspension of granules or particles having a somewhat larger or smaller size or size-distribution as compared to the prior coating. In turn, such a lattice construction 10 produces a film or material 18 which has a corresponding gradient of porosity across its thickness.

In any event, as described above, when employing the techniques described herein to produce the porous material 18, the relevant information on the morphology of the pore space can be known a priori, i.e., before the porous material 18 is even fabricated. This lead to some significant results. For example, because one has substantially complete information on the pore space morphology, one does not have to use such methods as the nitrogen adsorption (BET), mercury porosimetry, flow permporometry, etc., in order to determine what is classically called the pore size distribution which is, in fact, the size distribution of the narrow channels. This is advantageous insomuch as such methods either do not provide complete information, or are limited to certain size ranges. Additionally, the present techniques offer considerable flexibility. That is to say, one can design any desired size distribution by selecting the appropriate particle shape and size distribution. Such control is particularly valuable to applications involving the passage of a fluid through the porous material 18. The size of the granular solids—that is, the size of the pore bodies—can be controlled, so that the desired particle size distribution is obtained. As already stated, a granular solid having a desired size-distribution and particle shapes can be prepared by precipitation or recrystallization. For example, if a salt is dissolved in water first to make a salt solution, then the solution is added to a nonsolvent (such as acetone), the salt starts to precipitate. By controlling the amount of salt solution, the temperature and other thermodynamic factors, as well as the mixing conditions, one can obtain a wide range of sizes for the salt crystals. The size of the pore throats may also be selectively controlled and/or varied. For example, by adding a small amount of a nonvolatile (high boiling point) liquid (such as propylene glycol, glycerin, etc.), or a water-soluble polymer (such as polyethylene glycol, polyethylene oxide, etc.) to the solvent, then, upon drying, the added liquid or water-soluble polymer will make bridges in the contact area between the particles and expand the size of the pore throats. After imbibition by the fluid 14 and its solidification, the granular solids and the nonvolatile liquid, or the water-soluble polymer, are leached out, leaving behind the larger pore throats. Much larger and long throats may also be generated in the porous material, if the solution is mixed by soluble fibers, or rod-like crystals. After they are washed off, they leave behind large channels. Alternatively, if the fibers are insoluble, they reinforce the final matrix. Notably, such a precise control on the pore space morphology of the material cannot be attained by conventional methods such as polymer precipitation through cooling or by solvent evaporation. In the former case, the pore volume of the material is controlled by the initial composition of the solution, while the spatial distribution and size of the pores are determined by the rate of cooling. In the latter method, the pore structure is controlled by the rate of evaporation. However, even precise control of such factors generally does not provide any knowledge on the size distributions of the pore bodies and pore throats; accordingly, they still have to be measured afterwards.

EXPERIMENTS/EXAMPLES

Various experiments have been conducted to demonstrate the techniques described herein for producing composite materials and/or structured or porous materials. The experiments also demonstrate the flexibility of the disclosed techniques for producing various different materials. A description of the experiments and their findings are reported below. All experiments include: a step of making of the lattice construction 10 (also referred to as a "cake") and invading the construction 10 with a fluid material 14. Optionally, at least a portion of the lattice construction 10 is later removed by dissolution or washing. The constructions 10 in these examples were prepared from particles as purchased or further processed (e.g., milled, sieved, recrystallized, etc.) in order to have the desired particle size and/or particle size distribution. The materials used in these experiments are listed in Table 1 below.

TABLE 1

| Short Name | Full Name | Grade/ Part No. | Supplier/ Manufacturer | Supplier/ Manufacturer Address | Notes |
| --- | --- | --- | --- | --- | --- |
| LLDPE1 | Low Density Polyethylene | Dowlex 3010 | Dow Chemical | 2030 Dow Center, Midland, MI 48674 | |
| TPX | Polymethylpentene | 1481T11 | McMaster Carr Supply Co. | 9630 Norwalk Blvd., Santa Fe Springs, CA 90670-2932 | |

TABLE 1-continued

| Short Name | Full Name | Grade/ Part No. | Supplier/ Manufacturer | Supplier/ Manufacturer Address | Notes |
|---|---|---|---|---|---|
| Nylon | Nylon | 0.48 gauge | Honeywell | Pottsville, PA 17901 | |
| FEP | Fluorinated Ethylene Propylene | 85905K64 | McMaster Carr Supply Co. | 9630 Norwalk Blvd., Santa Fe Springs, CA 90670-2932 | |
| PSF | Polysulfone | Thermalux | Westlake Plastics Company | P.O. Box 127, Lenni, Pennsylvania | |
| Salt | Sodium Chloride | Table Salt | Brand Chef's Review/Smart & Final | 3299 E. Colorado Blvd., Pasadena, CA 91107 | |
| Morton Salt | Sodium Chloride | EX FN 200 Salt | Morton Salt Consumer Products | 123 North Wacker Drive, Chicago, IL 60606-1743 | |
| Ryan Fiber | Natural Ryon Flock Fiber | RCEB2-0240-55D | Claremeont Flock Corp | 107 Scott Drive, Leominster, MA 01453 | |
| Ag @ Glass | Silver Coated Glass Sphere | Silglass 30-711 | Technic Engineered Powders Division | 300 Park East Drive, Woonsocket, Rhode Island 02895 | |
| Ag @ Cu | Silver Coated Copper Particles | Lot. No. 92549 | Umicore Canada Inc. | P.O. Box 3538, Fort Saskatchewan AB T8L 2T4 | Average Particle~3 um |
| Fe | Feronyl Iron | 1140150 | International Specialty Products | 1361 Alps Road, Wayne, New Jersey 07470 | |
| Cement | Cement | VersaBond Flex Fortified Thin-Set Mortar | Custom Building Products | 13001 Seal Beach Blvd., Seal Beach, CA 90740 | Dry Milled~35 um |
| SiC (g) | Green Silicon Carbide Powder | Lot. No. 3233 | Electro Abrasives Corp. | 701 Willet Road, Buffalo, NY 14218 | 280 Mesh |
| IPA | Isopropanol | 20290 | Ashland Inc. | Los Angeles, CA 90074-3192 | 99% Purity |
| PG | Propylene Glycol | 9402-03 | J.T.Baker/ Mallinckrodt Baker, Inc. | 222 Red School Lane, Phillipsburg NJ 08865 | |
| Nylon Mesh? | Nylon Mesh | | | | |
| Copper Mesh | Copper Mesh | 9224T816 | McMaster Carr Supply Co. | 9630 Norwalk Blvd., Santa Fe Springs, CA 90670-2932 | 100 Mesh |
| PP Surlyn | Polypropylene Ionomer | | E. I. duPont de Nemours & Co. | Wilmington, DE 19898 | |
| HCl | Hydrochloric acid | | | | 1N |
| Epoxy | Two-Part Epoxy | Devcon 5-Minute Epoxy | McMaster Carr Supply Co. | 9630 Norwalk Blvd., Santa Fe Springs, CA 90670-2932 | |

Materials used for preparation of salt cake
1. Chef's Review Plain Vacuum Granulated Table Salt with Anti-caking agent Yellow Prussiate of Soda (cube size ~350 μm) (Los Angeles, Calif.)
2. 99% Isopropyl Alcohol
3. JT Baker Propylene Glycol (Phillipsburg, N.J.)
4. US Stoneware Cylindrical Ceramic Alumina Burundum Grinding media ½ inch radius end cylinder (East Palestine, Ohio)
5. US Stoneware Roalox Jar 775-0 (Volume: 1.8 L) (East Palestine, Ohio)
6. Carver Auto Series Automatic Hydraulic Press (Wabash, Ind.)
7. Paul N. Gardner Co. 8-path wet film applicator #25 and #14 (Pompano Beach, Fla.)
8. McMaster-Carr Polyester Felt Filter Bag 25 μm (Elmhurt, Ill.)
9. Davis Standard 2.5 inch diameter screw; length/diameter: 20 (Pawcatuck, Conn.)

Preparation of Slurry from Powder or Powder Mixture

As received powders were dispersed in a liquid medium (normally IPA) at approximately 25 to 45 percent solids (volume basis) and mixed thoroughly and stored in sealed glass jars prior to usage.

Preparation of Salt Slurry by Ball Milling

Grinding media (ceramic balls) was placed in a jar mill to fill 45-55% of the jar capacity. About 1 kg of salt was poured into the jar along with enough IPA to cover the media by approximately 1 inch. The jar was placed on rollers at 235 rpm and the salt was milled for 7 days. The salt slurry formed was then diluted with additional IPA and filtered through a 25 μm filter. The filtered salt particles were then allowed to settle and the IPA was decanted. Propylene Glycol was added to the salt resulting in salt slurry with 60% solids.

Preparation of Slurry Using an Attrition Mill

Figure 7:
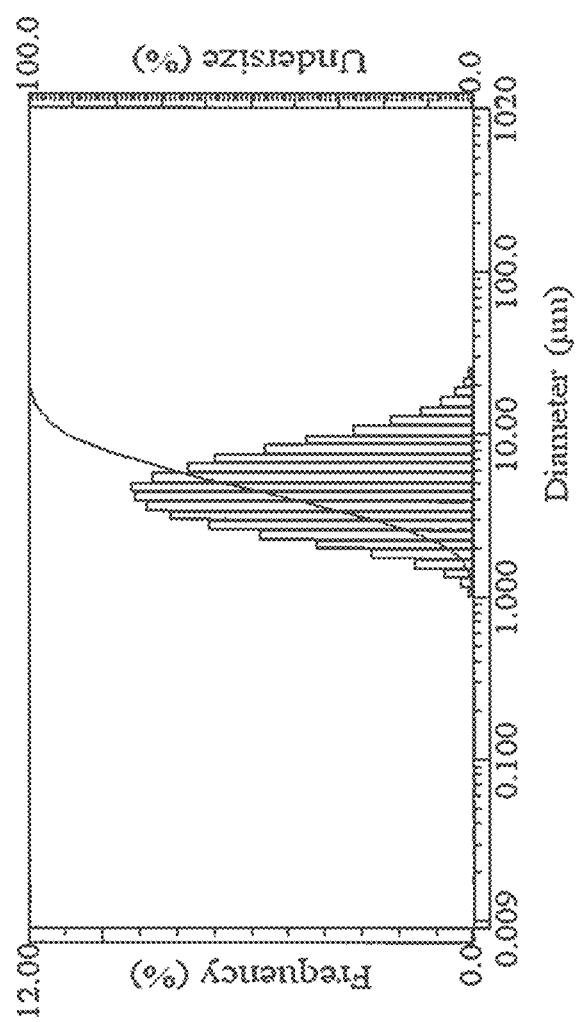
FIG. 7 is a graph illustrating an exemplary particle size-distribution of a slurry used to prepare lattice constructions in accordance with aspects of the present inventive subject matter.

The slurry was also prepared by milling the as received powders in a liquid medium using an attrition mill (Union Process, Model 1S). In an example formulation, 1 kg of dry salt (NaCl) was added to 0.538 kg of IPA and milled using ¼" ceramic balls for 15 minutes at 250 rpm. The ¼" ceramic balls were replaced by ⅛" ceramic balls and the slurry was milled for another 15 minutes. The slurry was drained out and stored in a sealed glass jar for later use. FIG. 7 shows a typical particle size distribution of the salt slurry measured by light scattering using a Horiba Laser Scattering Particle Size Distribution Analyzer, Model LA910.

Preparation of Fine Particles Using Dry Milling

Fine salt particles were also prepared using dry attrition milling. The attrition mill was heated using hot water (150° F.) and maintained at 140° F. to remove the moisture from the salt. 1 kg of dry salt was added and milled using ¼" ceramic balls for 30 minutes at 250 rpm. A stainless steel sieve (mesh 4, W.S. Tyler Corporation) was used to separate the ceramic balls from dry salt powder. This resulted to a fine dry salt powder with an average particle size of 18 microns measured by light scattering using a Horiba Laser Scattering Particle Size Distribution Analyzer, Model LA910. The dry powder was stored in a sealed glass jar. This powder was dispersed in IPA for further use as described earlier.

Preparation of Slurry Mixtures

As prepared slurry was mixed with different kinds of powders and thoroughly homogenized and stored in glass jar for later use. Experiments/Examples No. 11 and 12 are examples of this process.

Preparation of Lattice Construction/Cake from the Slurry

A lattice construction/cake was prepared by coating the slurry (<1000 centipoise at 200 1/s) on a 0.0045" thick siliconized paper (Loparex Co.) or 4-mil aluminum foil using Byrd bar (Gardco wet film applicator) at various wet thicknesses and dried in an oven at 70° C. for 1-10 minute.

A lattice construction/cake was also prepared by directly coating the dry powder on a siliconized paper (Loparex Co.) and compacted using a roller.

Invasion of the Lattice Construction/Cake with a Molten Polymer

Figure 8:
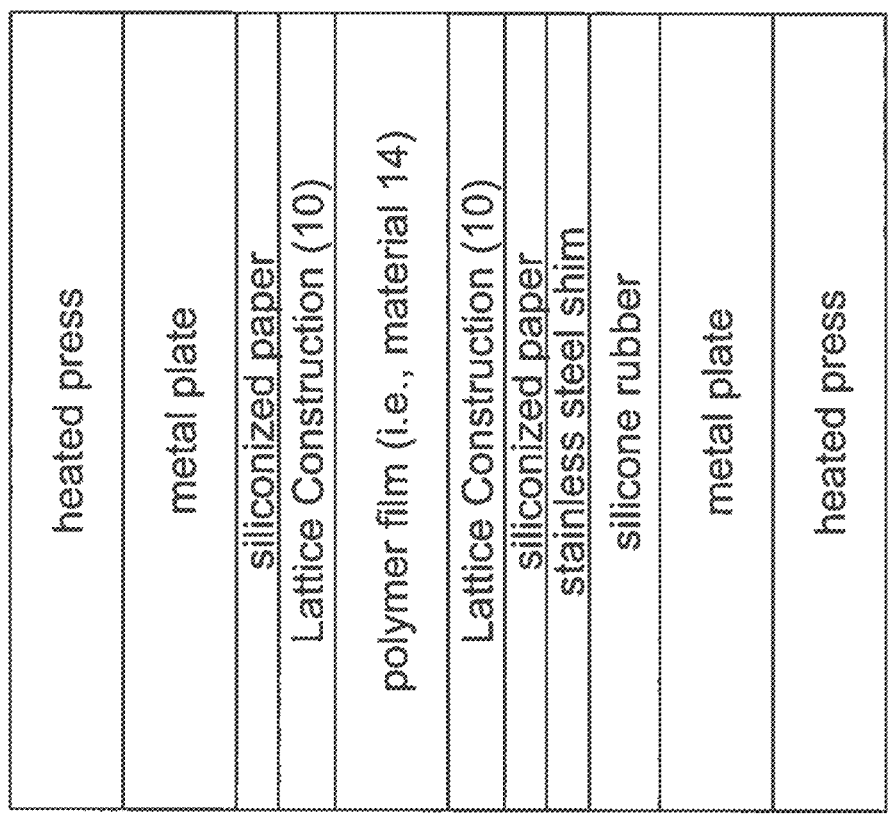
FIG. 8 is a schematic diagram showing an exemplary set-up used in experiments to prepare sample materials in accordance with aspects of the present inventive subject matter.
Figure 10:
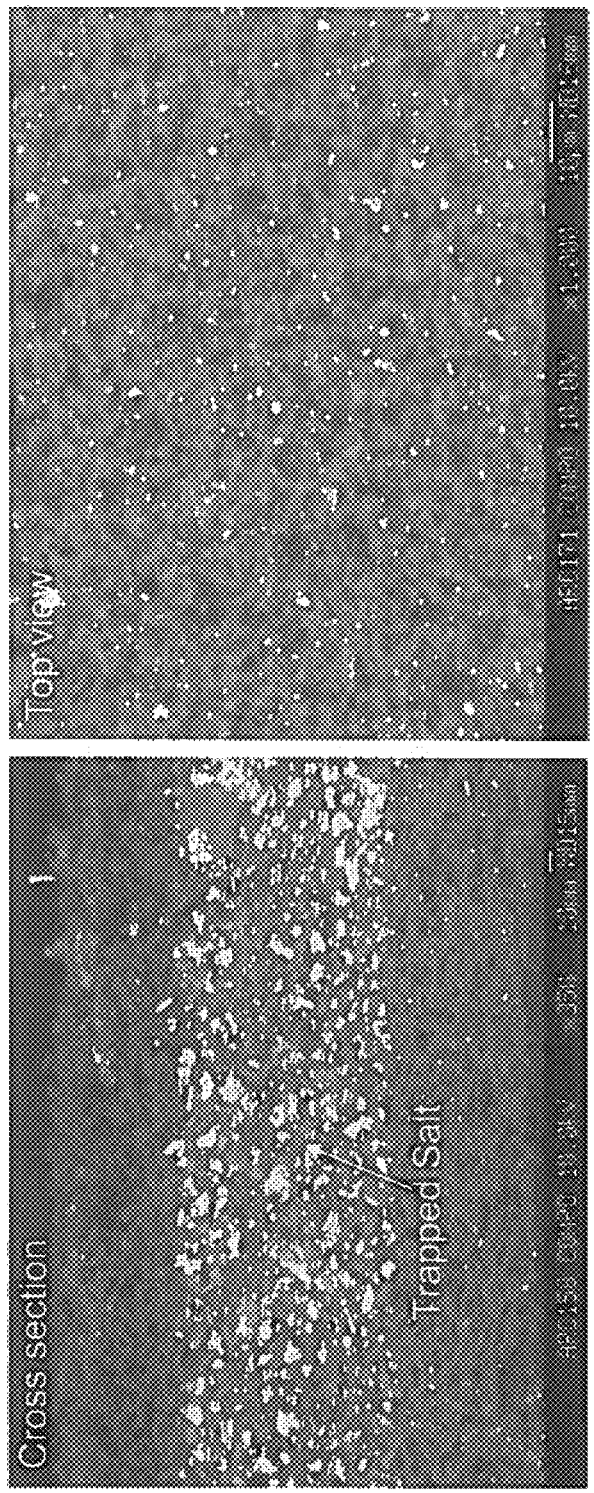
FIGS. 10-39 are SEM images showing top and cross-section views of various sample materials prepared in accordance with aspects of the present inventive subject matter.
Figure 11:
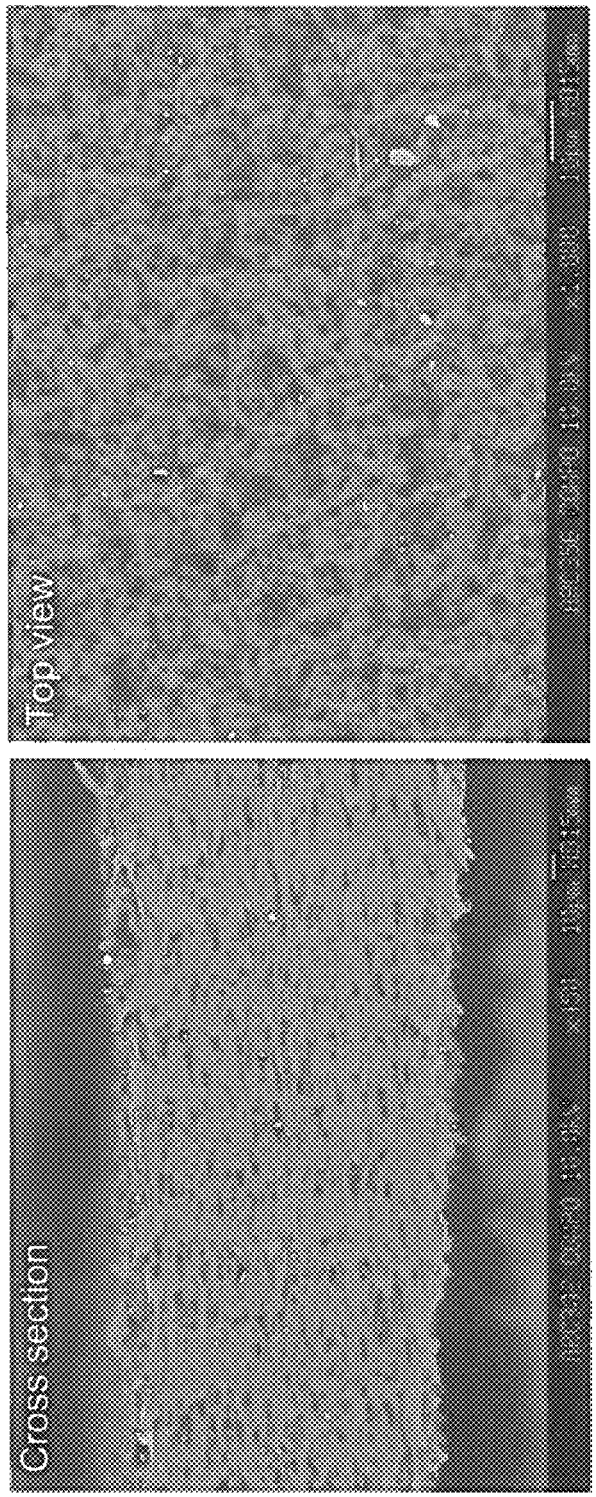

FIG. 8 shows a schematic of a typical set up used to execute the invasion step in experiments with polymer melts. As shown, a polymeric film (i.e., the material 14) was sandwiched between one or two lattice constructions or cakes 10 and pressed with a prescribed temperature, pressure (or force), and dwell times using a heated press (in particular a Carver Press Auto Series—Auto Four/30—Model 3895). Siliconized paper was used for the ease of handling of the lattice constructions. A stainless steel shim combined with silicone rubber was optionally used to reduce cracking which may occur during the process. The experimental conditions for various experiments/examples are given in the table shown in FIGS. 9A, 9B and 9C. Following pressing, the resulting composite material samples (i.e., corresponding to the composite materials 16) were cooled down. In the cases were the lattice constructions/cakes 10 contained salt, the composite material samples were dipped in a large water tank to remove most of the salt particles and subsequently dipped into a second water beaker (for washing). The water temperature in the second beaker was controlled at 50° C. and the water was constantly agitated with a magnetic stir bar for 5 min. The sample was held perpendicular to the water circulation by a plastic comb. This would allow for the substantially complete dissolution of salt particles inside. FIGS. 10 and 11 (from examples 1 and 2) show experimental results with poor and relatively complete washing, respectively.

Figure 12:
Figure 13:
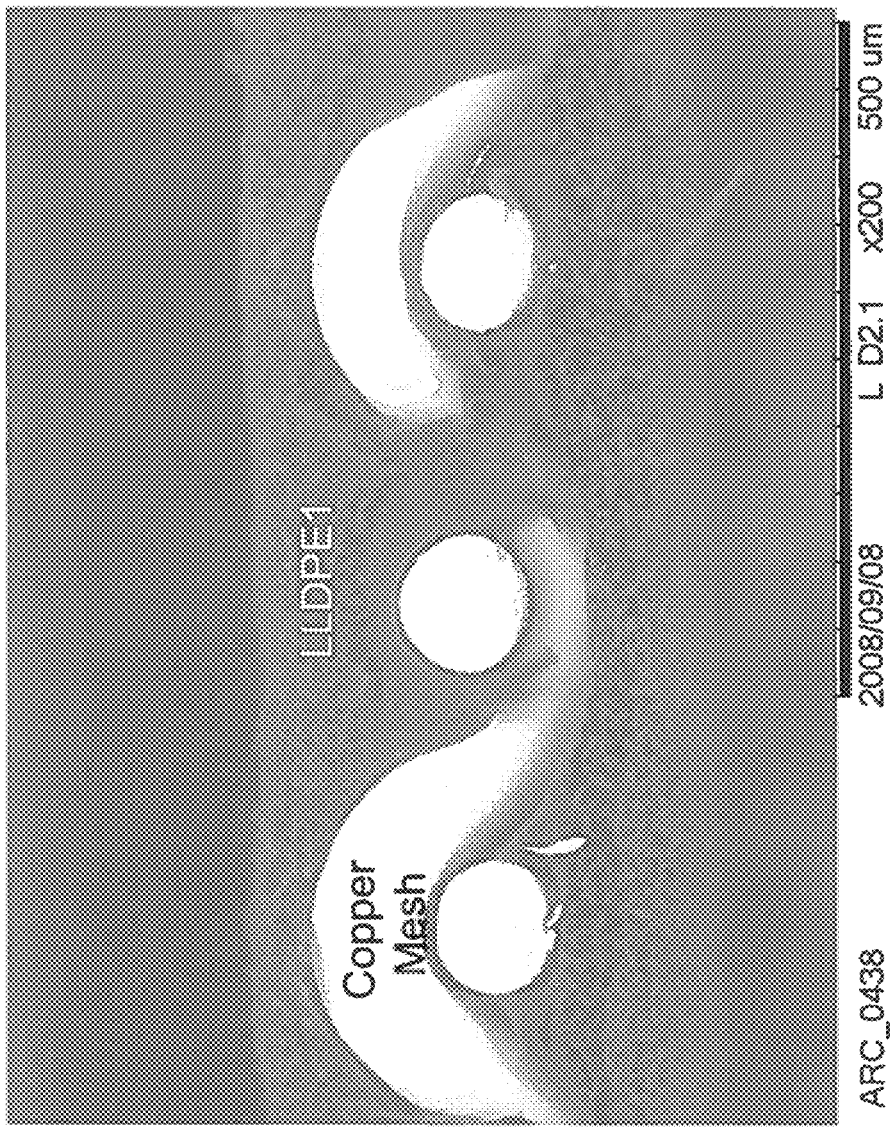
Figure 14:
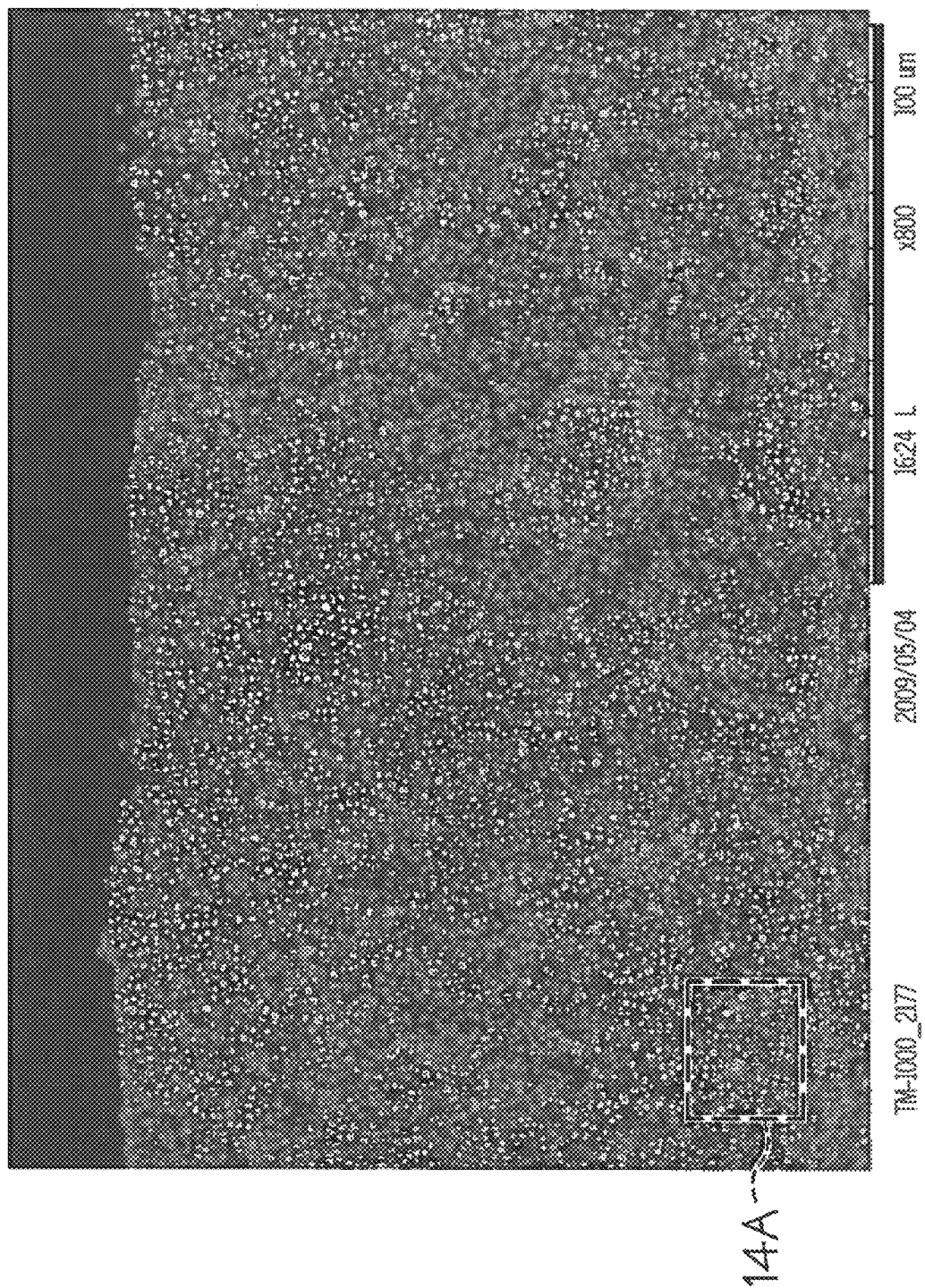
Figure 14A:
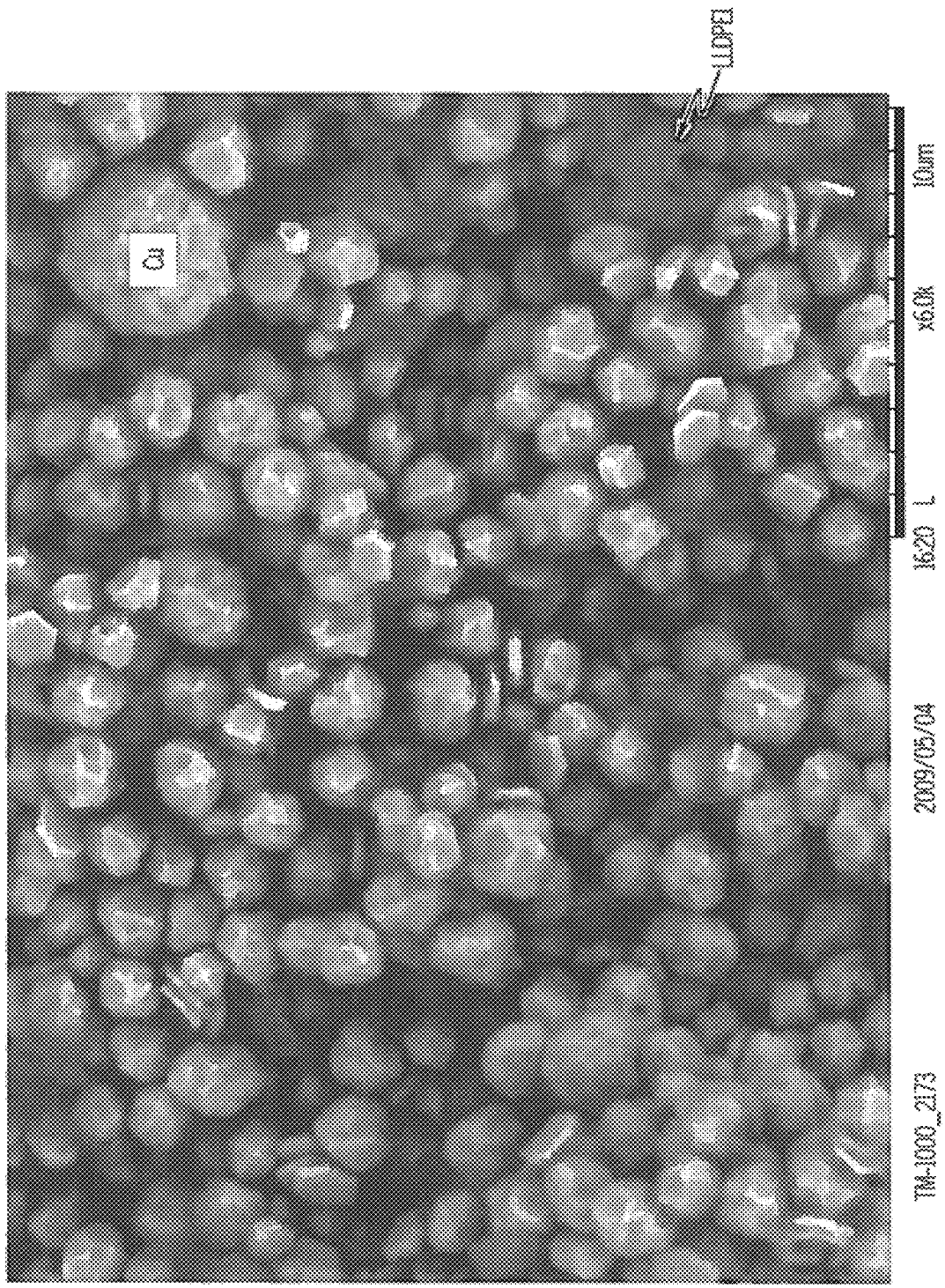
FIG. 14A is a magnified SEM image of a portion of FIG. 14.
Figure 15:
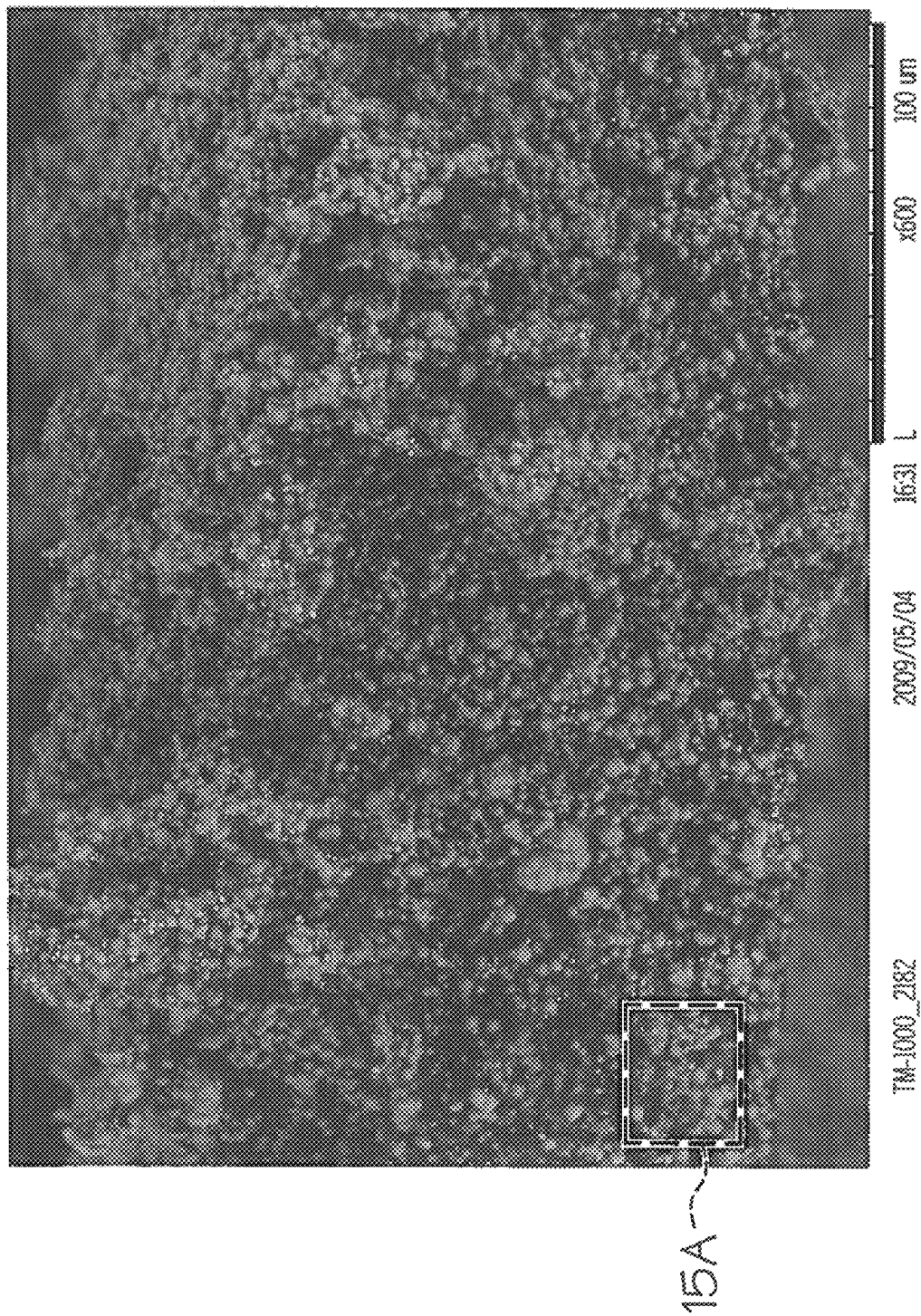
Figure 15A:
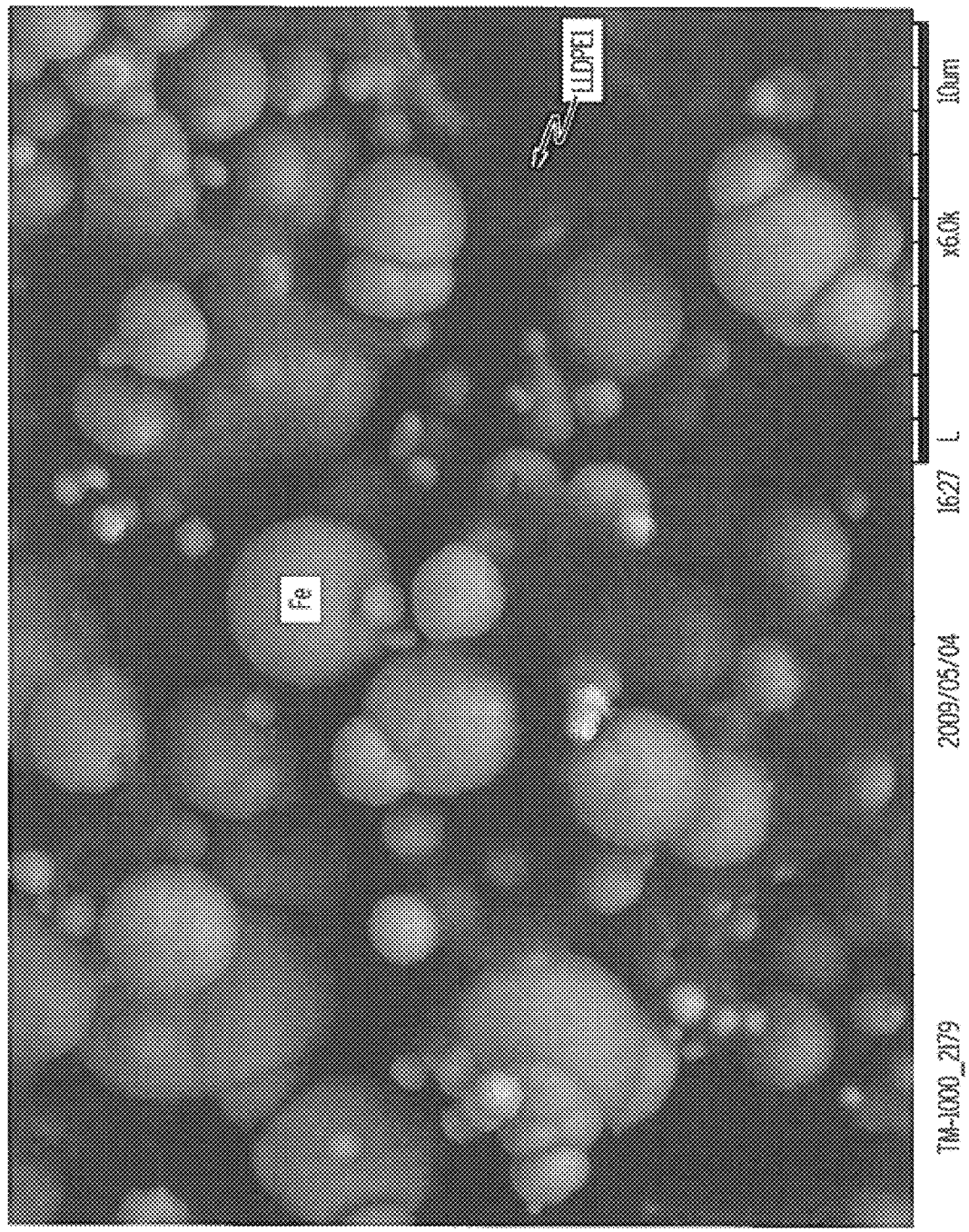
FIG. 15A is a magnified SEM image of a portion of FIG. 15.
Figure 16:
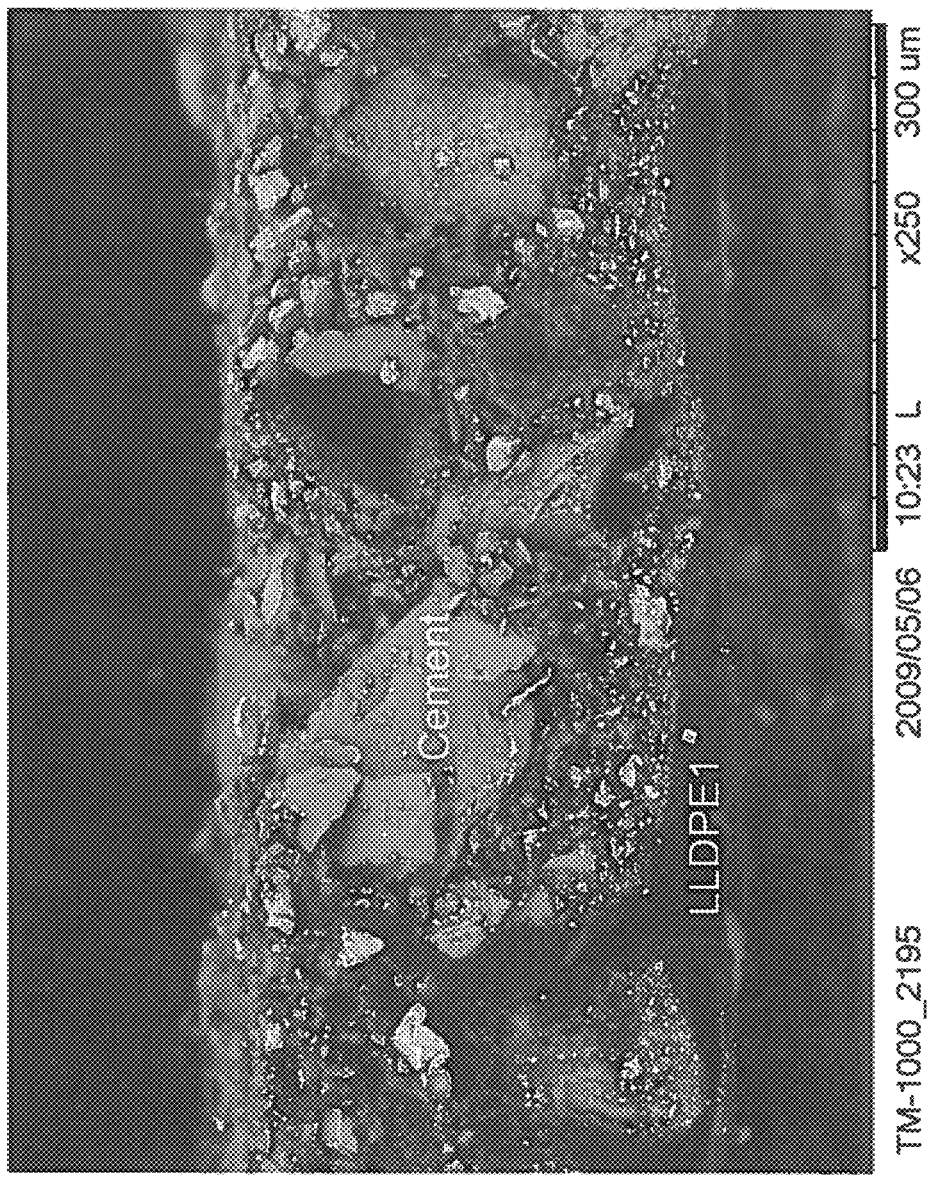
Figure 17:
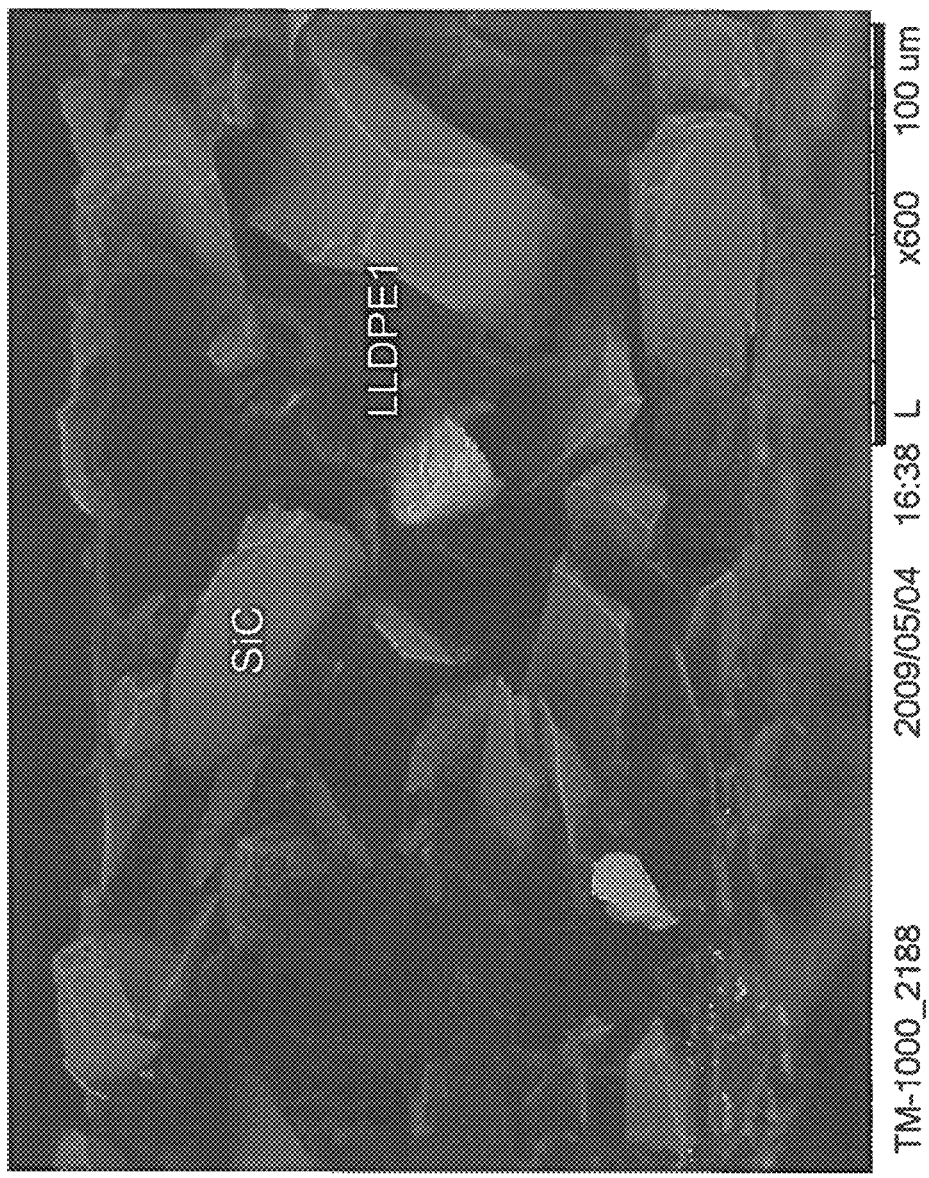
Figure 18:
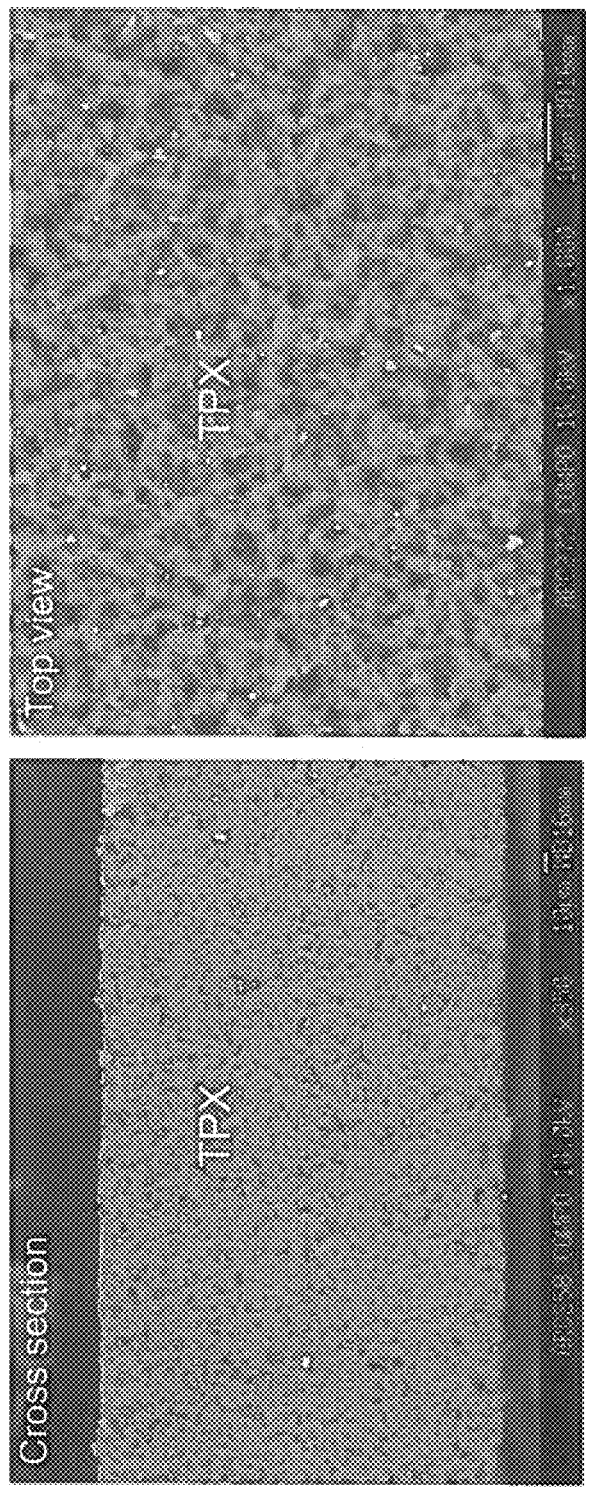

Examples 3 and 4 represent the case were the original lattice construction (salt) was combined with Nylon and copper meshes. The combined lattice constructions (salt and mesh) were invaded with a polymer melt in the set up described above. The composite material samples were then washed in order to remove the salt particles. FIGS. 12 and 13 are SEM images of the resulting material in cross-section.

Examples 5 through 8 illustrate different cases where the lattice construction 10 was made of various particulate materials such as metal powders (iron and silver coated copper) and inorganic materials such as silicon carbide and cement (shown in FIGS. 14-17, 14A and 15A).

Examples 9, 13, 14, and 15 demonstrate various examples in which high performance polymers (TPX, Nylon, FEP, and PSF) were processed according to the herein described method and the salt was completely extracted to form a porous matrix (shown in FIGS. 18, 22, 23, and 24).

Figure 19:
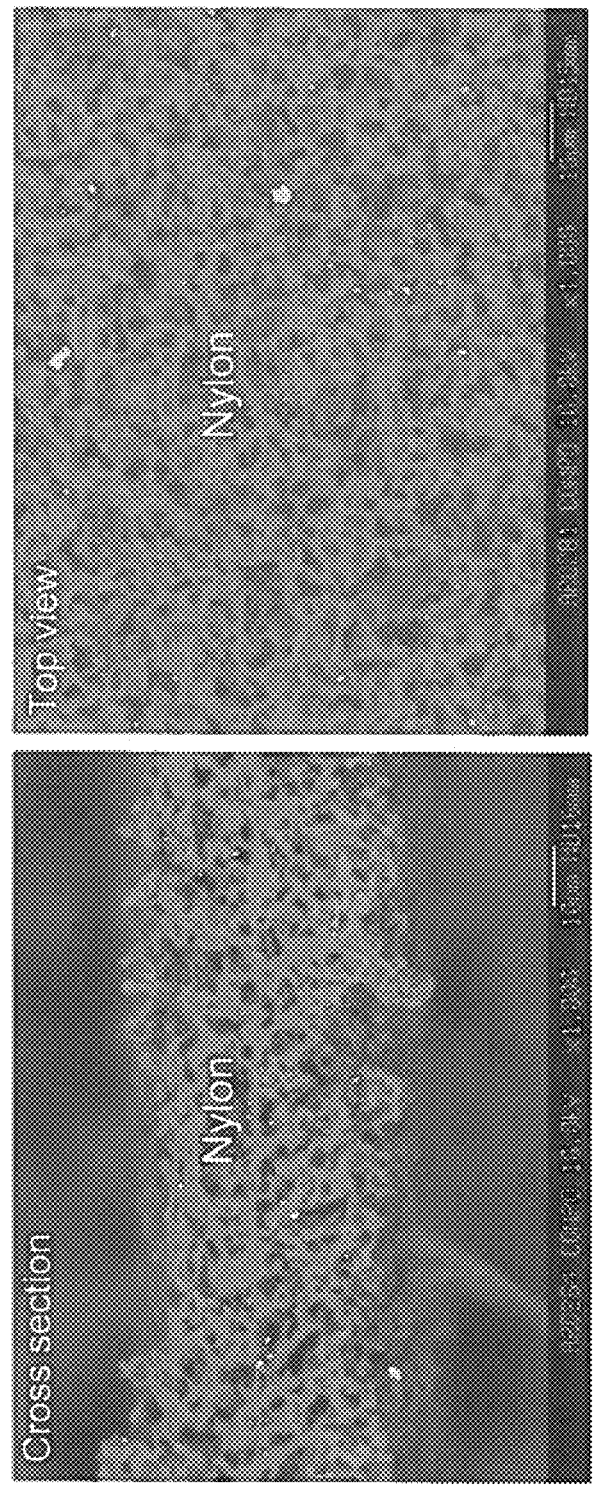

In example 10, a TPX polymeric film was pressed between two dissimilar lattice constructions; one was made from milled salt, whereas the other was made from slurry of Morton salt in IPA. FIG. 19 shows the resulting different pore structures on either side of the film.

Figure 20:
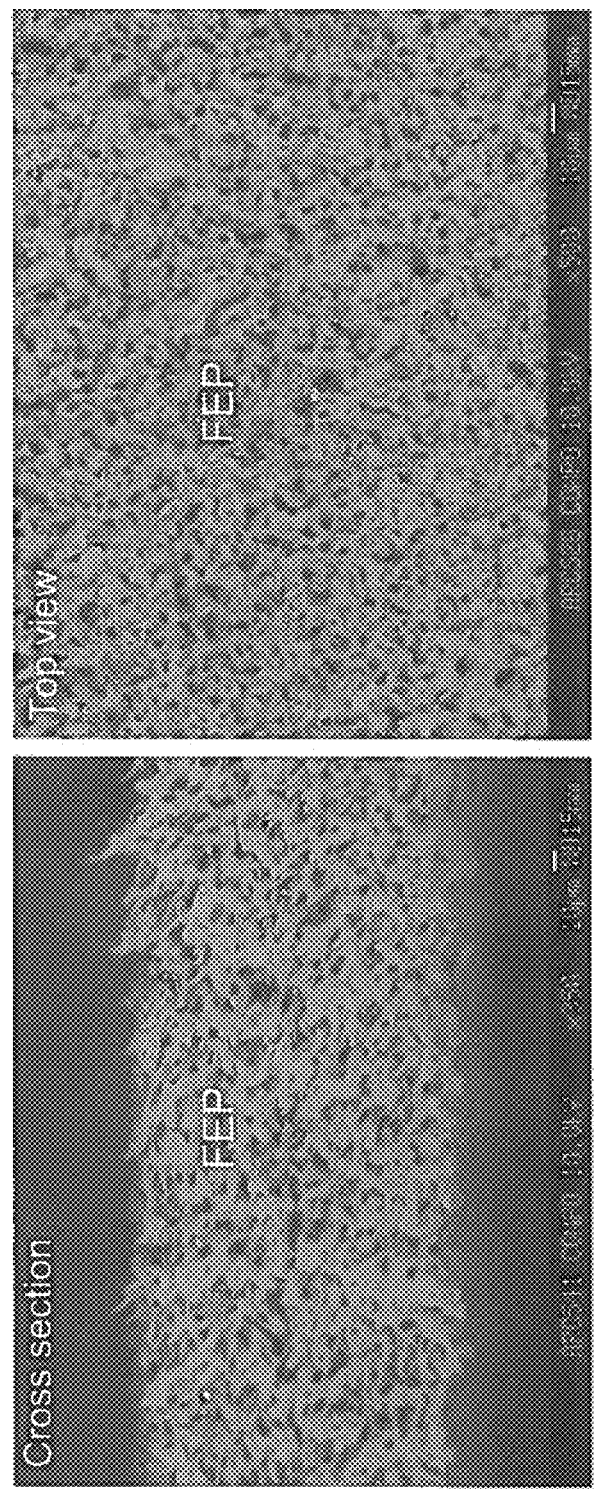
Figure 21:
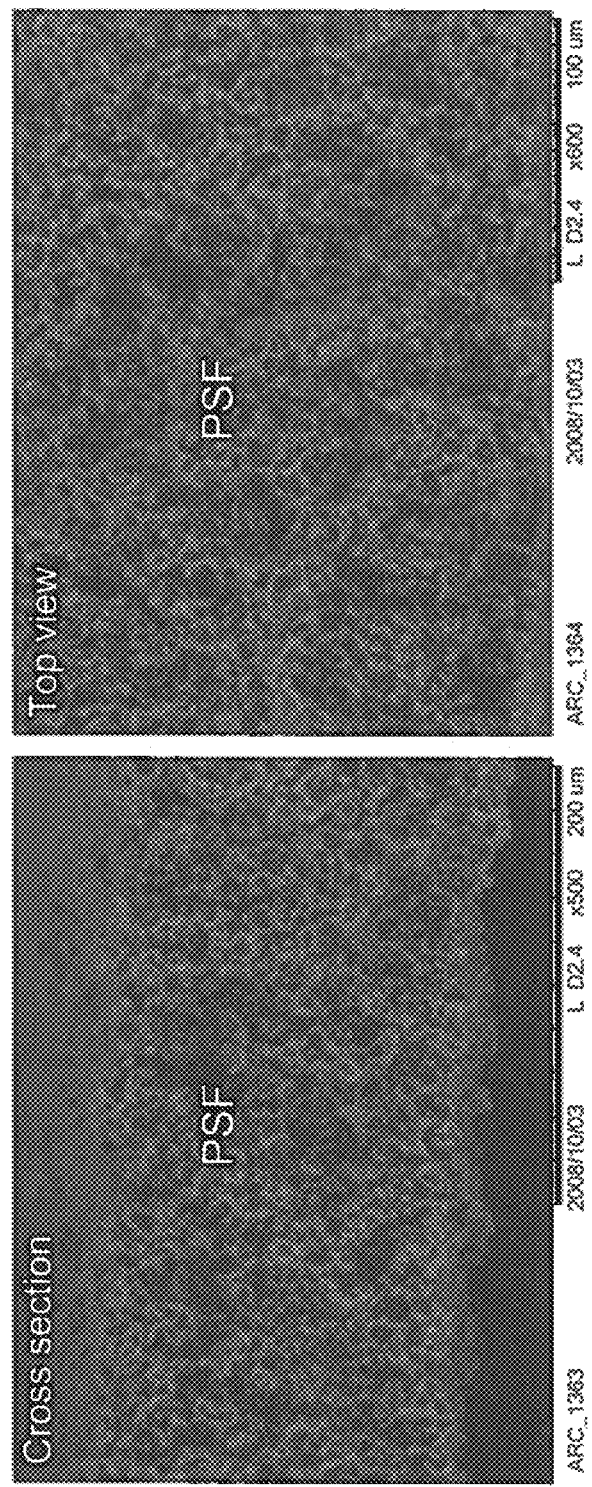
Figure 22:
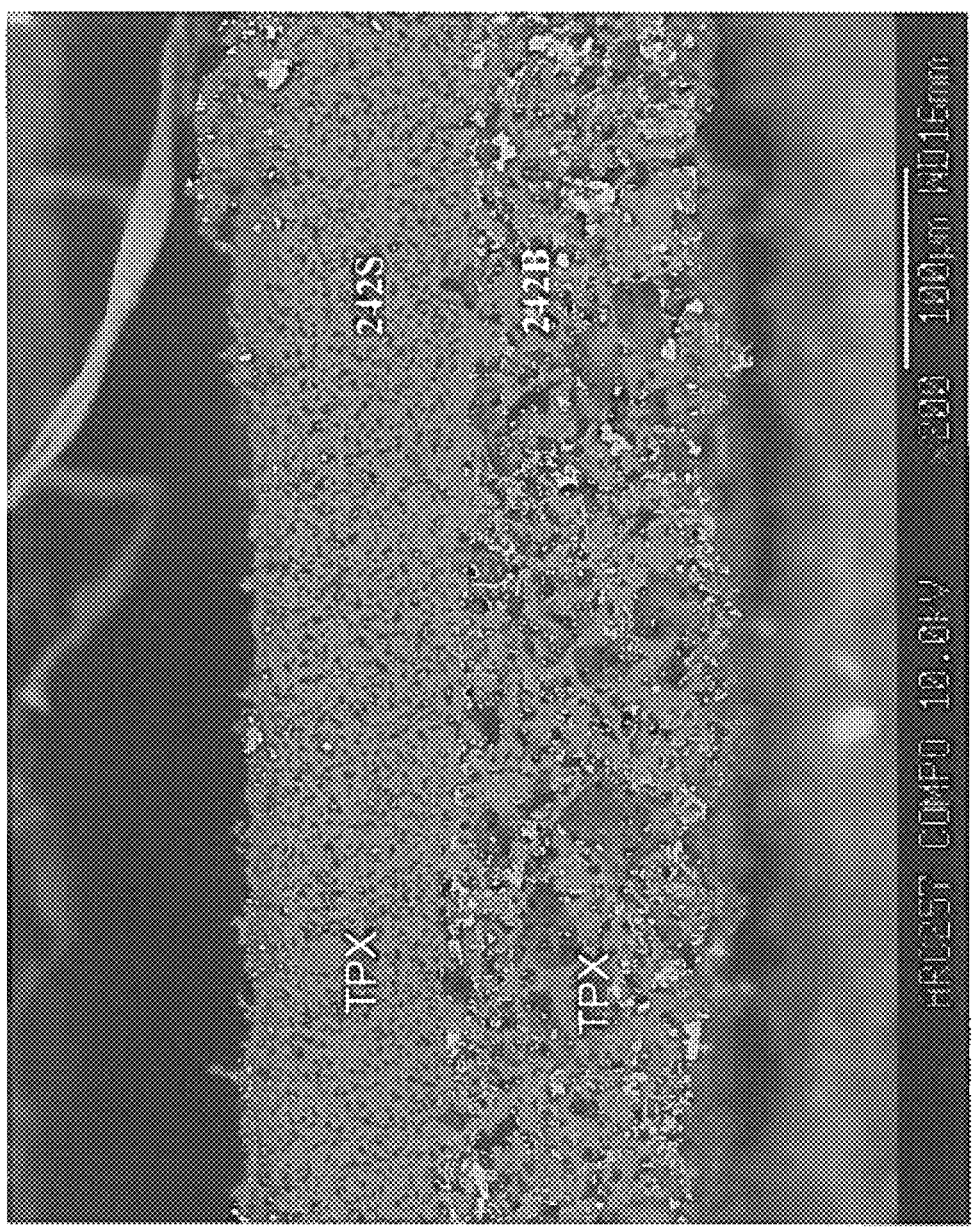
Figure 23:
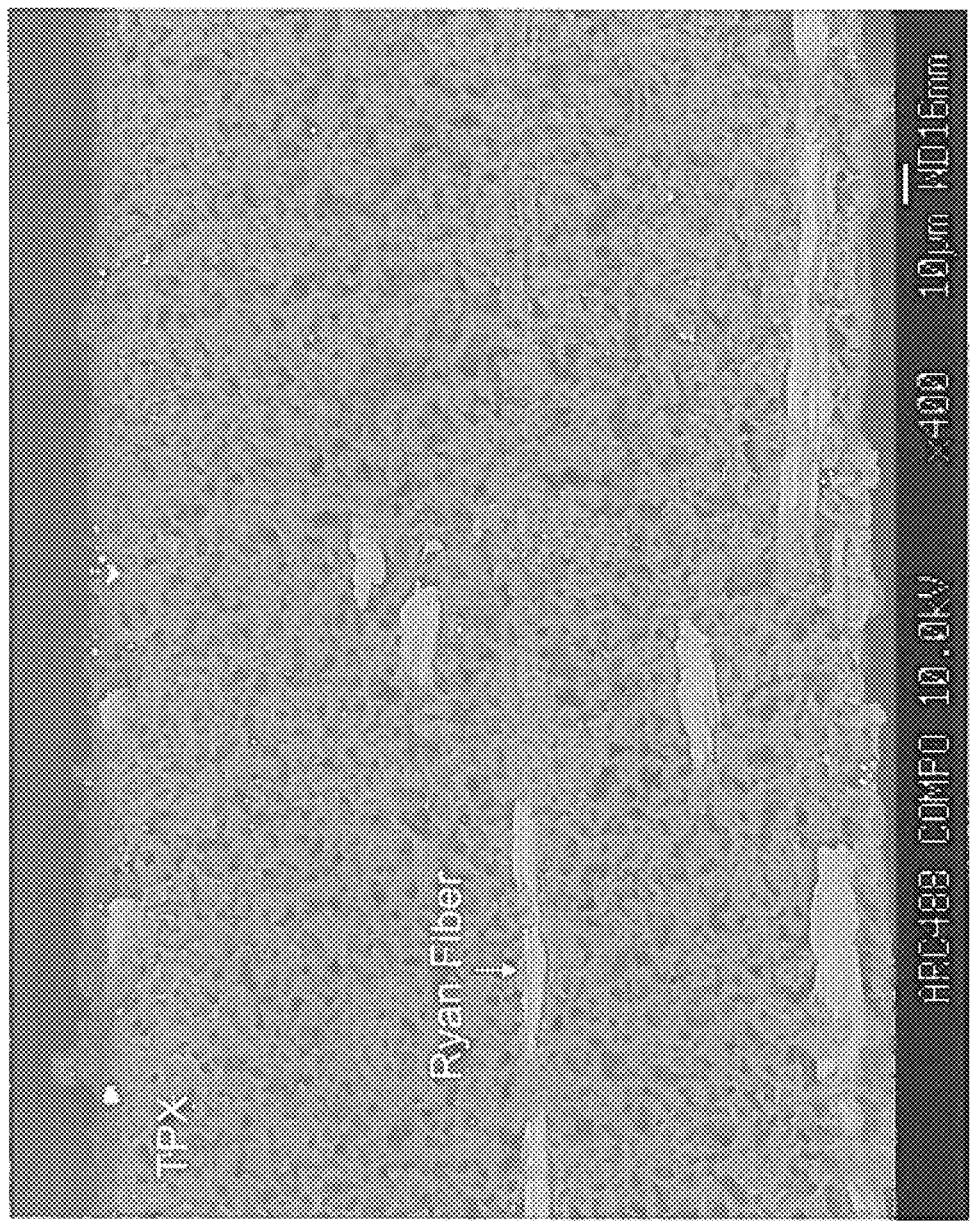
Figure 24:
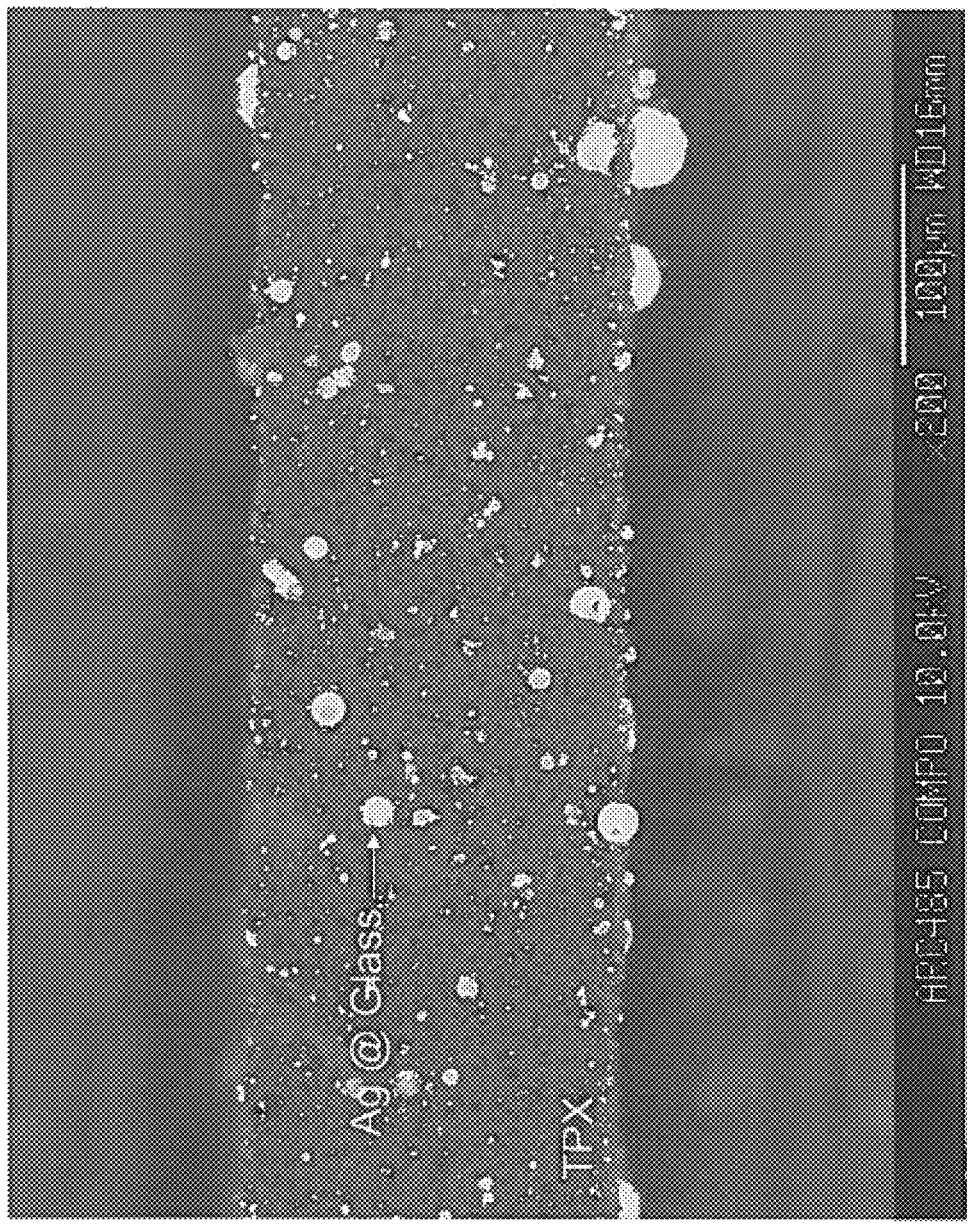
Figure 25:
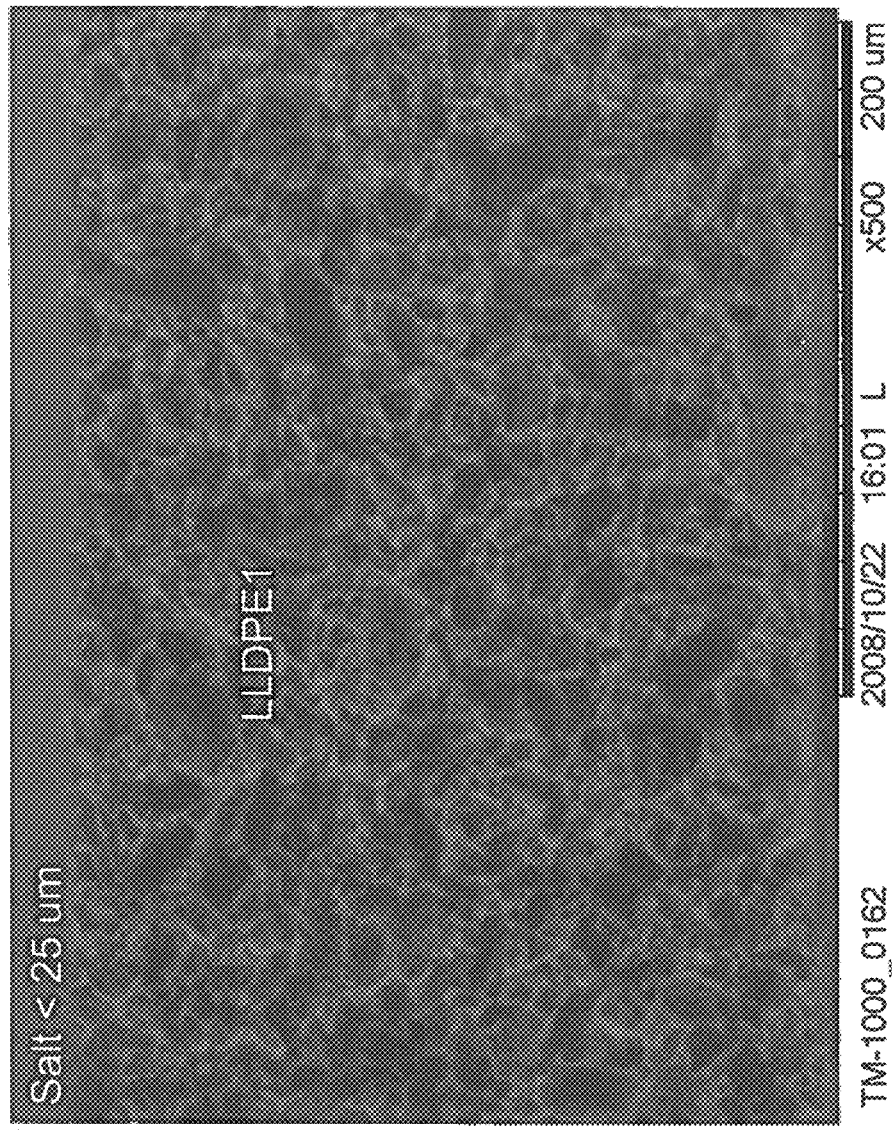
Figure 26:
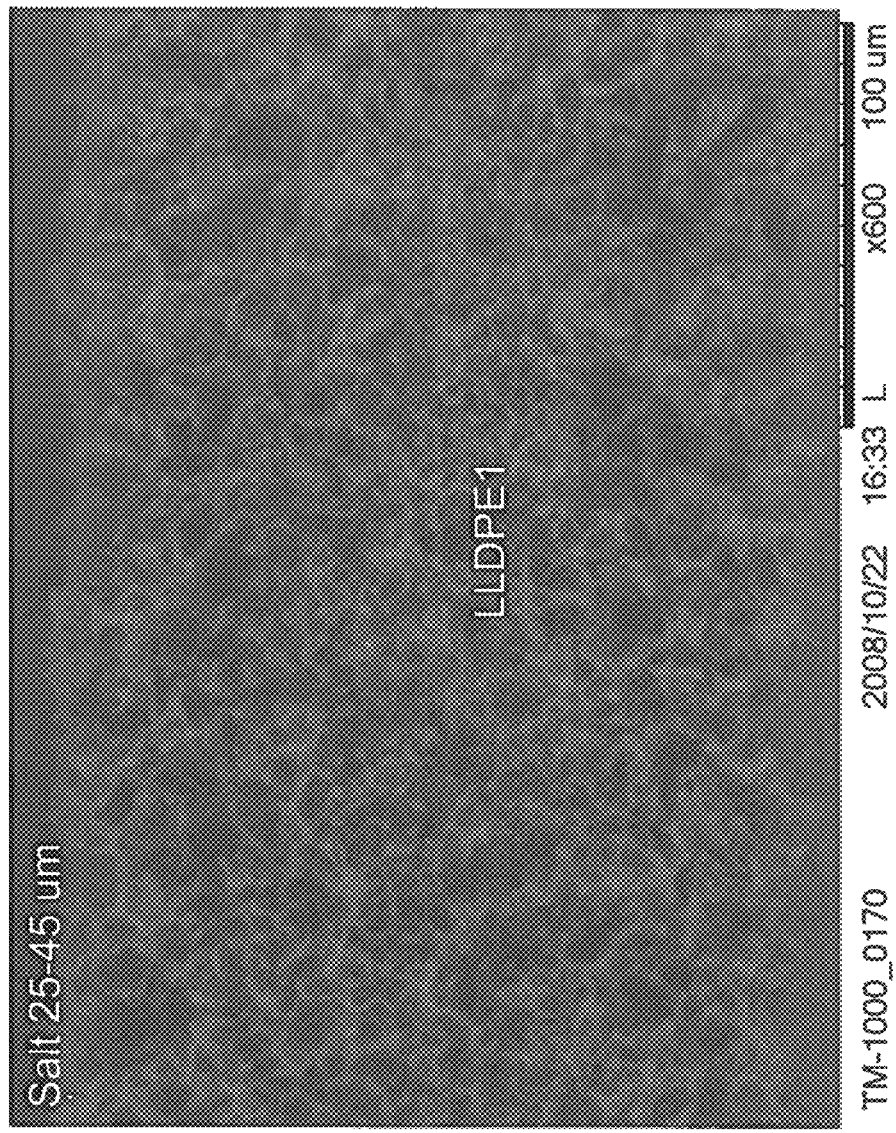
Figure 27:
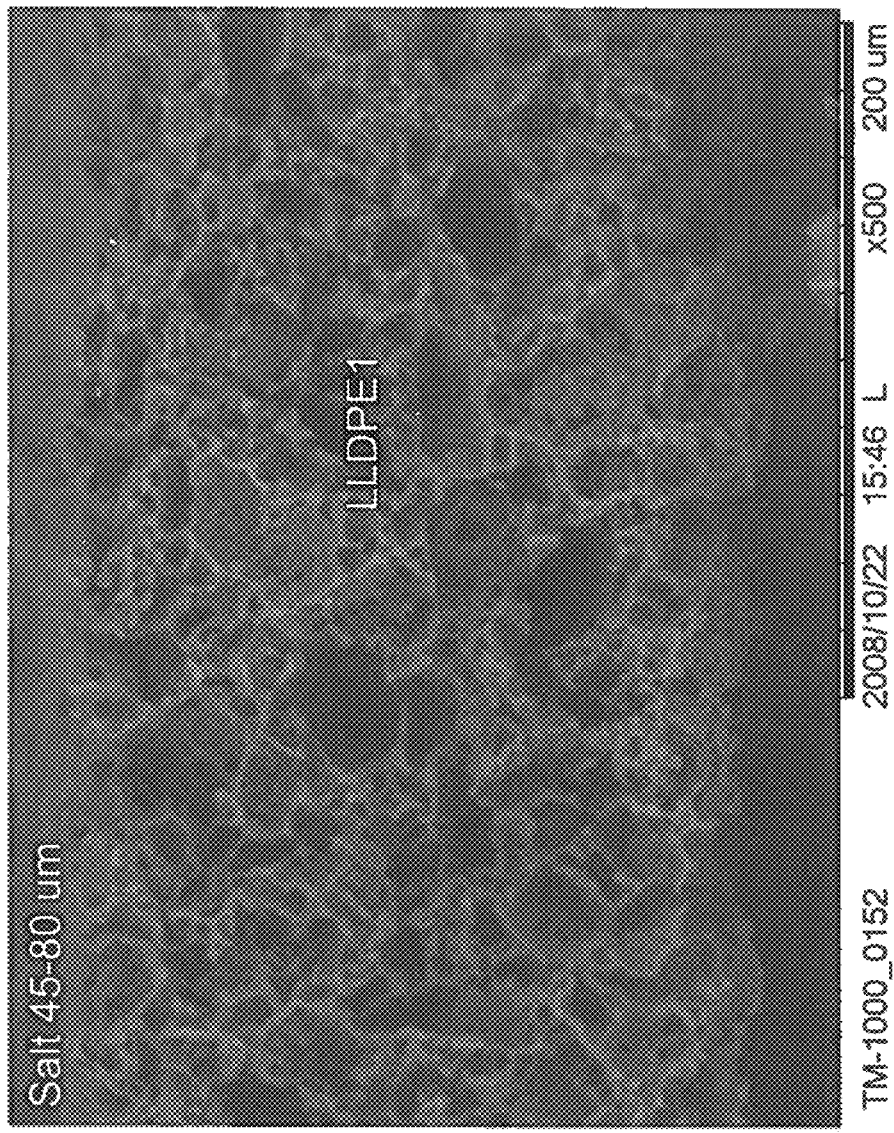
Figure 28:
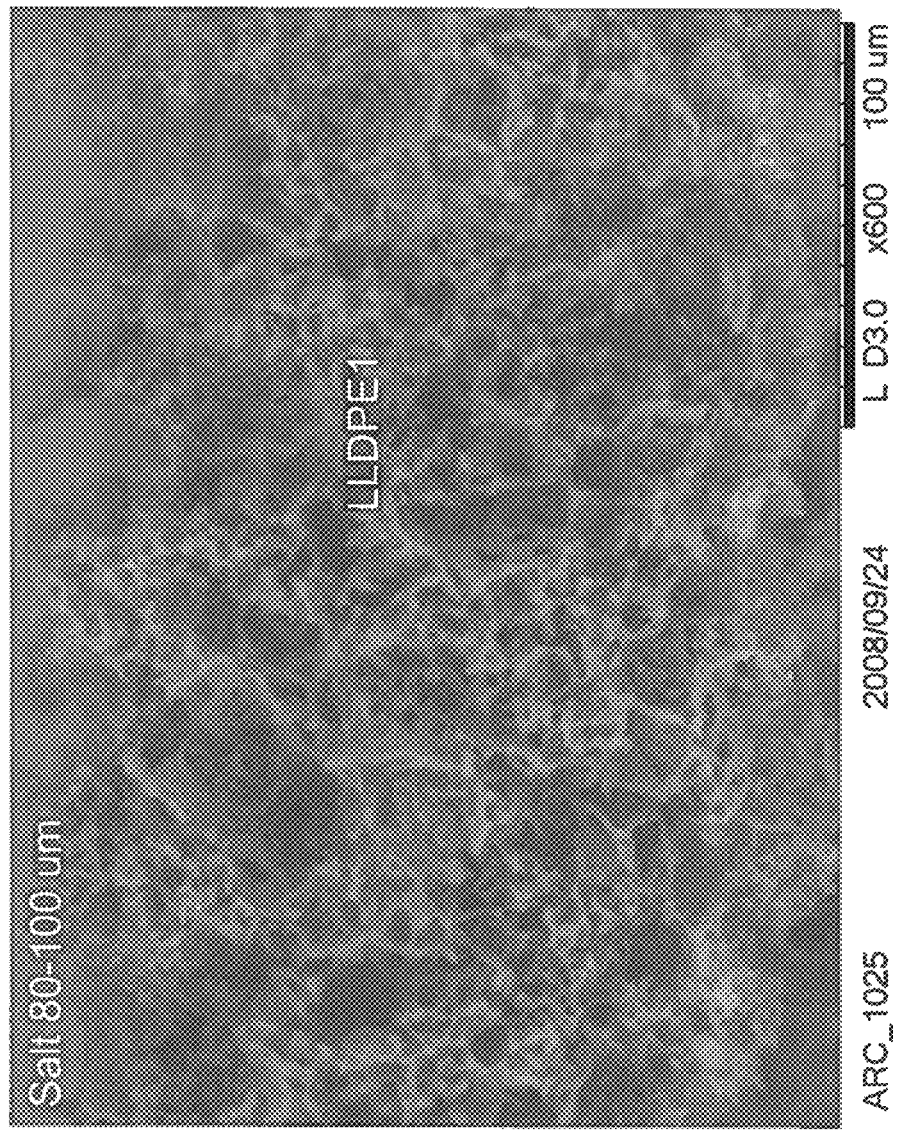
Figure 29:
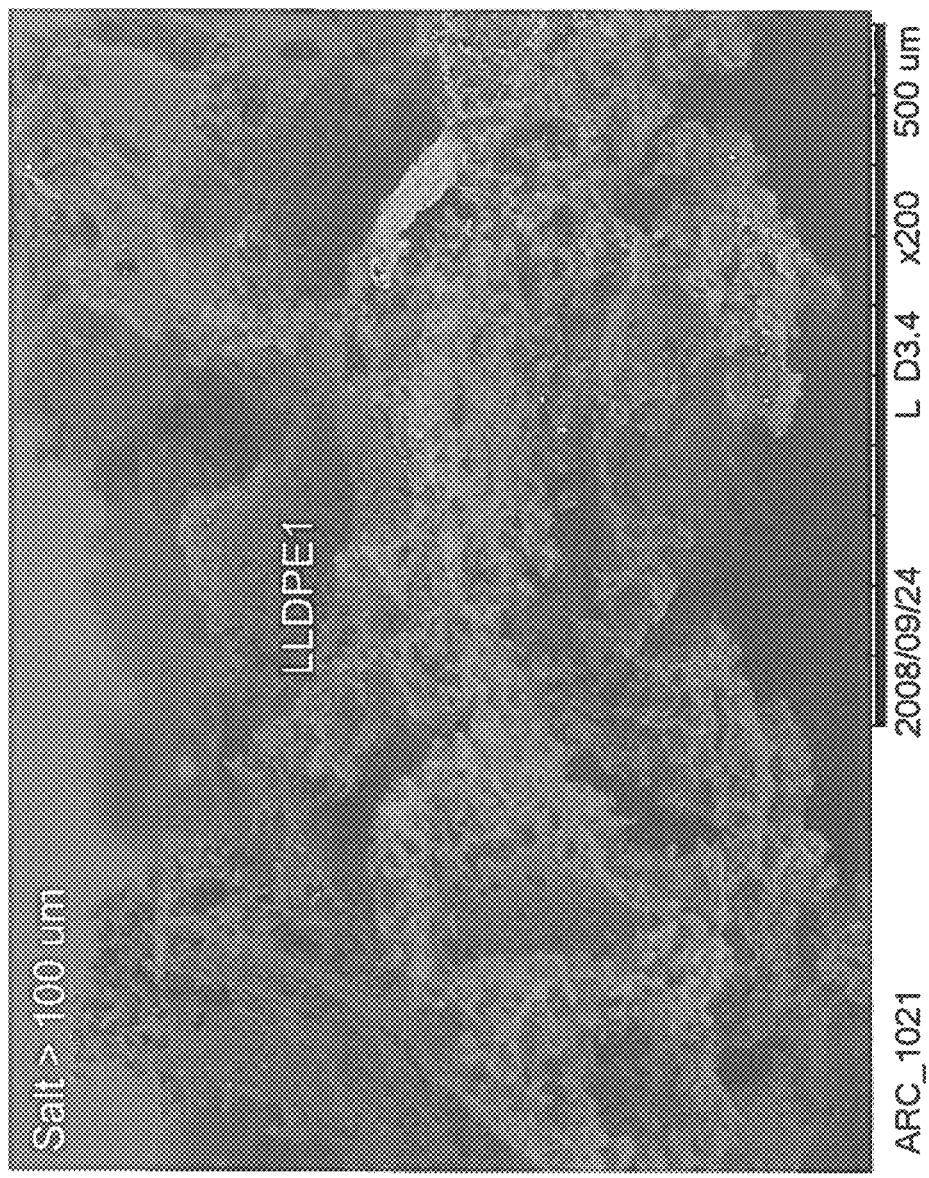

In example 11 and 12 active fillers (Ryan fiber and silver coated glass) were incorporated into the final porous matrix. SEM images of the resulting materials as shown in FIGS. 20 and 21 in cross-section. As it is shown in FIG. 21, the silver coated glass spheres were trapped inside the porous matrix but their surfaces (completely or partially) were exposed to the pore volume.

Examples 16 through 20 show the results of the salt sieving experiments. The milled slurry was sequentially sieved through different mesh sizes (large to small) in order to fraction the salt particles in the ranges (>100, 80-100, 45-80, 25-45, <25 um). The fractioned slurries were used to form the lattice constructions 10 and further invaded with molten polymer. FIGS. 25 through 29 show the cross-section SEM images of some of the final samples after extraction of the salt particles.

Figure 30:
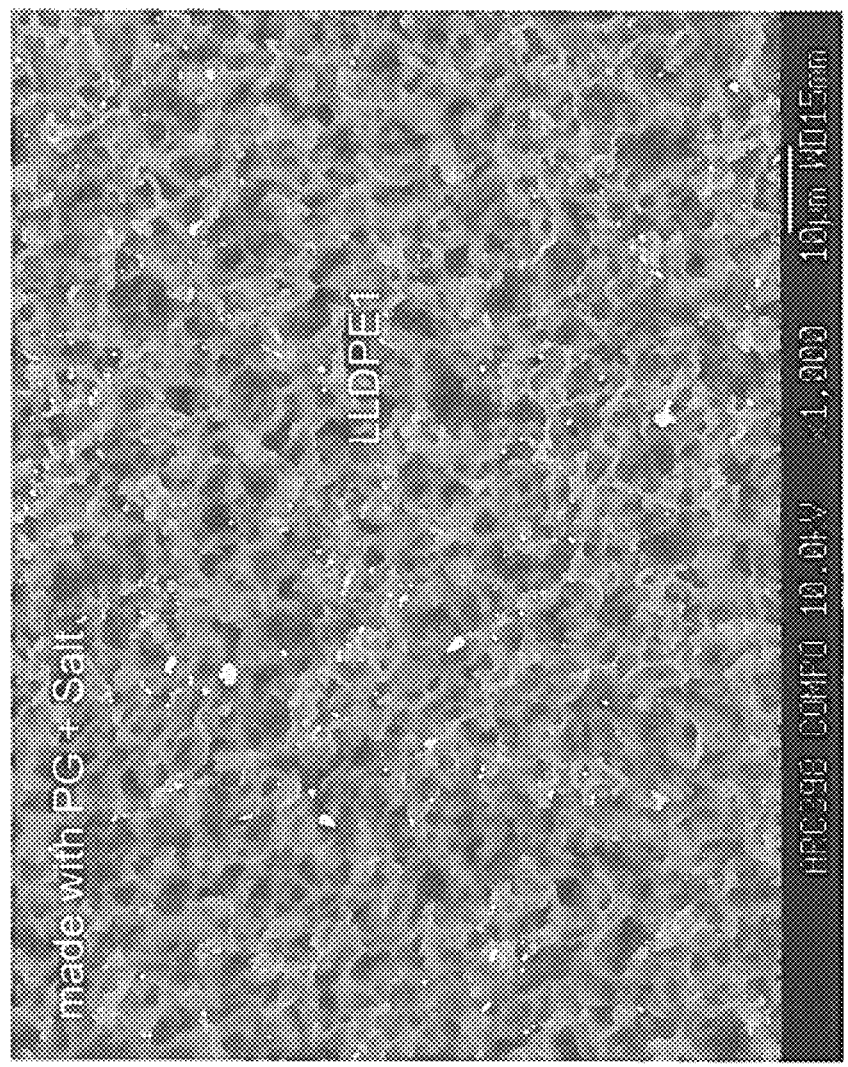

In example 21, the lattice construction was prepared from a salt slurry containing 5% propylene glycol and dried at 70° C. for 1 min. FIG. 30 shows a cross-section SEM image of the final sample after extraction of the salt particles.

Examples 22 and 23: Preparation of Porous Polypropylene (PP)

Figure 31:
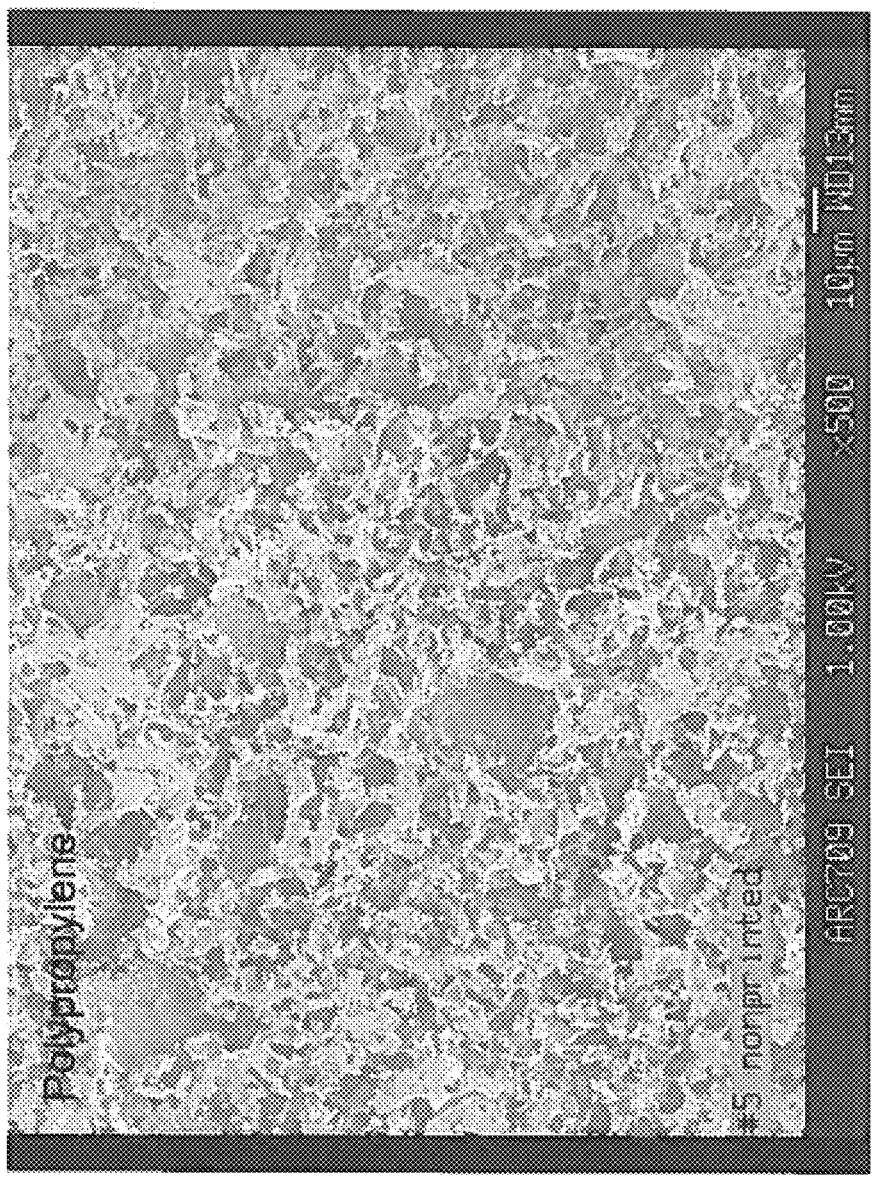

A commercially available 2-mil polypropylene film was processed. FIG. 31 shows a modified PP surface. The surface is clearly porous. For invasion of polypropylene into salt, temperatures at 300-400 F (one-sided) and pressures at >50 psi are sufficient conditions for the invasion process.

Example 24: Preparation of Porous DuPont SURLYN Ionomer

Figure 32:
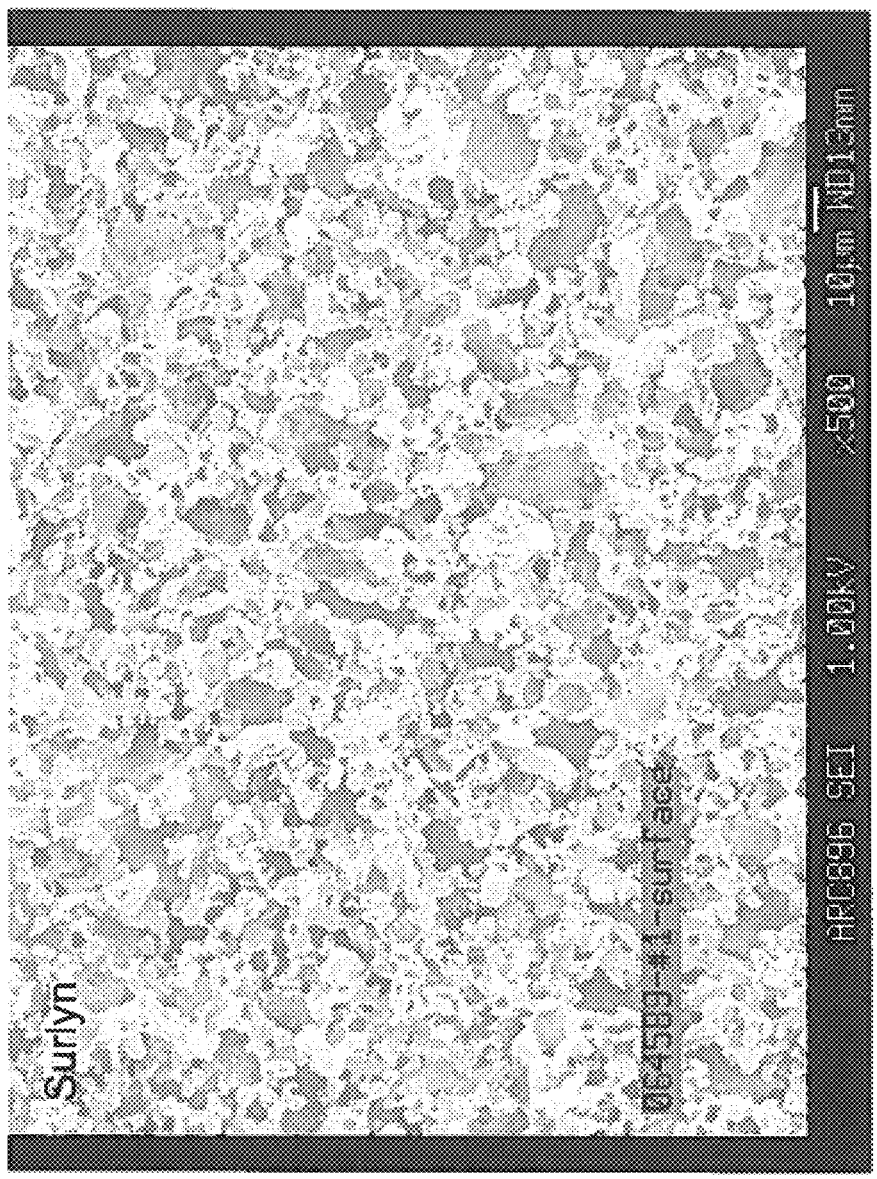

DuPont SURLYN Ionomer pellets (DuPont, Wilmington, Del.) were extruded at 440° F. at 2.5 mil with the back-up roll at 150° F. and the line speed 30 ft/min. 10 mil wet salt slurry were coated on siliconized paper and dried for 7.5 minutes at 70° C. Two dried salt cake on the siliconized paper were then inserted into the front and back of the nip (gap 8 mil) of the back-up rolls to sandwich the extruded ionomer as it went through the nip of the rollers. The film was then washed and set out to dry. FIG. 32 shows a modified Ionomer surface. The porous structure is clearly observed.

Figure 33:
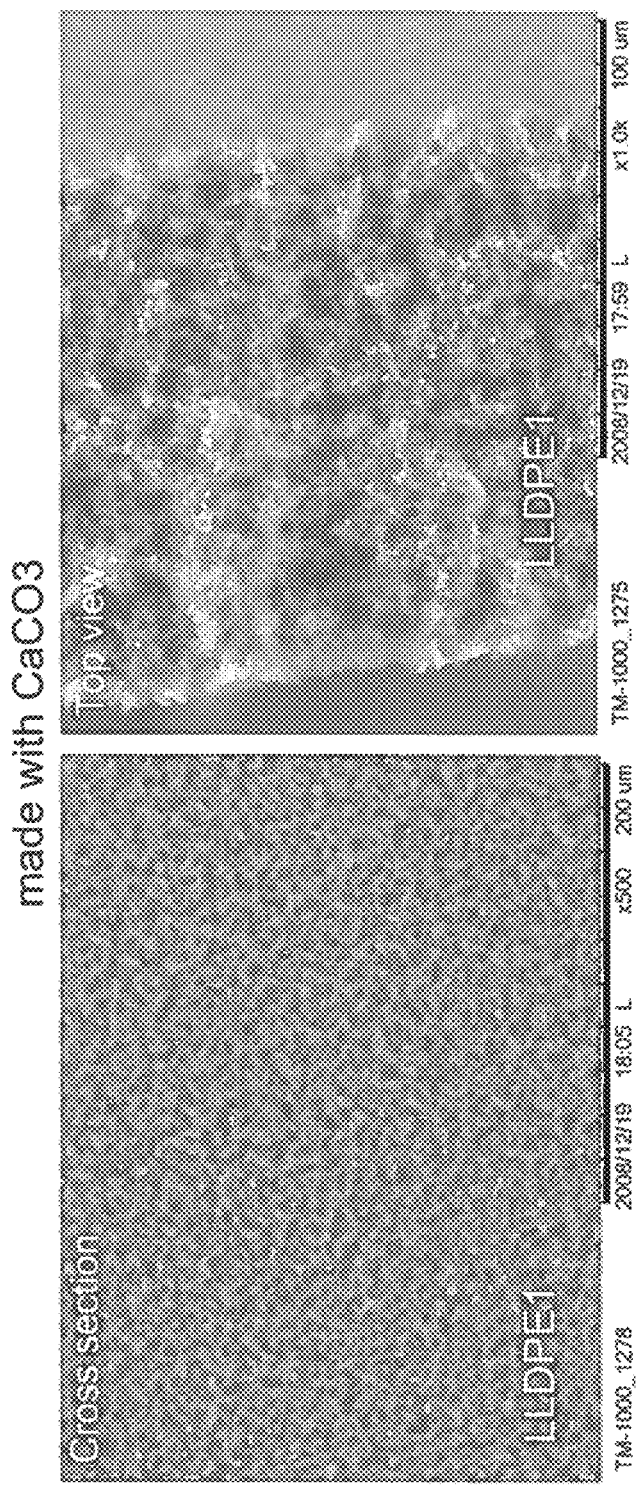

Example 25 demonstrates the case where the lattice construction 10 was formed by first making of calcium carbonate slurry in water and coating the slurry on a siliconized paper. The coating was dried in an oven at 100° C. for 5 min. and invaded with molten polymer (LLDPE1) using the same set up described above. The calcium carbonate powder was leached out using 1N HCl for 15 min. and the sample was dried in air. Top view and cross-section SEM images of this sample are shown in FIG. 33.

Figure 34:
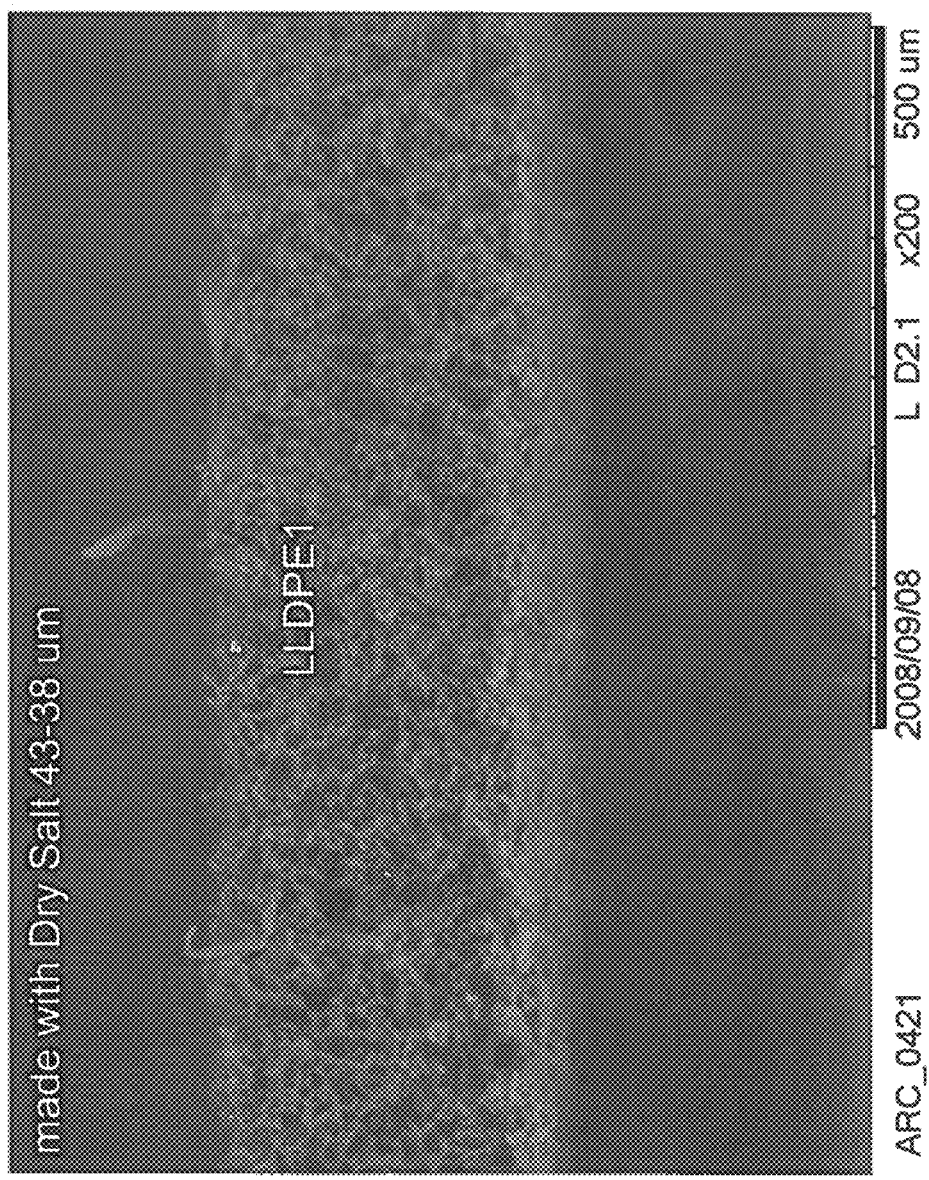

Example 26 demonstrates the case where the lattice construction 10 was formed from the dry salt powder. The dry salt powder was obtained by wet milling the salt and subsequently drying it at room temperature overnight. The obtained chunks were re-grounded dry and spread over a siliconized paper and compacted to form a cake. The LLDPE1 film was pressed between two dry salt layer according to the conditions shown in FIG. 9. After washing the porous sample obtained (see FIG. 34)

Example 27

Figure 35:
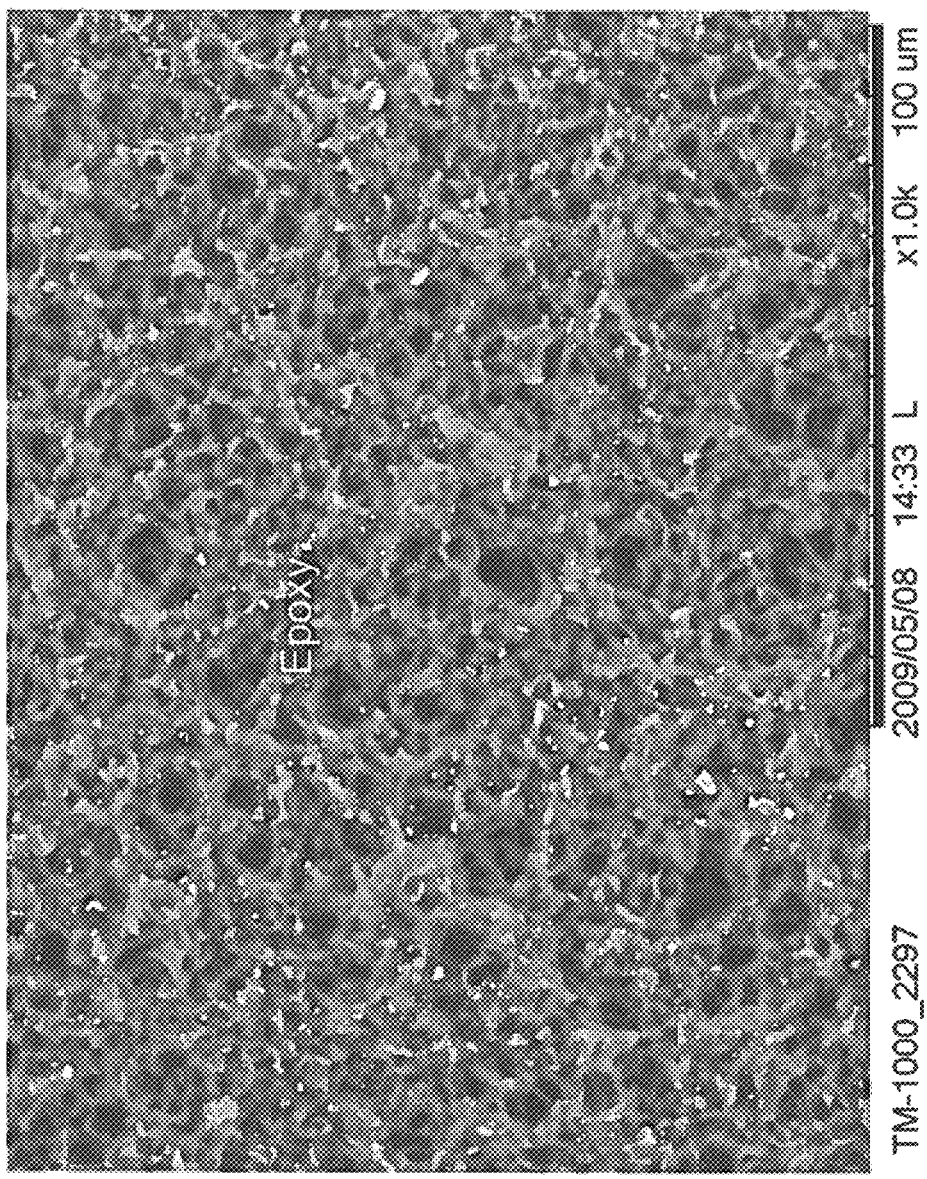

This example demonstrates the case where a two-component epoxy material used to invade the salt cake. The sample was allowed to cure and washed in order to remove the salt material (see FIG. 35).

Figure 36:
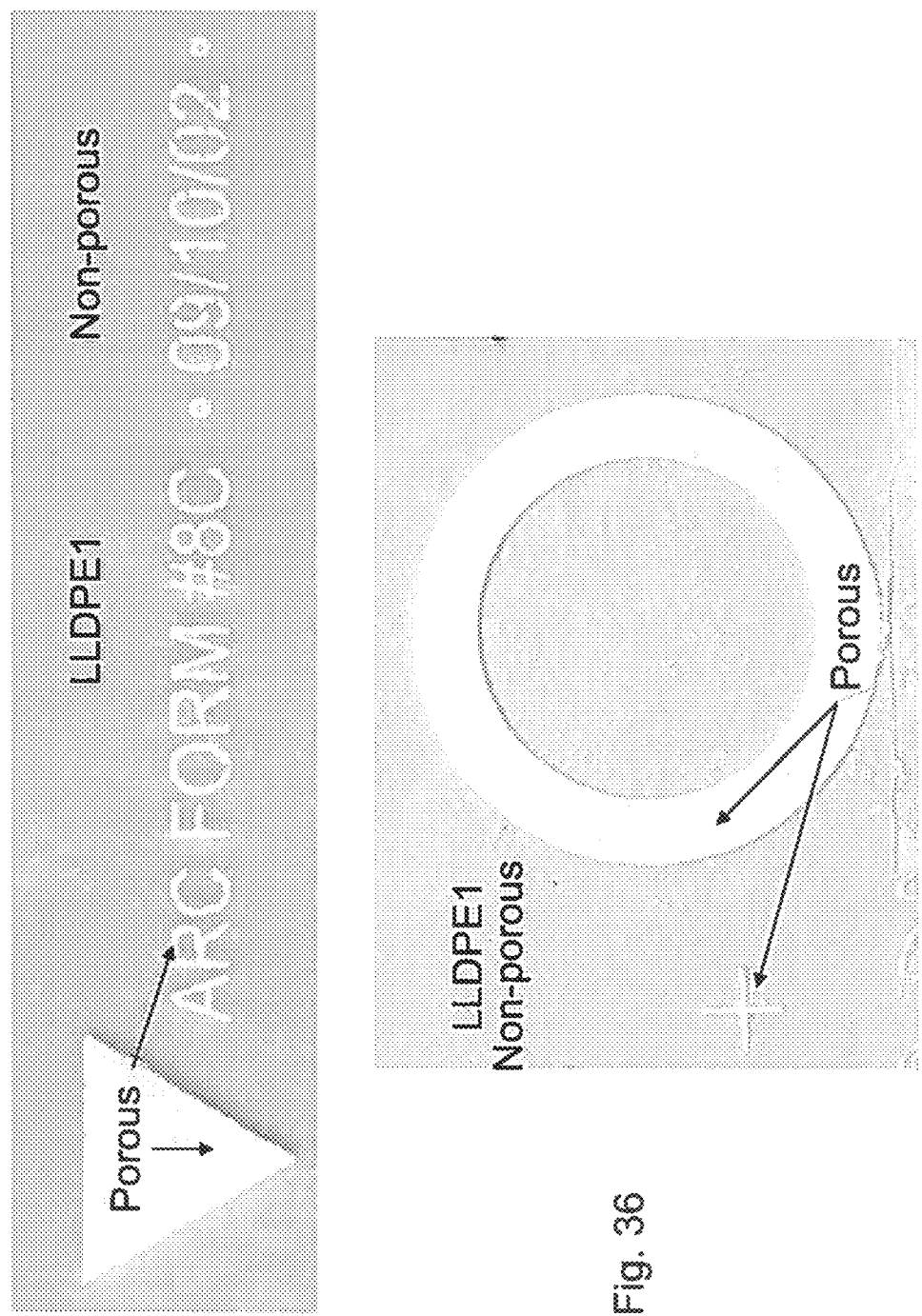
Figure 37:
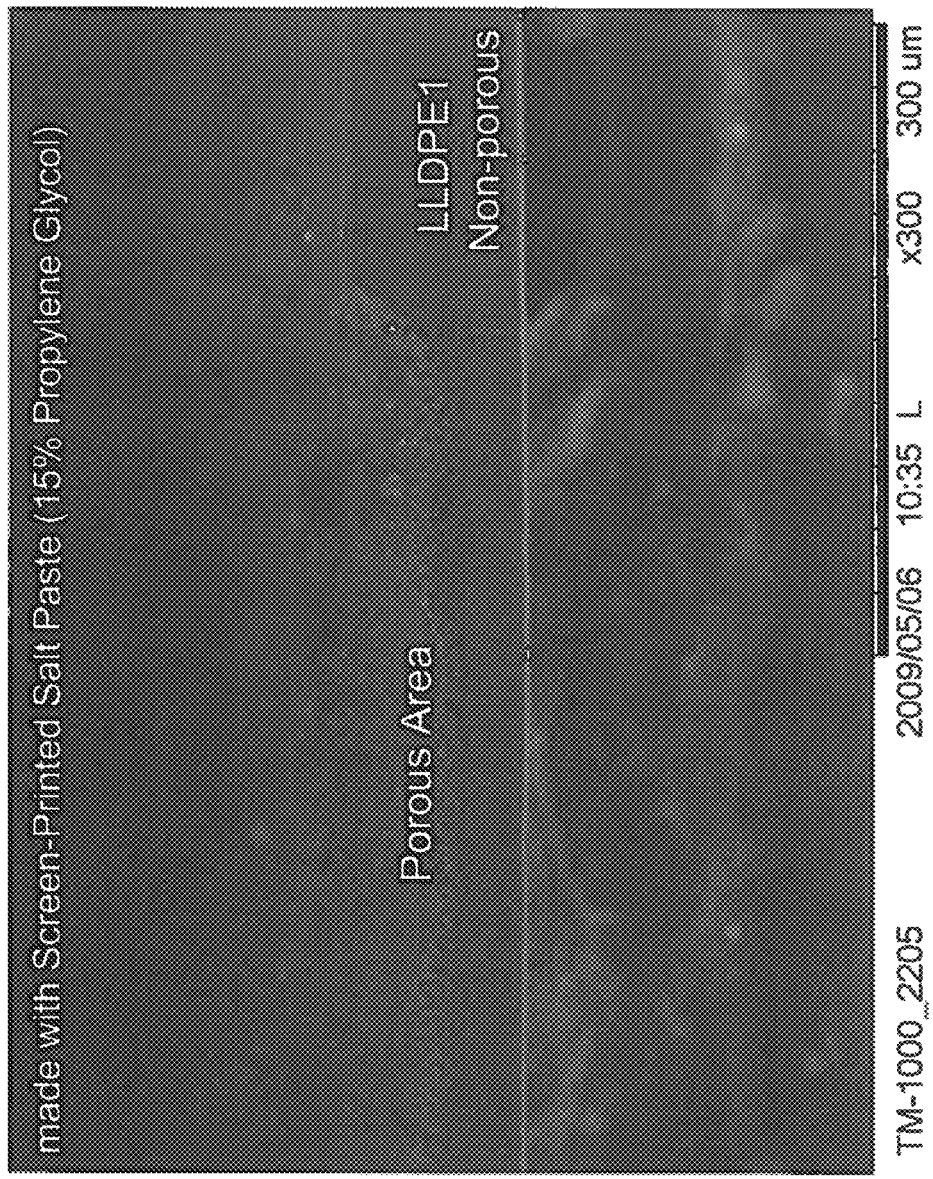

Example 28 demonstrates the case where the lattice construction 10 was formed by screen printing a salt paste (milled salt 85%+propylene glycol 15%) over a siliconized paper. The salt was washed in order to create the porous regions (see FIGS. 36 and 37)

Example 29: Preparation of Porous Glycol-Modified Polyethylene Terephthalate (PETG)

Figure 38:
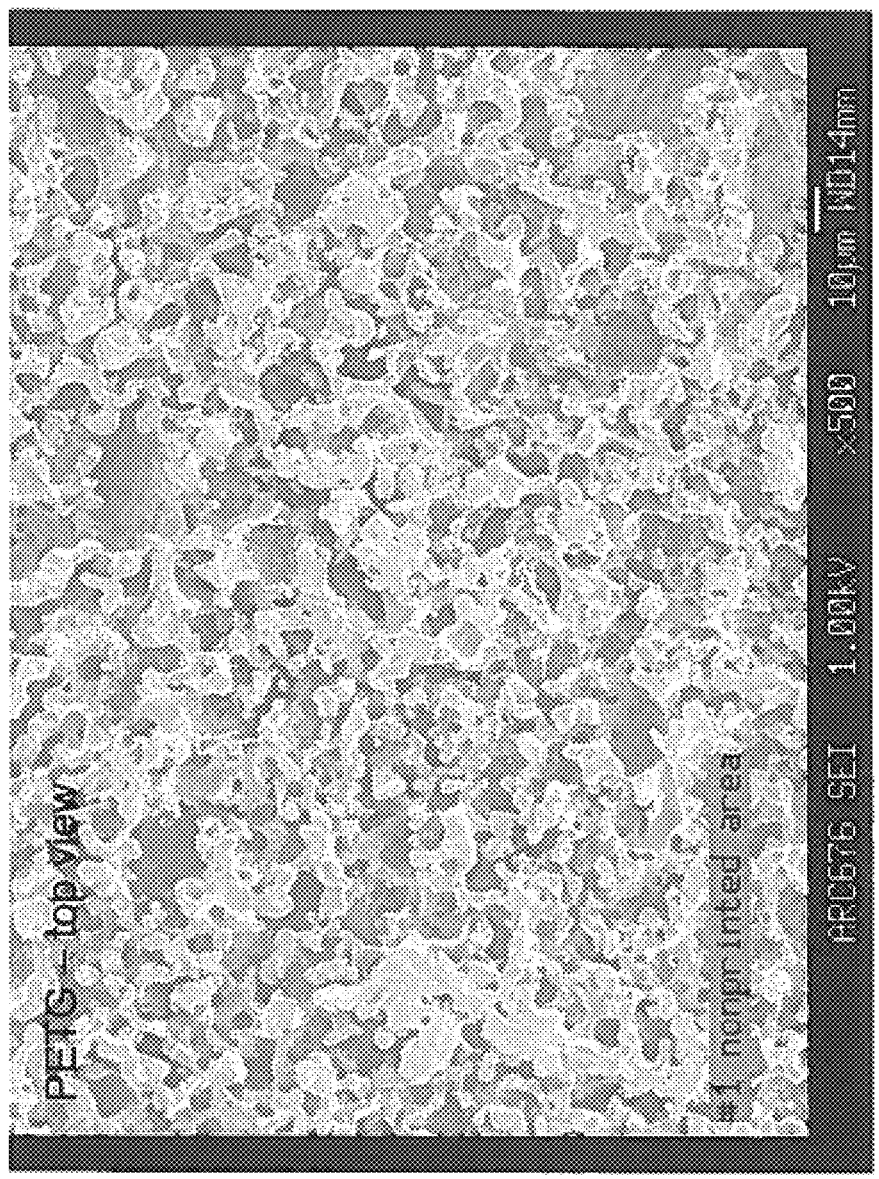
Figure 39:
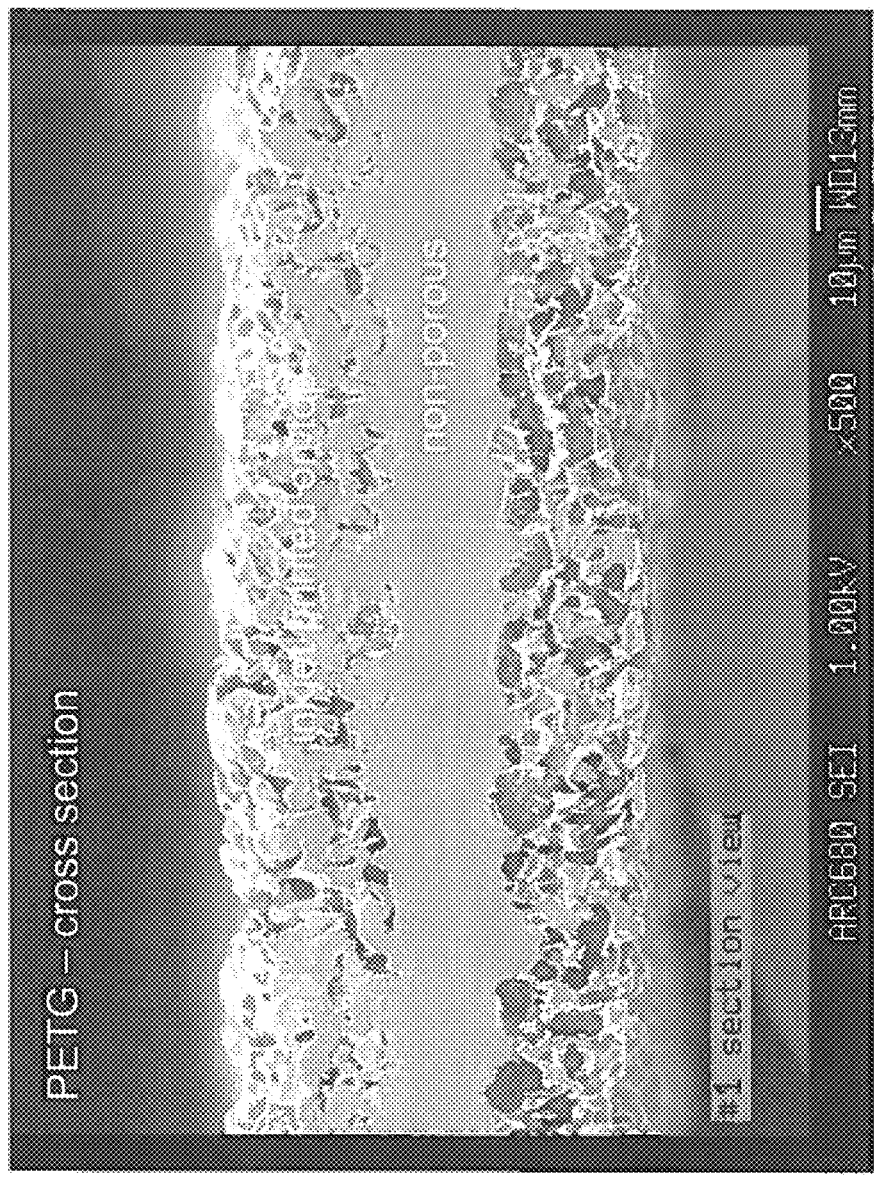

A piece of extruded glycol-modified polyethyleneterphatalate (PETG) film was sandwiched between two salt cakes in a hydraulic press. The plates were set at 400° F. (one-sided) and the total sandwich was pressed for 60 seconds at 60 psi. The sandwich was removed from the press to cool for ~1 minute and the film was washed with water to remove the salt and finally set-out to air dry. FIG. 38 shows the top view of PETG after being modified using the process described above. The surface is clearly porous. FIG. 39 is the cross section view of PETG after being treated on both surfaces. The pores are clearly connected.

It is to be appreciated that the proposed methods described herein have several distinct advantages over previous methods, including but not limited to the following:

(1) Since the porous material is prepared by invading the salt layer or lattice construction, washing away the salt is easy, as all the crystals are accessible through their contact with each other. This is in contrast with methods of mixing salt and polymer together which leaves many of salt crystals trapped in the polymer structure.

(2) By selecting the appropriate particle shape and size distribution for the lattice construction, precise control of the pore morphology can be achieved. The pore size distribution can be made very narrow for uniformity throughout the porous material. The pore size can range from small as for the applications related to microfiltration to large pores with diameter in the range of millimeters. In one exemplary embodiment, the pore size is 1 micron. In another rexemplary embodiment, the pore size is 0.2 micron. In yet another exemplary embodiment, the pore size is 500 microns.

(3) A graded porous structure, one in which there is a certain gradient in the mean sizes of the pores in a given direction, can easily be produced, which is advantageous for controlling cross-flow filtration. For example, this can be done by using several layers of salts, each made of a different crystal size distribution. The graded salt structure can also be produced by controlled drying of the layer. Generally, prior art methods cannot produce such gradient pore structures.

(4) A bimodal, trimodal or even multi-modal pore structure (i.e., having two or three or more distinct pore sizes) can be generated straight forwardly, for example, by mixing different granular solids having different particle-size distributions.

(5) Since the shapes of the pore bodies and pore throats are controlled by those of the crystals and their contact area, a large variety of pore shapes can be generated by using the appropriate crystal shapes, and using easily washable materials whose crystal structure has the desired shape.

(6) The porous material created using the process can be used as filtration membranes, tissue scaffolding, wound healing, microfluidics, medical diagnostics, artificial paper, make up remover, etc. If the intended application of the porous material is to be used as a membrane, one can generate a membrane for active filtration, by embedding surface-active particles (SAPs) in the salt. For example, the SAPs may be antibacterial agents, catalyst particles (to induce a reaction), etc. Once the salt is washed off, the SAPs remain in the porous medium.

(7) One can generate a given porous pattern on the surface and in the bulk of the material by, for example, patterning the salt layer. For example, the porous pattern can function as a separation unit in a polymeric microfluidics device. Such patterns can be highly useful to cross-flow filtration, as they generate local turbulence in a fluid that is flowing over the surface.

(8) Depending on the application, many microstructural patterns in the bulk of the material may be produced. For example, if the pores between the salt crystals are first filled with a high viscosity fluid, such as propylene glycol (PG), then this fluid is displaced by a low-viscosity, monomeric mixture which is either completely or partially miscible with the PG in the salt pore space. The monomeric mixture is then cured or polymerized by heat or ultraviolet light. Then, the salt and the residual PG are washed off, leaving behind the cured polymeric microstructure. Clearly, depending on the viscosity contrast between the PG and the monomeric mixture (and the wettability, if the fluids are not miscible at all), a wide variety of microstructures may be produced. Some of such structures are branching without a significant number of close loops, while others may have many closed loops.

(9) The porous surface may be made such that it is resistant to fouling or the accumulation and deposition of living organisms or non-living material on the surface of the porous material.

(10) The wettability of the surface can be controlled and altered, using a variety of techniques involving surface treatment. Modification of a surface structure, especially its roughness, for controlling its wettability is a highly desirable. Superhydrophobic and superoleophobic surfaces (surfaces with contact angles larger than 150° and minimal contact angle hysteresis) that do not absorb water and oil, as well as surfaces that reduce drag can be created by changing the structure of a surface. Micrometer-scale roughness on hydrophobic surfaces increase the apparent contact angle and subsequently retains a microscopic layer of air between water and the surface—usually referred to as the Cassie-Baxter state to create a superhydrophobic and superoleophobic surface. Water drops on such superhydrophobic surfaces move with minimal resistance.

(11) If binding or not binding to the porous surface is important (e.g., in purification of proteins), then, the surface can be created having permanent electrical charge of a given sign. This can be accomplished by adding ionic species to lattice construction 10, invading fluid 14 and/or other fluid 12.

(12) A large number of different thermoplastic or even thermoset polymers may be used. In particular, in the case of a thermoset polymer, the thermosetting reaction occurs within the pores of the salt layer. Thus, one may use a polymer that would produce a chemically and mechanically durable surface and membrane.

(13) The process can be used to create both thin and thick porous materials with the desired porosity and pore size distribution. For example, the thickness can be less than 0.01 inches, or less than 0.001 inches. On the other hand, the thickness can be greater than 0.5 inches, or greater than 1 inch.

(14) When the invasion is conducted partially into the lattice construction, the porous material created through this process will have porosity on the surfaces the same as porosity in the bulk of the material.

Interestingly, the resulting porous material 18 manufactured according to the presently disclosed method(s) may optionally acquired advantageous or otherwise desirable properties for particular applications. For example, in one embodiment, the polymeric material 14 can start out as a transparent film, and with treatment, it become an opaque material due to the voids created as a result of the presently disclosed processes. In addition, the polymeric film becomes thicker with treatment as a result of the creation of voids which makes the material expand. In one example, the film increases in thickness from 55 µm to 138 µm.

Figure 40:
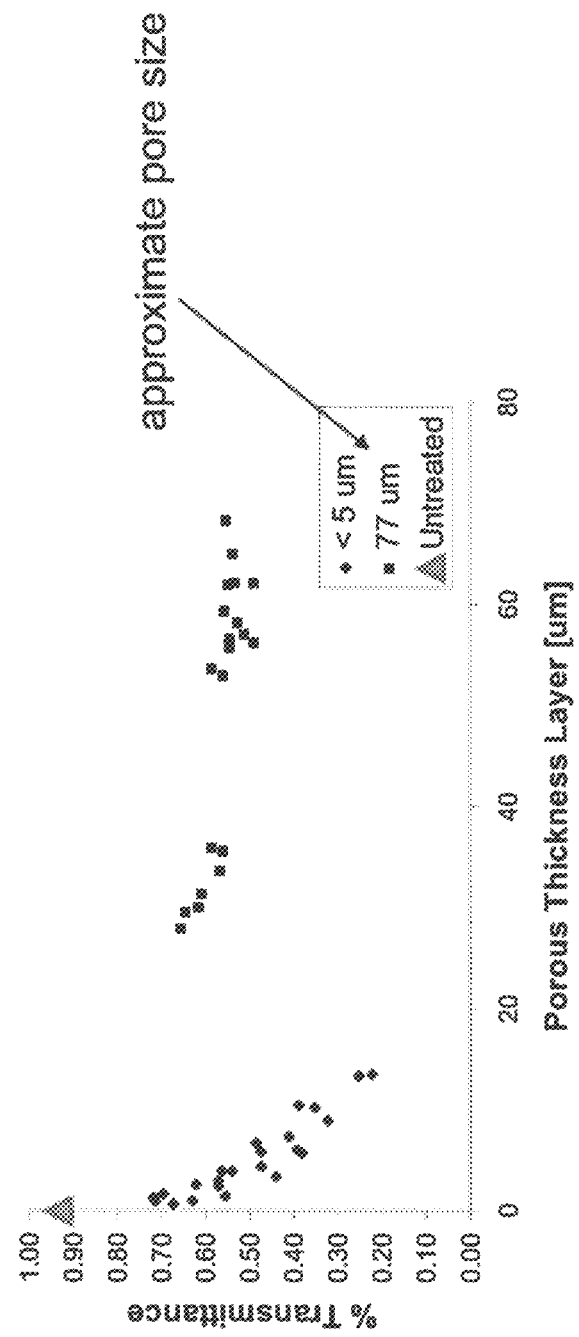
FIG. 40 is a graph illustrating the percentage light transmission of a material as a function of the thickness of a porous layer formed therein in accordance with aspects of the present inventive subject matter.
Figure 41:
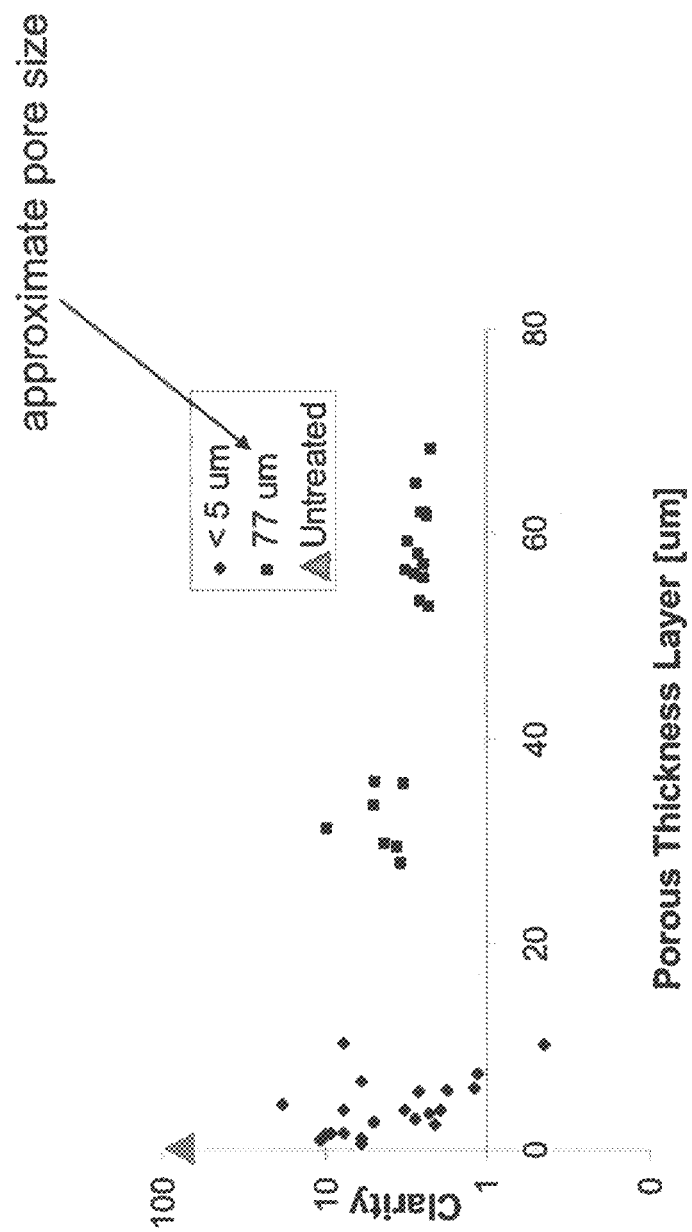
FIG. 41 is a graph illustrating the clarity of a material as a function of the thickness of a porous layer formed therein in accordance with aspects of the present inventive subject matter.
Figure 42:
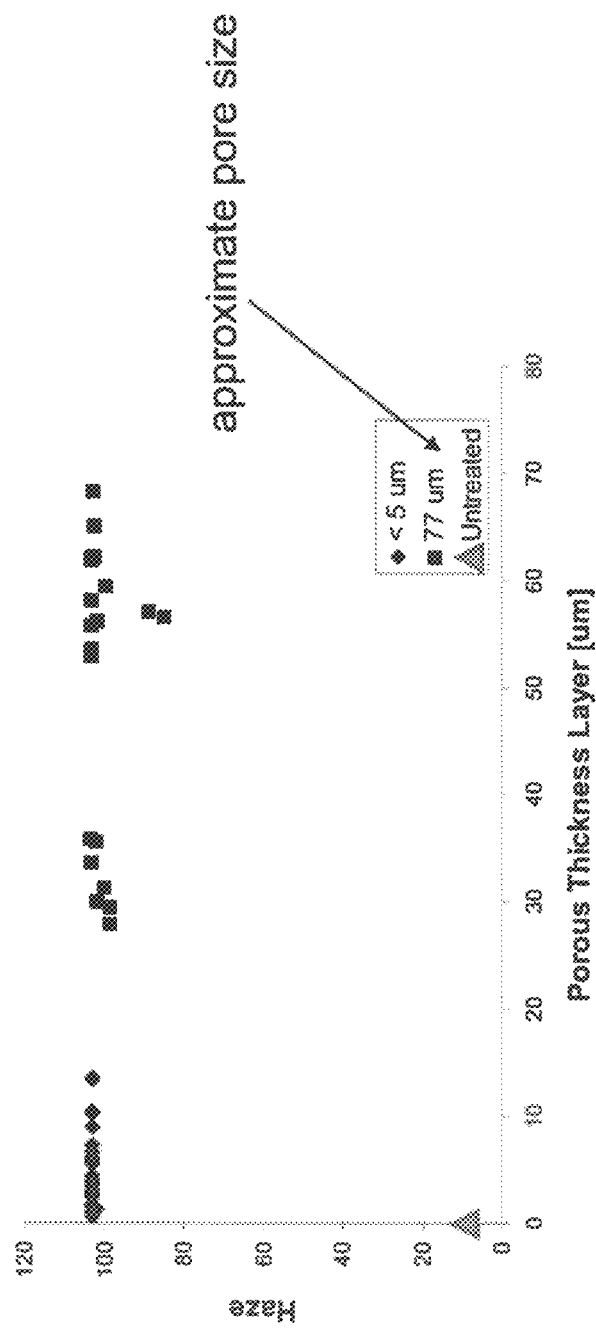
FIG. 42 is a graph illustrating the haze of a material as a function of the thickness of a porous layer formed therein in accordance with aspects of the present inventive subject matter.
Figure 43:
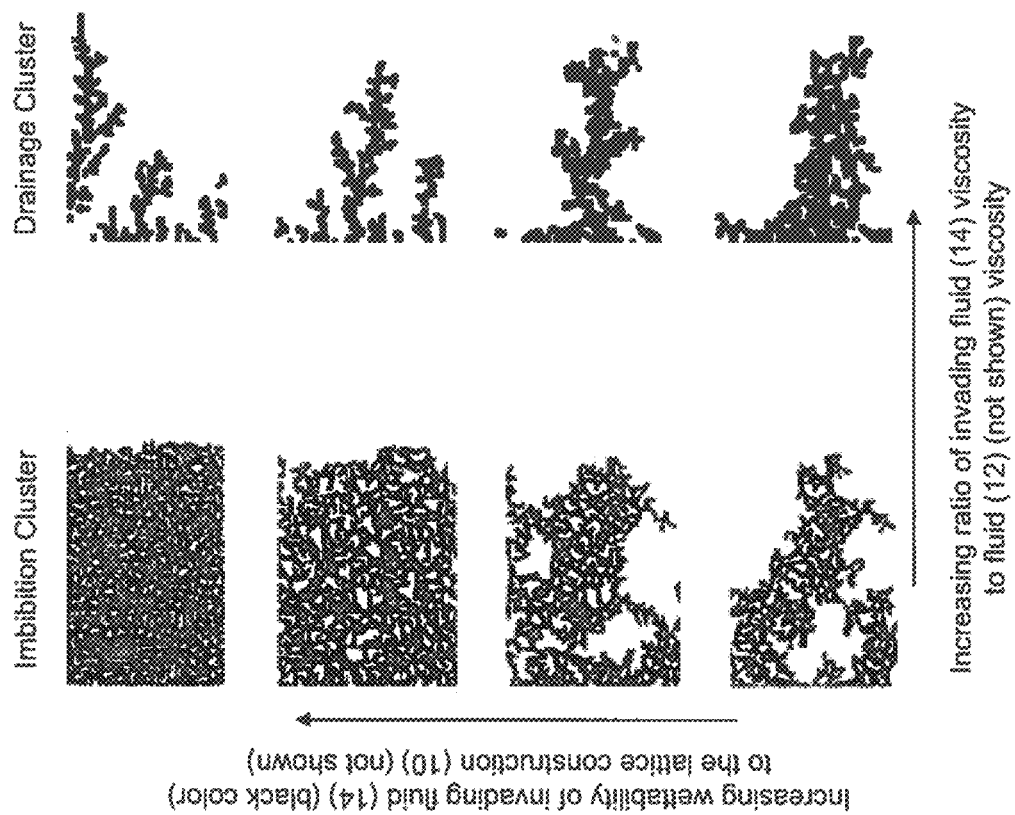
FIG. 43 represents the various types of clusters that can be formed during the invasion process (imbibition or drainage) [Taken from J. Phys: Conden. Matter. 2, SA79, (1990)].

The percent transmittance of light through the film is also modified by the process above. This can be seen in FIG. 40 where the percent transmittance of light was measured by a Haze-Gard Plus from Sheen Instruments. Notably, the percent transmittance decreases with an increase in porous layer thickness of the modified porous material. This effect is increased with decreased particle size of the solid template or lattice construction. This effect is similarly seen in the clarity of the porous material as shown in FIG. 41. As the porous layer thickness increases, the clarity of the porous material decreases as well. Treatment of the film increased the haze of the porous material, however, it remained substantially constant with an increase in porous layer thickness as seen in FIG. 42. Both haze and clarity were measured by using the aforementioned Haze-Gard Plus.

In comparing the opacity of TiO2-containing film versus porous-treated film produced in accordance with the presently disclosed methods, the absorption coefficient was calculated using the Lambert-Beer law from the percent transmission data. It was found that the absorption coefficient is only slightly higher than TiO2-containing film for film that is treated with an approximate pore size of <5 µm.

The texture of the polymeric material can also be optionally modified with treatment of the film as presently disclosed. The smaller the particle size of the solid template or lattice construction, the smoother and softer the modified film becomes.

Additionally, a polymeric untreated material can be modified to have increased hydrophilic or hydrophobic properties depending on its material properties. With the porous structure achieve via the presently disclosed treatment, the modified film can increase its affinity or repulsion of water. For example, where the water contact angle was about 90 degree on the untreated non-porous film and the water contact angle was more than 150 degree as a result of the porous structure created using the methods disclosed herein.

Dowlex 3010 LLDPE from Dow in Midland, Mich. also shows a decrease in elasticity and a lower yield at low strain after being made porous in accordance with the presently disclosed process. In this experiment, the stress-strain curves were measured using an Instron Model 5542.

In any event, it is to be appreciated that in connection with the particular exemplary embodiment(s) presented herein certain steps and structural or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein. Additionally, while described in a certain order herein, it is to be appreciated that where appropriate the order of steps may be altered.

Moreover, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of forming a composite material, comprising:
(a) forming a first lattice construction from a plurality of solid particles, said construction being formed so as to have one or more gaps between the particles, said gaps being at least partially filled with a first fluid material;

(b) partially displacing the first fluid material with an invading fluid material such that the invading fluid material partially penetrates the gaps in the lattice construction;

(c) at least partially solidifying the invading fluid material which penetrated the gaps in the lattice construction to form a composite material; and, (d) removing at least a portion of the solid particles from the composite material, thereby forming at the location of the removed portion one or more pores in the solidified invading material, wherein step (b) comprises applying pressure and heat to the invading fluid, and wherein the invading fluid material is a solid film when brought into contact with the lattice construction prior to penetrating the gaps in the lattice construction.

2. The method of claim 1, wherein the composite material is a filtration membrane, tissue scaffold, microfluidics, medical diagnostics, artificial paper, or make up remover.

3. The method of claim 1, wherein the pore size is greater than 500 microns.

4. The method of claim 1, wherein the pore size is smaller than 1 micron.

5. The method of claim 1, wherein the solid particles are a mixture of particles that vary in size, shape, or chemical nature.

6. The method of claim 1, wherein the first fluid is a mixture of fluids.

7. The method of claim 1, wherein the invading fluid and the first fluid are not miscible.

8. The method of claim 1, wherein the first fluid is one of a gas, solution, emulsion, suspension, or foam.

9. The method of claim 1, wherein the lattice construction has a prescribed porosity, pore size, and pore-size distribution in accordance with the defined gaps therein.

10. The method of claim 9, wherein the porosity, pore size and pore-size distribution of the lattice construction is controlled by controlling at least one of a size or size distribution of the particles.

11. The method of claim 9, wherein a pore structure in the lattice construction is heterogeneous, said pore structure being defined by the prescribed porosity, pore size and pore-size distribution of the lattice construction.

12. The method of claim 1, wherein the invading fluid material is provided as a single layer or multilayer film.

13. The method of claim 1, wherein the lattice construction is a single layer or multilayer construction formed by at least one of wet or dry coating, spraying, printing, or phase separation.

14. The method of claim 1, wherein the method further comprises:
controlling the extent of penetration of the invading fluid into the lattice construction.

15. The method of claim 14, wherein the extent of penetration of the invading fluid into the lattice construction is controlled such that the invading fluid does not fully penetrate the entire thickness of the lattice construction.

16. The method of claim 14, wherein an extra amount of the invading fluid material not penetrating the lattice construction is solidified on a surface of the lattice construction.

17. The method of claim 1, wherein the method further comprises:
forming a second lattice construction from a plurality of solid particles, said second construction being formed so as to have one or more gaps between the particles;

invading the second lattice construction with the invading fluid material such that the invading fluid material at least partially penetrates the gaps in the second lattice construction; and, at least partially solidifying the invading material which invaded the second lattice construction.

18. The method of claim 17, wherein at least one of a size or size-distribution of the gaps in the second lattice construction is different from that of the first lattice construction.

19. The method of claim 17, wherein the invading fluid material is squeezed between the first and second lattice constructions.

20. The method of claim 1, wherein the first and second lattice constructions meet one another so that no extra invading fluid material is left un-penetrated.

21. The method of claim 1, wherein the lattice construction is formed on a substrate surface in one of a random pattern.

22. The method of claim 1, wherein the method further comprises:
sizing the particles by at least one of dry-milling, wet-milling, sieving, filtering, crystallization, agglomeration, granulation, or palletizing.

23. The method of claim 1, wherein the invading fluid forms at least one of an imbibition cluster or a drainage cluster.

24. The method of claim 1, wherein the method is executed in at least one of the following manners: a batch manner, a continuous manner, or using a step and repeat process.

25. The method of claim 1, wherein the solid film is a polymeric material.

26. The method of claim 25, wherein the polymeric material is solidified by at least one of UV-curing, e-beam curing, curing by application of steam, cooling, or heating by infrared (IR) radiation.

27. The method of claim 1, wherein the plurality of solid particles of the formed lattice construction abut, contact, or touch one or more of their neighboring particles while forming the one or more gaps between the particles.

28. The method of claim 1, wherein the pressure and heat is applied using at least one of a heated roller, a laminator, or a hot press.

29. The method of claim 1, wherein the invading fluid fully penetrates the entire thickness of the lattice construction.

30. The method of claim 1, wherein step (a) further includes wet-milling the plurality of solid particles in a liquid, then drying off the liquid to form the lattice construction.

31. The method of claim 30, wherein the liquid is a non-solvent liquid.

32. The method of claim 31, wherein the non-solvent liquid is selected from the group consisting of alcohols, esters, ketones, aromatics, aliphatics, and liquid polymers.

33. The method of claim 32, wherein the alcohol is selected from the group consisting of isopropyl alcohol (IPA), propylene glycol, ethylene glycol, and glycerin.

34. The method of claim 1, wherein the first fluid material is selected from the group consisting of air, alcohols, esters, ketones, aromatics, aliphatics, and liquid polymers.

35. The method of claim 1, wherein the pressure and temperature of the invading fluid are controlled by at least one of a heated roller, a laminator, or a hot press.

36. The method of claim 1, wherein the invading fluid is a molten polymer.

37. The method of claim 1, wherein the average diameter of the particles at least one of the ranges from about 1 micron to about 25 microns, less than 25 microns, from 25 to 45 microns, from 45 to 80 microns, from 80 to 100 microns, or greater than 100 microns measured by light scattering using a Horiba Laser Scattering Particle Size Distribution Analyzer, Model LA910.

38. The method of claim 1, wherein the invading fluid material penetrates into the lattice construction to a predetermined depth.

39. The method of claim 1, wherein the invading material is formed by melting the film.

40. The method of claim 1, wherein the invading fluid material is provided as a multilayer film.

41. The method of claim 1, wherein the pressure and heat is applied using a heated roller.

42. The method of claim 1, wherein the thickness of the composite material is less than 0.01 inches (254 microns).

43. The method of claim 1, wherein the thickness of the composite material is less than 0.001 inches (25.4 microns).

44. The method of claim 1, wherein the thickness of the composite material is greater than 0.5 inches (12.7 mm).

45. The method of claim 1, wherein the thickness of the composite material is greater than 1 inch (25.4 mm).

46. The method of claim 1, wherein the solid film is a single layer.

* * * * *